US009892847B2

(12) United States Patent
Hatanaka et al.

(10) Patent No.: US 9,892,847 B2
(45) Date of Patent: Feb. 13, 2018

(54) METHOD FOR FORMING MAGNETIC FIELD SPACE

(71) Applicant: NITTO DENKO CORPORATION, Ibaraki-shi, Osaka (JP)

(72) Inventors: Takezo Hatanaka, Ibaraki (JP); Hisashi Tsuda, Ibaraki (JP)

(73) Assignee: NITTO DENKO CORPORATION, Ibaraki-Shi, Osaka (JP)

( * ) Notice: Subject to any disclaimer, the term of this patent is extended or adjusted under 35 U.S.C. 154(b) by 288 days.

(21) Appl. No.: 14/241,027

(22) PCT Filed: May 1, 2013

(86) PCT No.: PCT/JP2013/062698
§ 371 (c)(1),
(2) Date: Feb. 25, 2014

(87) PCT Pub. No.: WO2014/080648
PCT Pub. Date: May 30, 2014

(65) Prior Publication Data
US 2014/0246919 A1    Sep. 4, 2014

(30) Foreign Application Priority Data
Nov. 26, 2012 (JP) .................................. 2012-257528

(51) Int. Cl.
*H01F 27/42* (2006.01)
*H01F 37/00* (2006.01)
(Continued)

(52) U.S. Cl.
CPC ........... *H01F 38/14* (2013.01); *H01F 27/365* (2013.01); *H02J 5/005* (2013.01); *H02J 17/00* (2013.01); *H02J 50/50* (2016.02)

(58) Field of Classification Search
CPC ...... H01F 38/14; H01F 27/365; H02J 5/5005; H02J 17/00
(Continued)

(56) References Cited

U.S. PATENT DOCUMENTS

2004/0260372 A1* 12/2004 Canfield ............... A61N 1/3787
607/116
2008/0129246 A1   6/2008 Morita et al.
(Continued)

FOREIGN PATENT DOCUMENTS

CN    102656648 A    9/2012
EP    2394840 A2    12/2011
(Continued)

OTHER PUBLICATIONS

Nov. 18, 2014 Japanese Office Action issued in Application No. 2012-257528.
(Continued)

*Primary Examiner* — Rexford Barnie
*Assistant Examiner* — Toan Vu
(74) *Attorney, Agent, or Firm* — Oliff PLC

(57) ABSTRACT

A power-supplying resonator of a power-supplying module and a power-receiving resonator of a power-receiving module are arranged to face each other. On inner circumferential surface sides of the power-supplying resonator and the coil of the power-receiving resonator, cylindrical magnetic members which cover the entire inner circumferential surface of the coils of the power-supplying resonator and the power-receiving resonator are arranged. By conducting power transmission between the power-supplying resonator and the power-receiving resonator while varying a magnetic field, the magnetic field occurring around the power-supplying resonator and the power-receiving resonator is shielded by the magnetic members, and there is formed, on the coil inner
(Continued)

circumferential surface sides of the power-supplying resonator and the coil of the power-receiving resonator, a magnetic field space whose magnetic field strength is smaller than the magnetic field strength of areas other than the inner circumferential surface sides.

12 Claims, 42 Drawing Sheets

(51) Int. Cl.
    *H01F 38/00* (2006.01)
    *H01F 38/14* (2006.01)
    *H02J 17/00* (2006.01)
    *H01F 27/36* (2006.01)
    *H02J 5/00* (2016.01)
    *H02J 50/50* (2016.01)

(58) Field of Classification Search
    USPC .......................................... 307/104
    See application file for complete search history.

(56) References Cited

U.S. PATENT DOCUMENTS

| | | | |
|---|---|---|---|
| 2010/0156344 A1 | 6/2010 | Inoue et al. | |
| 2010/0213770 A1 | 8/2010 | Kikuchi | |
| 2010/0225271 A1 | 9/2010 | Oyobe et al. | |
| 2010/0244578 A1* | 9/2010 | Yoshikawa | H02J 5/005 307/104 |
| 2010/0244580 A1 | 9/2010 | Uchida et al. | |
| 2010/0244582 A1 | 9/2010 | Yoshikawa | |
| 2010/0244839 A1 | 9/2010 | Yoshikawa | |
| 2011/0018496 A1 | 1/2011 | Kozakai | |
| 2011/0050164 A1 | 3/2011 | Partovi et al. | |
| 2012/0119965 A1* | 5/2012 | Deguchi | H01Q 1/2216 343/788 |
| 2012/0223586 A1 | 9/2012 | Gotani | |
| 2012/0223594 A1* | 9/2012 | Gotani | H01F 38/14 307/104 |
| 2012/0235636 A1* | 9/2012 | Partovi | H02J 7/025 320/108 |
| 2012/0242447 A1* | 9/2012 | Ichikawa | B60L 11/182 336/84 C |
| 2013/0005408 A1* | 1/2013 | Matsui | H01Q 1/243 455/573 |
| 2013/0038281 A1* | 2/2013 | Sakakibara | B60L 5/005 320/108 |
| 2013/0200717 A1* | 8/2013 | Bourilkov | H02J 7/025 307/104 |
| 2014/0008974 A1 | 1/2014 | Miyamoto | |
| 2014/0111147 A1* | 4/2014 | Soar | H01F 27/365 320/108 |
| 2014/0232330 A1* | 8/2014 | Robertson | H01M 2/1022 320/108 |
| 2014/0246919 A1 | 9/2014 | Hatanaka et al. | |

FOREIGN PATENT DOCUMENTS

| | | |
|---|---|---|
| JP | A-11-354348 | 12/1999 |
| JP | A-2008-120239 | 5/2008 |
| JP | 2009-106136 A | 5/2009 |
| JP | A-2009-135346 | 6/2009 |
| JP | 2010-239847 A | 10/2010 |
| JP | 2010-239848 A | 10/2010 |
| JP | 2010239838 A | 10/2010 |
| JP | A-2010-239769 | 10/2010 |
| JP | 2011-030318 A | 2/2011 |
| JP | B2-4624768 | 2/2011 |
| JP | A-2011-120382 | 6/2011 |
| JP | A-2011-234496 | 11/2011 |
| JP | 2012-060731 A | 3/2012 |
| JP | 2013-239692 A | 11/2013 |
| WO | WO 2007/080820 A1 | 7/2007 |
| WO | 2009/037821 A1 | 3/2009 |
| WO | 2011/114527 A1 | 9/2011 |
| WO | WO 2011/135424 A2 | 11/2011 |
| WO | WO 2012/118112 A1 | 9/2012 |
| WO | 2012132841 A1 | 10/2012 |

OTHER PUBLICATIONS

Mar. 31, 2015 Office Action issued in Japanese Application No. 2012-257528.
International Search Report issued in International Patent Application No. PCT/JP2013/062698 dated Aug. 6, 2013.
May 26, 2015 English-language International Preliminary Report on Patentability issued in International Application No. PCT/JP2013/062698.
Aug. 4, 2015 Office Action issued in Japaneese Patent Application No. 2012-257528.
Office Action issued in Japanese Patent Application No. 2012-257528 dated Aug. 19, 2014 (with translation).
Apr. 27, 2016 Office Action issued in Singapore Patent Application No. 11201400185X.
May 12, 2016 European Search Report issued in European Application No. 13834317.03.
Jan. 4, 2017 Office Action issued in Taiwanese Patent Application No. 102115795.
Oct. 25, 2016 Office Action issued in Japanese Patent Application No. 2015-197624.
Nov. 17, 2016 Office Action issued in Korean Patent Application No. 10-2014-7004685.
Dec. 30, 2017 Office Action issued in Chinese Application No. 201380003222.2.
Apr. 18, 2017 Office Action issued in Japanese Application No. 2015-197624.
Wireless Power Transfer and Infrastructure Construction for Electric Vehicles, CMC Publishing Co., Ltd on Mar. 11, 2011, (p. 7-36).
Oct. 17, 2017 Office Action issued in Japanese Application No. 2015-197624.

\* cited by examiner

INPHASE RESONANCE
MODE fL

ANTIPHASE RESONANCE
MODE fH

ALUMINUM PIECE ARRANGED IN POWER-RECEIVING RESONATOR (CIRCULAR) ALUMINUM PIECE 60

MAGNETIC FIELD
STRONG

WEAK

INPHASE RESONANCE
MODE fL

ANTIPHASE RESONANCE
MODE fH

ALUMINUM PIECE ARRANGED IN POWER-RECEIVING RESONATOR

MAGNETIC
FIELD
STRONG

WEAK

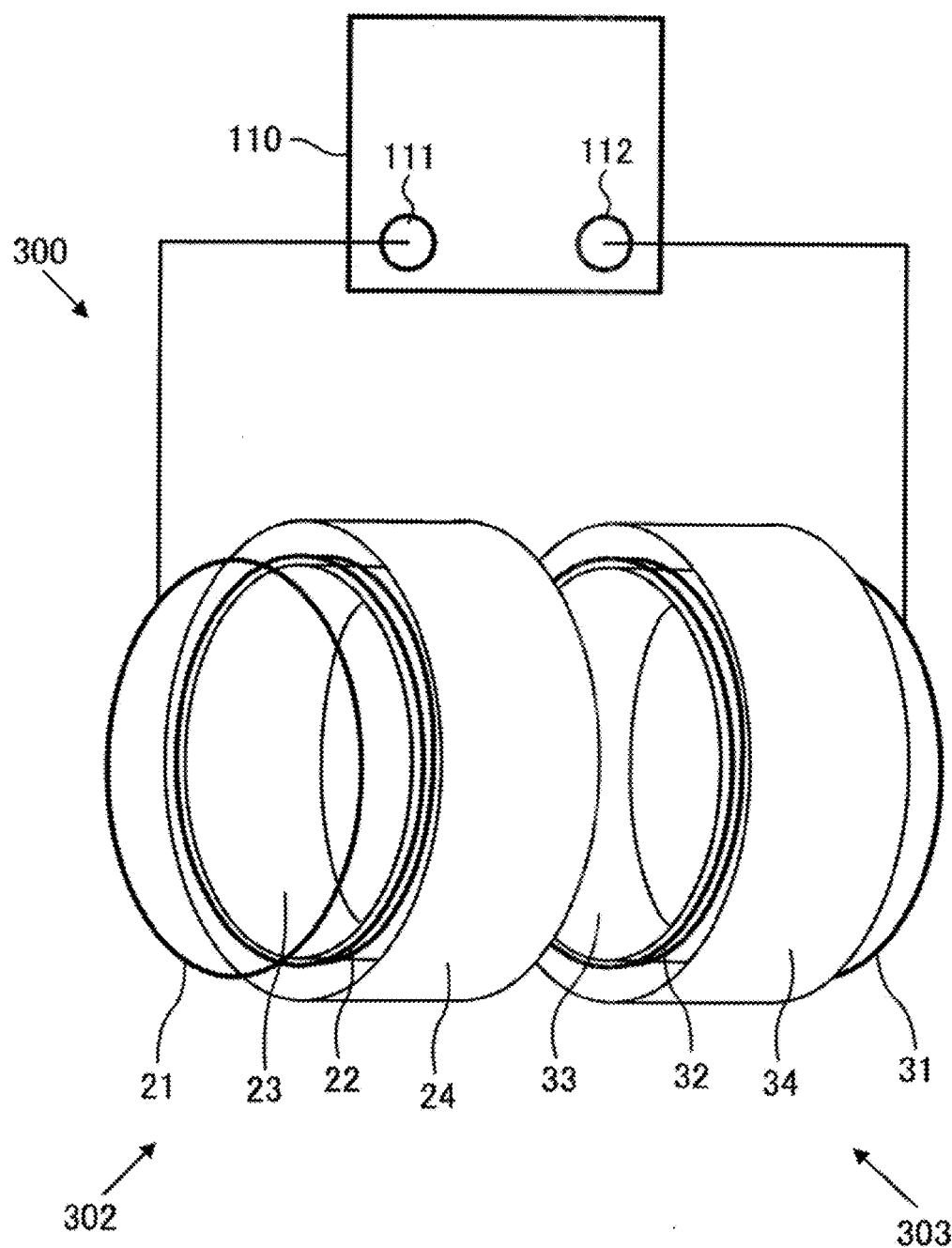

FIG.10(A)
INPHASE RESONANCE
MODE fL
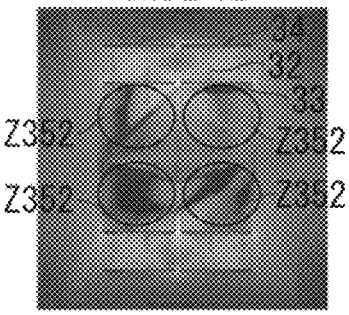
FIG.10(B)
ANTIPHASE RESONANCE
MODE fH
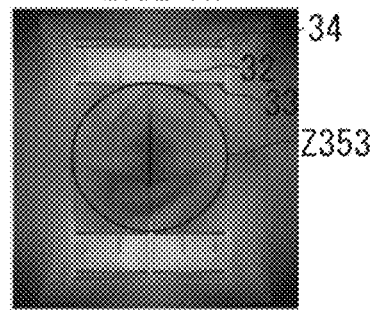
ALUMINUM PIECE ARRANGED IN POWER-RECEIVING RESONATOR
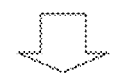 
FIG.10(C)
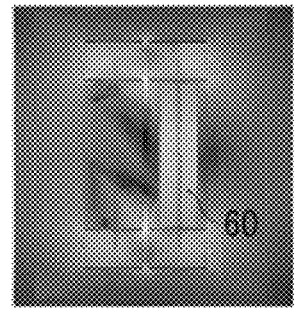
FIG.10(D)
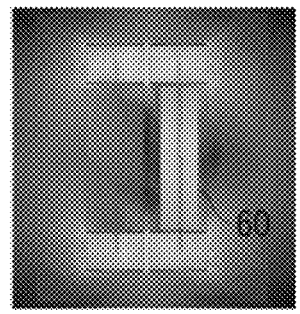
MAGNETIC FIELD
STRONG
WEAK INPHASE RESONANCE
MODE fL ANTIPHASE RESONANCE
MODE fH

ALUMINUM PIECE ARRANGED IN POWER-RECEIVING RESONATOR

MAGNETIC
FIELD
STRONG

WEAK

FIG.15(A) INPHASE RESONANCE MODE fL
FIG.15(B) ANTIPHASE RESONANCE MODE fH
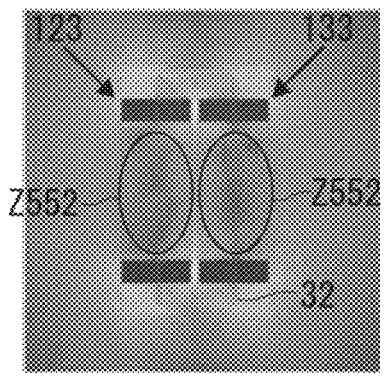
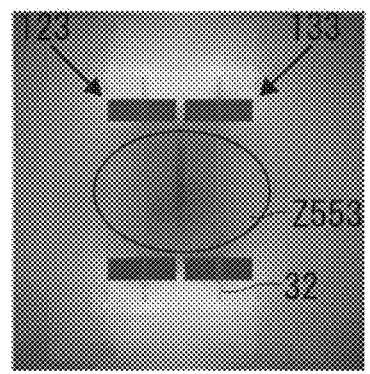
ALUMINUM PIECE ARRANGED IN POWER-RECEIVING RESONATOR
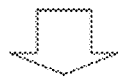
FIG.15(C)
FIG.15(D)
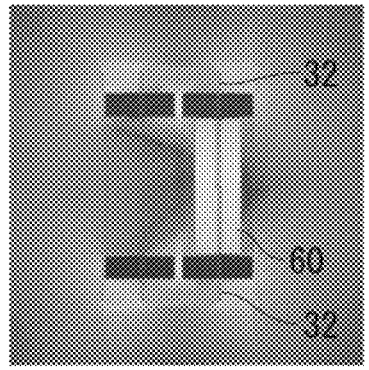
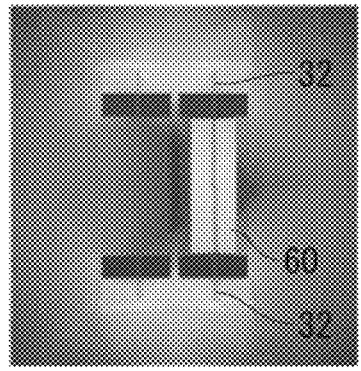
MAGNETIC FIELD
STRONG
WEAK INPHASE RESONANCE MODE fL ANTIPHASE RESONANCE MODE fH

ALUMINUM PIECE ARRANGED IN POWER-RECEIVING RESONATOR

MAGNETIC FIELD
STRONG

WEAK

FIG.20(A) INPHASE RESONANCE MODE fL
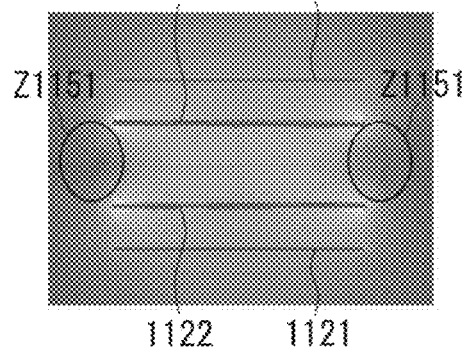
FIG.20(B) ANTIPHASE RESONANCE MODE fH
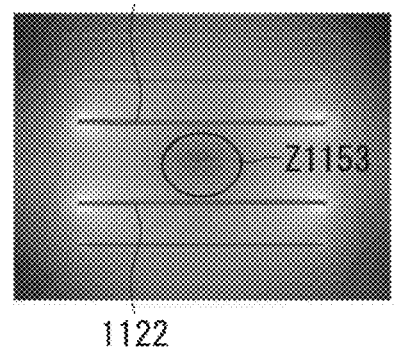
ALUMINUM PIECE ARRANGED IN POWER-RECEIVING RESONATOR
FIG.20(C)
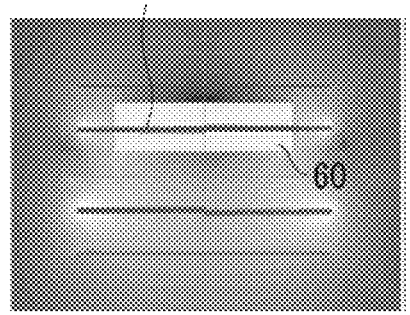
FIG.20(D)
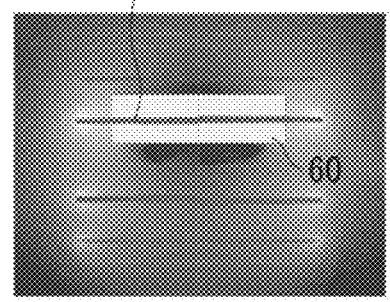
MAGNETIC FIELD
STRONG
WEAK INPHASE RESONANCE
MODE fL
1233 1232 1231

1222

ANTIPHASE RESONANCE
MODE fH
1233 1232 1231

Z1253

ALUMINUM PIECE ARRANGED IN POWER-RECEIVING RESONATOR 1233 1232

1233 1232

MAGNETIC
FIELD
STRONG

WEAK

FIG.26(A) INPHASE RESONANCE MODE fL
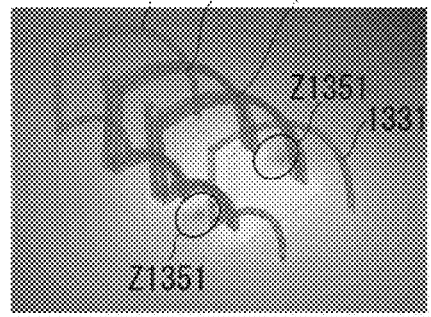
FIG.26(B) ANTIPHASE RESONANCE MODE fH
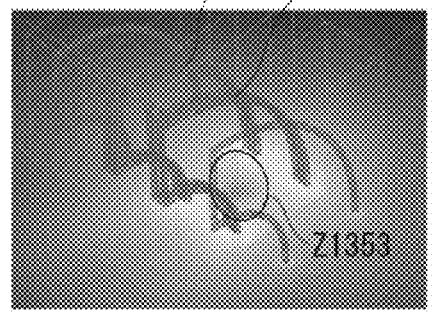
ALUMINUM PIECE ARRANGED IN POWER-RECEIVING RESONATOR
FIG.26(C)
FIG.26(D)
MAGNETIC FIELD STRONG — WEAK FIG. 29(A)
INPHASE RESONANCE
MODE fL
FIG. 29(B)
ANTIPHASE RESONANCE
MODE fH
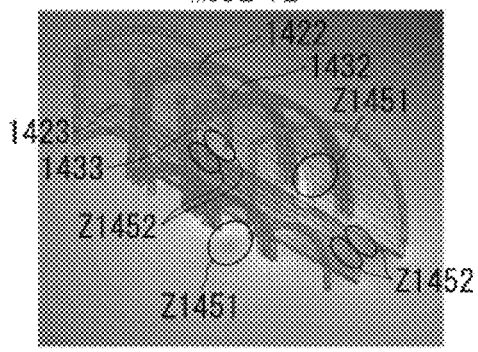 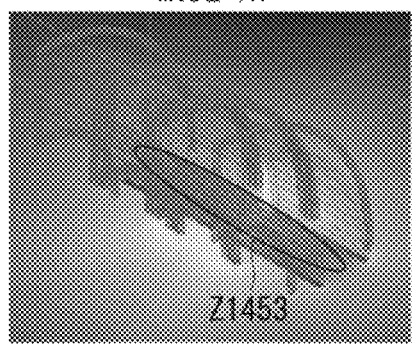
ALUMINUM PIECE ARRANGED IN POWER-RECEIVING RESONATOR
FIG. 29(C)
FIG. 29(D)
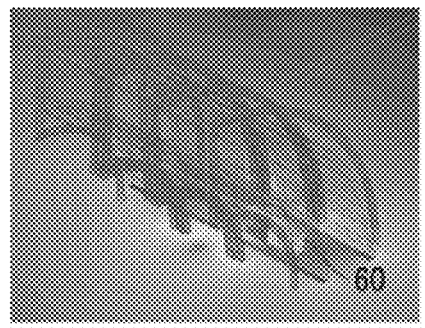 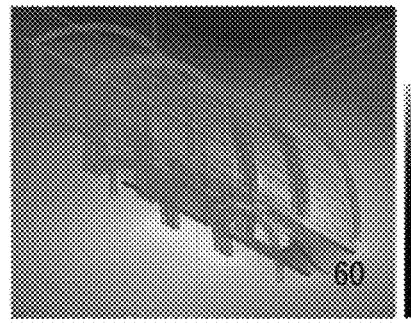
MAGNETIC
FIELD
STRONG
WEAK INPHASE RESONANCE
MODE fL ANTIPHASE RESONANCE
MODE fH

ALUMINUM PIECE ARRANGED IN POWER-RECEIVING RESONATOR

MAGNETIC
FIELD
STRONG

WEAK

INPHASE RESONANCE
MODE fL

ANTIPHASE RESONANCE
MODE fH

ALUMINUM PIECE ARRANGED IN POWER-RECEIVING RESONATOR

MAGNETIC FIELD
STRONG

WEAK

METHOD FOR FORMING MAGNETIC FIELD SPACE

TECHNICAL FIELD

The present invention relates to a method for forming a magnetic field space with relatively small magnetic field strength.

BACKGROUND ART

Electronic devices such as laptop PCs, tablet PCs, digital cameras, and mobile phones, which are portable while being used by the user are rapidly increasing in recent years. Many of these electronic devices have therein a rechargeable battery, which requires periodical charging. To facilitate the work for charging the rechargeable battery of an electronic device, there are an increasing number of devices for charging rechargeable batteries by using a power-supplying technology (wireless power transmission technology performing power transmission by varying the magnetic field) that performs wireless power transmission between a power-supplying device and a power-receiving device mounted in an electronic device.

Examples of such a wireless power transmission technology includes: a technology that performs power transmission by means of electromagnetic induction between coils (e.g. see PTL 1) and a technology that performs power transmission by means of resonance phenomena between resonators (coils) provided to the power-supplying device and the power-receiving device (e.g. see PTL 2).

Meanwhile, there is a demand for further downsizing (more compact structures for) the electronic devices such as laptop PCs, tablet PCs, digital cameras, and mobile phones, which are portable while being used by the user, in order to improve the portability.

To achieve more compact electronic devices, while adopting a wireless power transmission technology, a conceivable approach is to accommodate a charge-related electronic component such as a rectifier and a rechargeable battery on an inner circumference side (inside) of the coil used for the wireless power transmission technology.

In the wireless power transmission technology however, a magnetic field occurs around the coil used. The occurrence of the magnetic field leads to an eddy current at the charge-related electronic component such as the rectifier, and the rechargeable battery accommodated on the inner circumference side (inside) of the coil, which generates heat and gives negative influence to the charge-related electronic component.

To address this issue, for example, PTL 3 discloses a power-receiving device having a rechargeable battery (secondary battery), in which influence of the magnetic flux is reduced with a magnetic foil member arranged between a spiral coil and a rectifier of the power-receiving device.

CITATION LIST

Patent Literature

[PTL 1] Japanese patent No. 4624768
[PTL 2] Japanese Unexamined Paten Publication No. 239769/2010
[PTL 3] International Publication No. 2007/080820

SUMMARY OF INVENTION

Technical Problem

As shown in FIG. 3 of PTL 3, although the secondary battery 13 is accommodated inside the electronic device 1, the circuit substrate 15 itself is arranged outside the power-receiving coil 11 and the structure is not sufficiently made compact. For the secondary battery 13 accommodated inside the power-receiving coil 11, the magnetic foil member 16 between the secondary battery 13 and the power-receiving coil 11 reduces the influences from the magnetic flux generated by the power-receiving coil 11. However, referring to FIG. 16 of PTL 3, no magnetic foil member 16 is adopted on the side of the power-supplying device 30. Therefore, the secondary battery 13 accommodated inside the power-receiving coil 11 is influenced by the magnetic flux generated by the power-supplying coil 31 on the side of the power-supplying device 30, at the time of power transmission, and the effect of shielding the magnetic flux for the secondary battery 13 is believed to be insufficient.

In view of the above problem, the present invention is made, and it is an object of the present invention to provide a method of intentionally forming, at a desirable location around coils, a magnetic field space with a weak magnetic field strength which shields the magnetic field occurring around the coil at the time of conducting power transmission while varying the magnetic field between a coil of the power-supplying module and a coil of the power-receiving module.

Technical Solution

An aspect of the present invention to achieve the above object is a method of forming a magnetic field space, including: arranging one of coils of a power-supplying module and one of coils of a power-receiving module so as to face each other; arranging a magnetic member so as to cover at least partially surfaces of the one of coils of a power-supplying module and the one of coils of a power-receiving module except for surfaces facing each other; conducting power transmission between the one of coils of the power-supplying module and the one of coils of the power-receiving module while varying a magnetic field so as to form, in a desirable location, a magnetic field space whose magnetic field strength is smaller than magnetic field strength of areas other than the desirable location.

With the method, the magnetic member covers at least partially the surfaces of the one of coils of a power-supplying module and the one of coils of a power-receiving module except for surfaces facing each other. The magnetic member shields the magnetic field occurring around the coils of the power-supplying module and the power-receiving module at the time of conducting power transmission between the one of coils of the power-supplying module and the one of coils of the power-receiving module while varying a magnetic field so as to form, in a desirable location, a magnetic field space whose magnetic field strength is smaller than magnetic field strength of areas other than the desirable location.

As described, with the method, it is possible to form, in a desirable location around the coils of the power-supplying module and the power-receiving module, a magnetic field space whose magnetic field strength is smaller than the magnetic field strength of areas other than the desirable location. For example, when a rectifier for rectifying AC power received by the coil of the power-receiving module, a rechargeable battery for storing the DC power from the rectifier, an electronic device, or the like are accommodated in a magnetic field space with relatively small magnetic field strength, these components are prevented from generating heat, because eddy current attributed to the magnetic field is restrained. Further, accommodating the rectifier, the rechargeable battery, the electronic device, or the like in the magnetic field space with relatively small magnetic field strength allows a compact structure while preventing heat generation of these components.

Another aspect of the present invention to achieve the above object is the method adapted so that the magnetic member is arranged so as to cover an inner circumferential surface of the one of the coils of the power-supplying module and/or the one of the coils of the power-receiving module.

With the method, it is possible to shield the magnetic field occurring on the inner circumference side of the coil of the power-supplying module and/or the coil of the power-receiving module, and form a magnetic field space with relatively small magnetic field strength on the inner circumference side of the coil of the power-supplying module and/or the coil of the power-receiving module.

Another aspect of the present invention to achieve the above object is the method adapted so that the magnetic member is arranged so as to cover an outer circumferential surface of the one of the coils of the power-supplying module and/or the one of the coils of the power-receiving module.

With the method, it is possible to shield the magnetic field occurring on the outer circumference side of the coil of the power-supplying module and/or the coil of the power-receiving module, and form a magnetic field space with relatively small magnetic field strength on the outer circumference side of the coil of the power-supplying module and/or the coil of the power-receiving module.

Another aspect of the present invention to achieve the above object is the method adapted so that the magnetic member is arranged so as to cover surfaces of the one of the coils of the power-supplying module and the one of the coils of the power-receiving module opposite to the surfaces of these coils facing each other.

With the method, it is possible to shield the magnetic field occurring nearby the surfaces of the coil of the power-supplying module and the coil of the power-receiving module opposite to the surfaces of these coils facing each other, and form a magnetic field space with relatively small magnetic field strength nearby the surfaces of the coil of the power-supplying module and the coil of the power-receiving module opposite to the surfaces of these coils facing each other.

Another aspect of the present invention to achieve the above object is the method adapted so that the power transmission is conducted from the coil of the power-supplying module to the coil of the power-receiving module by means of resonance.

By conducting the power transmission by means of resonance between the coils, it is possible to form, in a desirable location around the coils of the power-supplying module and the power-receiving module, a magnetic field space whose magnetic field strength is smaller than the magnetic field strength of areas other than the desirable location.

Another aspect of the present invention to achieve the above object is the method adapted so that the coils of the power-supplying module are a power-supplying coil and a power-supplying resonator; the coils of the power-receiving module are a power-receiving coil and a power-receiving resonator; power feeded to the power-supplying coil is feeded to the power-supplying resonator by means of electromagnetic induction, the power feeded to the power-supplying resonator is transmitted as a magnetic field energy from the power-supplying resonator to the power-receiving resonator by having the power-supplying resonator resonating with the power-receiving resonator, and the power transmitted to the power-receiving resonator is fed to the power-receiving coil by means of electromagnetic induction, thereby performing power transmission.

By conducting power transmission by means of magnetic field resonance, using the power-supplying coil, the power-supplying resonator, the power-receiving coil, and the power-receiving resonator, it is possible to form, in a desirable location around the power-supplying module and the power-receiving module, a magnetic field space whose magnetic field strength is smaller than the magnetic field strength of areas other than the desirable location.

Advantageous Effects

There is provided a method of intentionally forming, at a desirable location around coils, a magnetic field space with a weak magnetic field strength which shields the magnetic field occurring around the coil at the time of conducting power transmission while varying the magnetic field between a coil of the power-supplying module and a coil of the power-receiving module.

BRIEF DESCRIPTION OF DRAWINGS

FIG. 8 is a diagram showing a structure of a wireless power supply system related to an example 2.

FIG. 10 is a diagram showing distribution of magnetic field strength related to the example 2.

FIG. 15 is a diagram showing distribution of magnetic field strength related to the example 4.

FIG. 20 is a diagram showing distribution of magnetic field strength related to the second comparative example.

FIG. 26 is a diagram showing distribution of magnetic field strength related to the third comparative example.

FIG. 29 is a diagram showing distribution of magnetic field strength related to the third example.

DESCRIPTION OF EMBODIMENTS

The following describes examples and embodiments of a method of the present invention for forming a magnetic field space.

(Overview)

Figure 1:
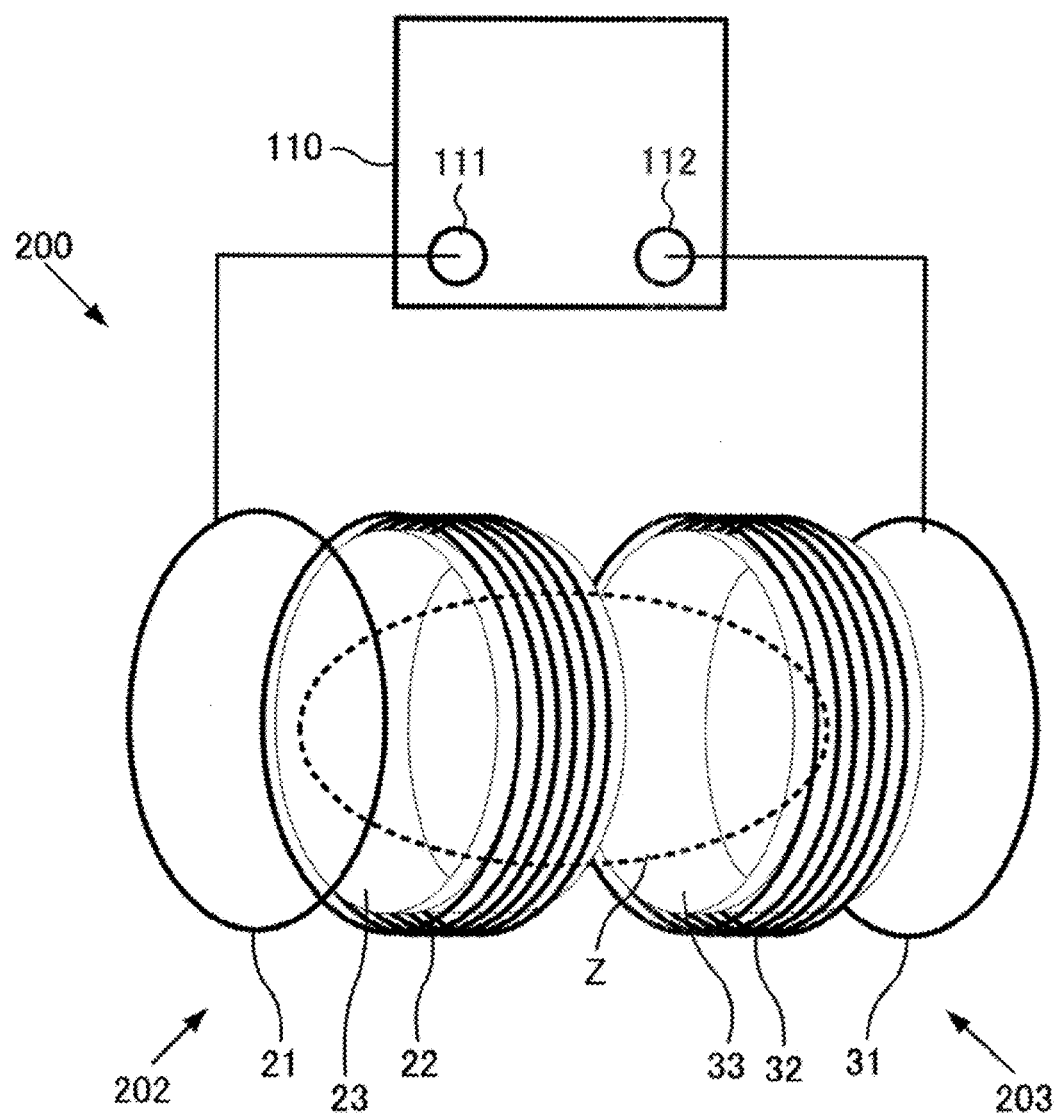
FIG. 1 is a schematic explanatory diagram of a method of forming a magnetic field space.

A method of the present invention for forming a magnetic field space is implemented in, for example, a wireless power supply system 200 shown in FIG. 1. The wireless power supply system 200 essentially includes: a power-supplying module 202 having a power-supplying coil 21 and a power-supplying resonator 22; and a power-receiving module 203 having a power-receiving coil 31 and a power-receiving resonator 32. The power-supplying resonator 22 and the power-receiving resonator 32 each adopt a solenoid coil. The power-supplying resonator 22 and the power-receiving resonator 32 are arranged so that their coil surfaces face each other. Further, on the inner circumferential surface side of the coil of the power-supplying resonator 22, a cylindrical magnetic member 23 which covers the inner circumferential surface of the coil is arranged. Similarly, the magnetic member 33 is arranged on the inner circumferential surface side of the coil of the power-receiving resonator 32 so as to cover the entire inner circumferential surface of the coil. Further, the power-supplying coil 21 of the power-supplying module 202 and a later-described output terminal 111 of a network analyzer 110 are connected by wiring and are therefore capable of outputting AC power of any frequency from the output terminal 111 to the power-supplying coil 21. The power-receiving coil 31 of the power-receiving module 203 and an input terminal 112 of the network analyzer 110 are connected by wiring so as to enable measurement of the power input to from the power-receiving coil 31 to the input terminal 112. Power transmission is conducted from the power-supplying resonator 22 of the power-supplying module 202 to the power-receiving resonator 32 of the power-receiving module 203 by means of resonance therebetween while varying the magnetic field. Magnetic fields generated around the power-supplying resonator 22 and the power-receiving resonator 32 is shielded by the magnetic members 23 and 33. This way, a magnetic field space Z is formed on the inner circumferential surface sides (desirable location) of the coils of the power-supplying resonator 22 and the power-receiving resonator 32. The magnetic field space Z thus formed has a smaller magnetic field strength than that in areas other than the inner circumferential surface sides of the coils.

The power-supplying resonator 22 and the power-receiving resonator 32 are each a resonator adopting a coil, and examples thereof include a spiral coil, a solenoid coil, and a loop coil. Further, the "resonance" is a phenomenon in which two or more coils are tuned to a resonance frequency. Arrangement of the coils to face each other means arranging the coils so that their coil surfaces do not perpendicularly cross each other, where each of the coil surfaces is a cross section of the coil taken along its radial direction. By the "desirable location", it means a space on the inner circumference side or the outer circumference side of the coil (power-supplying resonator 22) of the power-supplying module 202 or the coil (power-receiving resonator 32) of the power-receiving module 203.

(First Example)

Measurements were conducted in each of comparative example and examples 1 to 3 for the magnetic field strength or the like of the magnetic field space Z formed by a wireless power supply system in which the power-supplying resonator 22 of the power-supplying module 202 and the power-receiving resonator 32 of the power-receiving module 203 are arranged to face each other and a magnetic member is arranged to cover at least partially the surfaces of the resonators except for the surfaces facing each other, as in the wireless power supply system 200. These measurements are described as the first example. In the measurements of the magnetic field strength or the like of the magnetic field space Z. The comparative example and the examples 1 to 3 uses wireless power supply systems 100, 200, 300, and 400 were used (see FIG. 2, FIG. 5, FIG. 8, FIG. 11).

Figure 2:
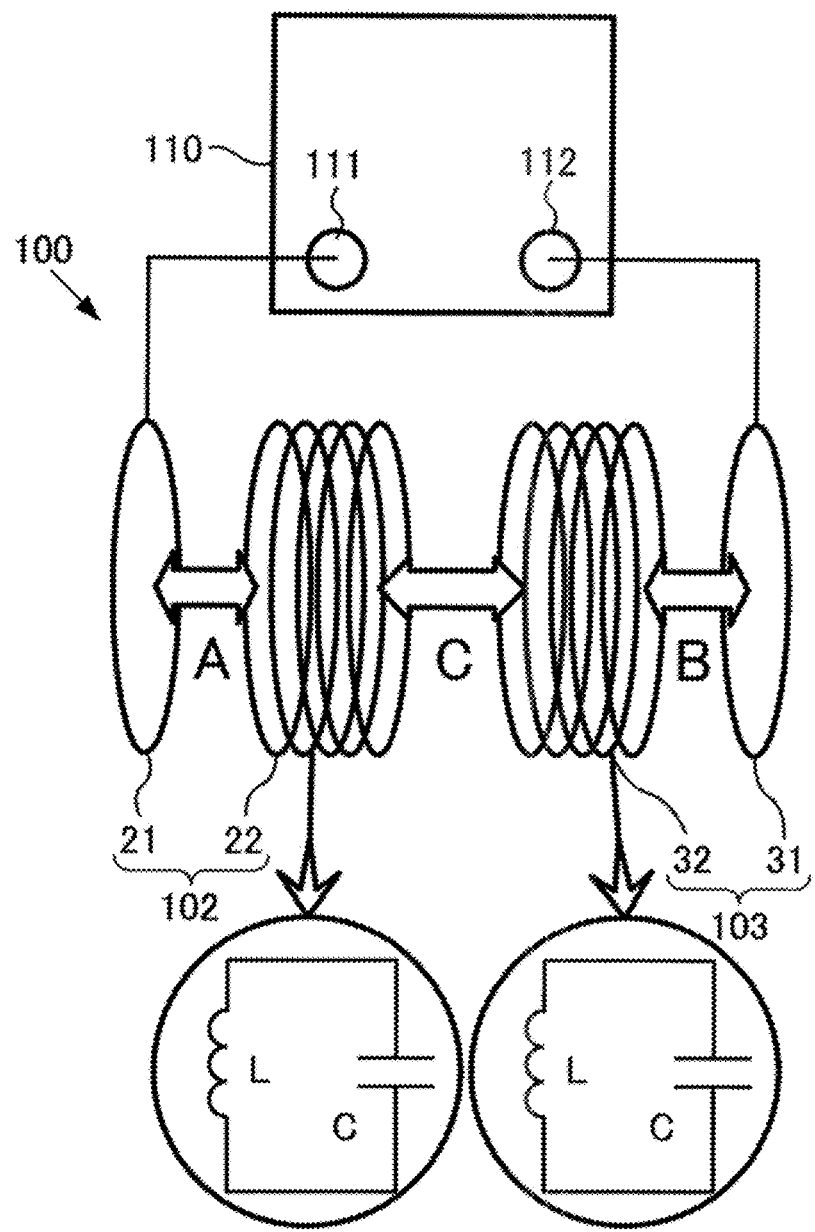
FIG. 2 is a diagram showing a structure of a wireless power supply system related to a comparative example.

Specifically, in the comparative example, a wireless power supply system 100 having the power-supplying module 102 and the power-receiving module 103 each of which having no magnetic member as shown in FIG. 2 was used for forming the magnetic field space Z. For this magnetic field space Z, variation in the magnetic field strength and that in the transmission characteristic "S21" were measured. The measurement was conducted with a metal piece arranged on the inner circumference side of the coil of the power-receiving resonator 32, and without the metal piece.

Figure 5:
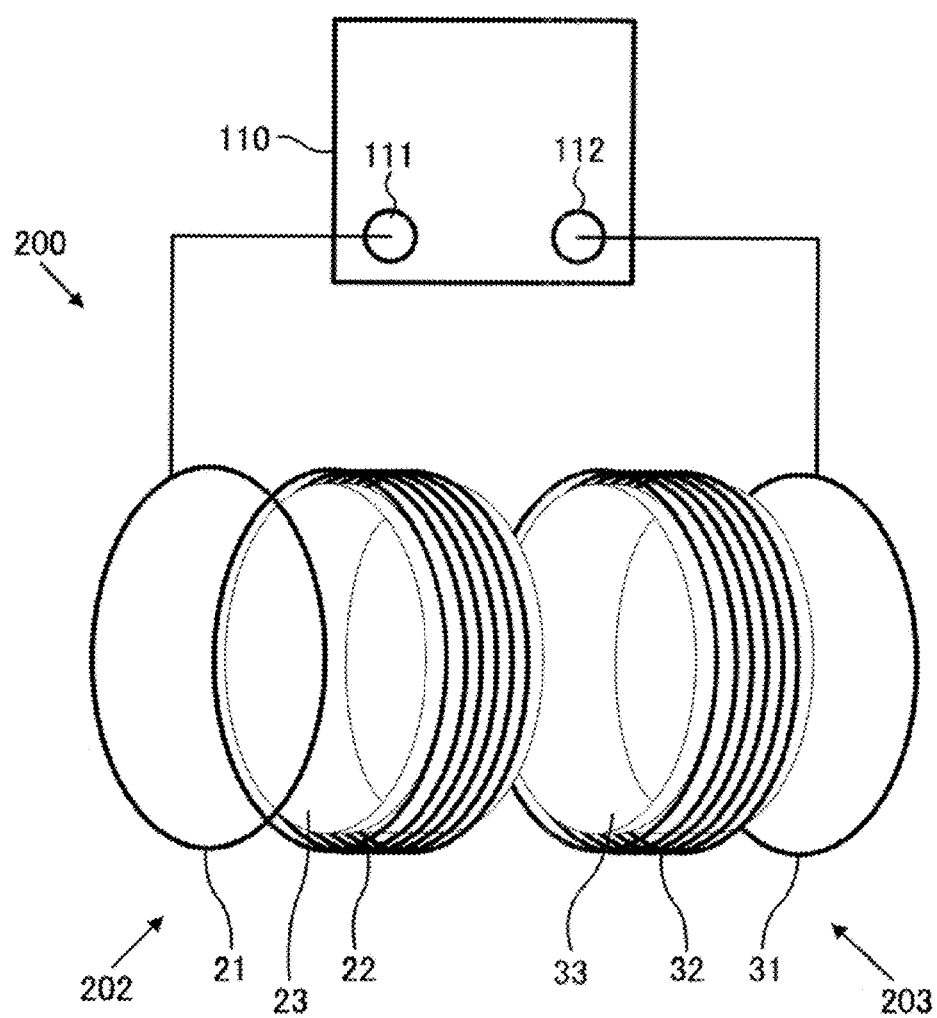
FIG. 5 is a diagram showing a structure of a wireless power supply system related to an example 1.

In the example 1, a wireless power supply system 200 as shown in FIG. 5 having a power-supplying module 202 and the power-receiving module 203 respectively having a power-supplying resonator 22 and a power-receiving resonator 32 was used. In the power-supplying resonator 22 and the power-receiving resonator 32, cylindrical magnetic members 23 and 33 were arranged respectively to cover the entire inner circumferential surfaces of the resonators. Using this wireless power supply system 200 the magnetic field space Z was formed, and for this magnetic field space Z, variation in the magnetic field strength and that in the transmission characteristic "S21" were measured. The measurement was conducted with a metal piece arranged on the inner circumference side of the coil of the power-receiving resonator 32, and without the metal piece.

In the example 2, a wireless power supply system 300 as shown in FIG. 8 having a power-supplying module 302 and the power-receiving module 303 respectively having a power-supplying resonator 22 and a power-receiving resonator 32 was used. In the power-supplying resonator 22 and the power-receiving resonator 32, cylindrical magnetic members 23 and 33 were arranged respectively to cover the entire inner circumferential surfaces of the resonators. Further, cylindrical magnetic members 24 and 34 were provided to cover the entire outer circumferential surfaces of the power-supplying resonator 22 and the power-receiving resonator 32. Using this wireless power supply system 300 the magnetic field space Z was formed, and for this magnetic field space Z, variation in the magnetic field strength and that in the transmission characteristic "S21" were measured. The measurement was conducted with a metal piece arranged on the inner circumference side of the coil of the power-receiving resonator 32, and without the metal piece.

Figure 11:
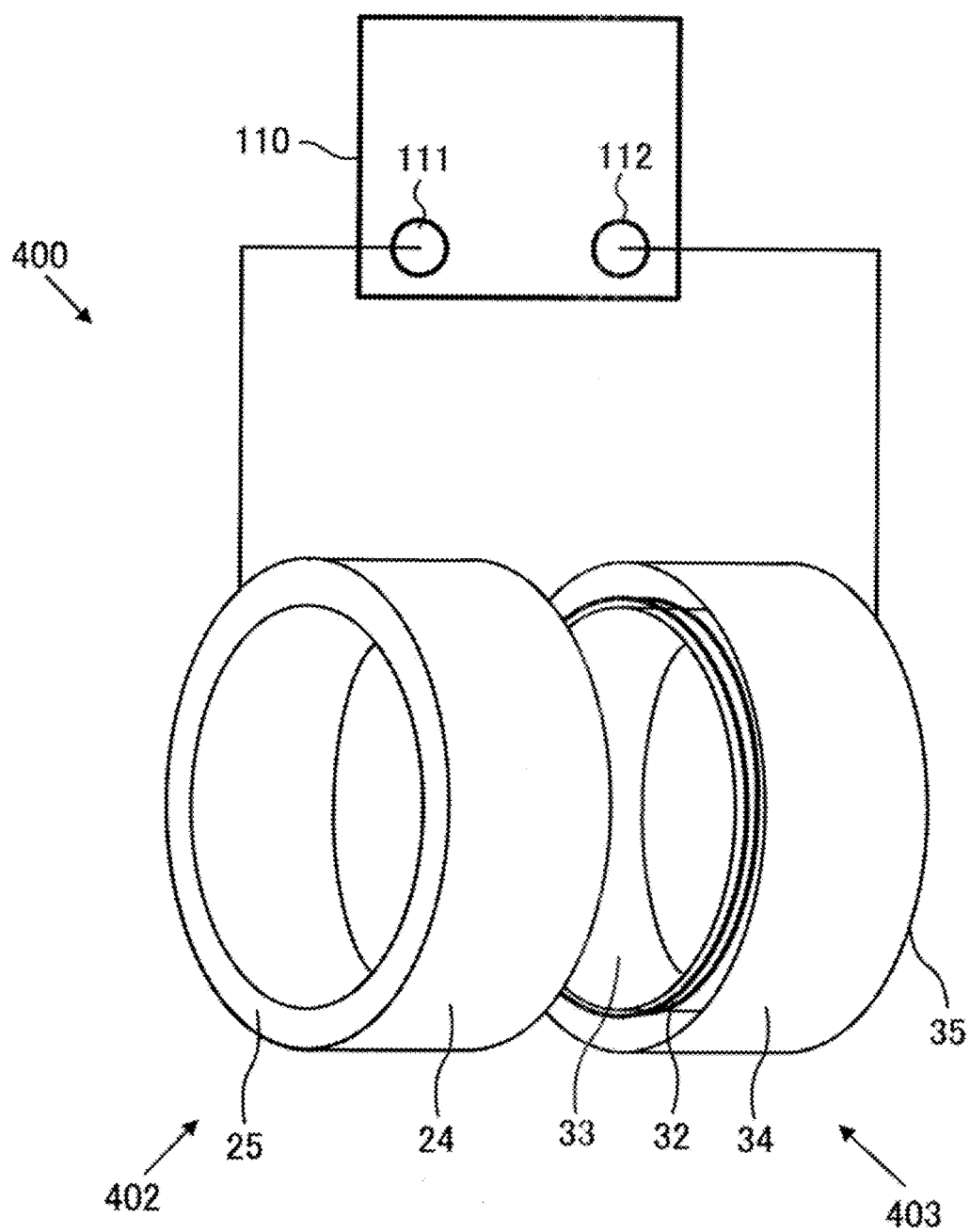
FIG. 11 is a diagram showing a structure of a wireless power supply system related to an example 3.

In the example 3, a wireless power supply system 400 as shown in FIG. 11 having a power-supplying module 402 and the power-receiving module 403 respectively having a power-supplying resonator 22 and a power-receiving resonator 32 was used. In the power-supplying resonator 22 and the power-receiving resonator 32, cylindrical magnetic members 23 and 33 were arranged respectively to cover the entire inner circumferential surfaces of the resonators. Further, cylindrical magnetic members 24 and 34 were provided to cover the entire outer circumferential surfaces of the power-supplying resonator 22 and the power-receiving resonator 32. Further, ring-shaped magnetic members 25 and 35 were provided to cover the side surfaces of the power-supplying resonator 22 and the power-receiving resonator 32 opposite to the surfaces of the resonators facing each other. Using this wireless power supply system 400 the magnetic field space Z was formed, and for this magnetic field space Z, variation in the magnetic field strength and that in the transmission characteristic "S21" were measured. The measurement was conducted with a metal piece arranged on the inner circumference side of the coil of the power-receiving resonator 32, and without the metal piece.

(Structure of Wireless Power Supply System 100 Related to Comparative Example)

The wireless power supply system 100 used in the comparative example includes: the power-supplying module 102 having the power-supplying coil 21 and the power-supplying resonator 22; and the power-receiving module 103 having the power-receiving coil 31 and the power-receiving resonator 32, as shown in FIG. 2. To the power-supplying coil 21 was connected an output terminal 111 of a network analyzer 110 (produced by Agilent Technologies, Inc.). To the power-receiving coil 31 was connected an input terminal 112 of the network analyzer 110. When power is supplied to the power-supplying module 102 in the wireless power supply system 100 with the above-described structure, the power is supplied as magnetic field energy from the power-supplying resonator 22 to the power-receiving resonator 32 by means of resonance.

The network analyzer 110 is capable of outputting from its output terminal 111 AC power of any given frequency to the power-supplying coil 21. The network analyzer 110 is also capable of measuring the power input from the power-receiving coil 31 to the input terminal 112. Further, the network analyzer 110 is also capable of measuring the transmission characteristic "S21" shown in FIG. 3.

The power-supplying coil 21 plays a role of supplying power obtained from the network analyzer 110 to the power-supplying resonator 22 by means of electromagnetic induction. The power-supplying coil 21 was formed by winding once a copper wire material (coated by insulation film) having a wire diameter of 1 mmφ, and its coil diameter was set to 100 mmφ.

The power-receiving coil 31 plays a role of outputting the power transmitted as magnetic field energy from the power-supplying resonator 22 to the power-receiving resonator 32 to the input terminal 112 of the network analyzer 110 by means of electromagnetic induction. This power-receiving coil 31, as in the case of the power-supplying coil 21, was formed by winding once a copper wire material (coated by insulation film) having a wire diameter of 1 mmφ, and its coil diameter was set to 100 mmφ.

The power-supplying resonator 22 and the power-receiving resonator 32 are each an LC resonance circuit, and play a role of creating the magnetic field resonant state. In this example, the capacitor component of the LC resonance circuit was realized in the form of an element. However, the capacitor component may be a stray capacitance realized by making the both ends of the coil open. In this LC resonance circuit, the resonance frequency is f which is derived from (formula 1) below, where the inductance is L, and the capacity of capacitor is C.

$$f=1/(2\pi\sqrt{(LC)}) \qquad \text{(Formula 1)}$$

The power-supplying resonator 22 and the power-receiving resonator 32 were each a solenoid coil formed by winding three times a copper wire material (coated by insulation film) having a wire diameter of 1 mmφ, with its coil diameter being 100 mmφ. The resonance frequency of the power-supplying resonator 22 and the power-receiving resonator 32 was set to 13.0 MHz. The power-supplying resonator 22 and the power-receiving resonator 32 were arranged so that their coil surfaces face each other in parallel.

As described, when the resonance frequency of the power-supplying resonator 22 and that of the power-receiving resonator 32 are the same (resonant), the magnetic field resonant state is formed between the power-supplying resonator 22 and the power-receiving resonator 32. With the magnetic field resonant state between the power-supplying resonator 22 and the power-receiving resonator 32 resonating with each other, power transmission from the power-supplying resonator 22 to the power-receiving resonator 32 as the magnetic field energy becomes possible.

The distance A between the power-supplying coil 21 and the power-supplying resonator 22 was set to 15 mm, the distance B between the power-receiving coil 31 and the power-receiving resonator 32 was set to 15 mm, and the distance C between the power-supplying resonator 22 and the power-receiving resonator 32 was set to 30 mm (see FIG. 2).

Note that, in the measurements of the magnetic field strength and the transmission characteristic "S21" in the comparative example and the examples 1 to 3, a circular aluminum piece 60 made of aluminum having a thickness of 20 mm and a diameter of 76 mmφ was used as the metal piece to be arranged on the coil inner circumference side of the power-receiving resonator 32. Further, in the example 4 and the example 5, a circular aluminum piece 60 made of aluminum having a thickness of 20 mm and a diameter of 58 mmφ was used.

(Measurement Results of Comparative Example)

The following describes variation in the magnetic field strength and the transmission characteristic "S21" measured for the magnetic field space Z formed by the wireless power supply system 100 of the comparative example. The measurement was conducted with the aluminum piece 60 arranged on the inner circumference side of the coil of the power-receiving resonator 32, and without the aluminum piece 60. Note that, an electromagnetic field analysis was conducted to measure the magnetic field strength in the magnetic field space Z, and the magnetic field strengths are expressed in different color tones.

First, using the network analyzer 110, in the wireless power supply system 100 related to the comparative example, the transmission characteristic "S21" was measured without the aluminum piece 60 arranged on the inner circumference side of the coil of the power-receiving resonator 32, with various frequencies of the AC power to the wireless power supply system 100. As shown in the graph of FIG. 3, the horizontal axis indicates the frequency of the AC power output from the output terminal 111, and the vertical axis indicates the transmission characteristic "S21".

The transmission characteristic "S21" is indicated in units of decibel and indicates signals out of those from the output terminal 111 having passed the input terminal 112. Therefore, the higher the value, the higher the power transmission efficiency is. Further, the power transmission efficiency is a ratio of the power output to the input terminal 112, for the power supplied from the output terminal 111 to the power-supplying module, while the wireless power supply system 101 is connected to the network analyzer 110. The higher the transmission characteristic "S21", the higher the power transmission efficiency.

Figure 3:
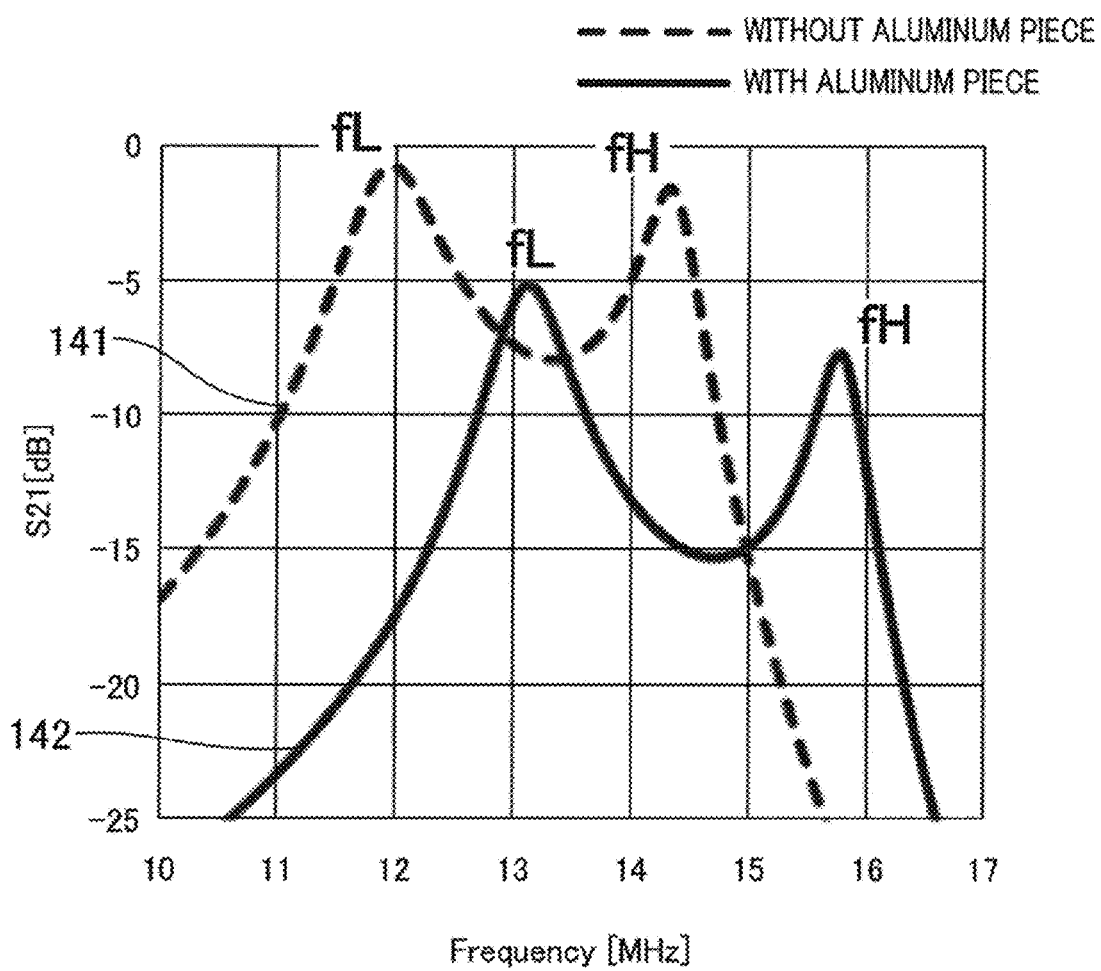
FIG. 3 is a graph indicating transmission characteristic S21 resulted from measurement in the comparative example.
Figure 4A:
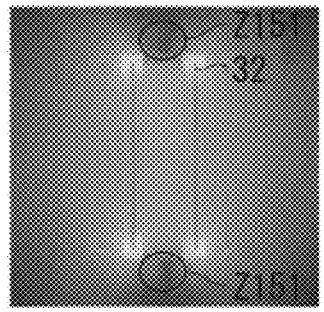
FIG. 4 is a diagram showing distribution of magnetic field strength related to the comparative example.
Figure 4B:
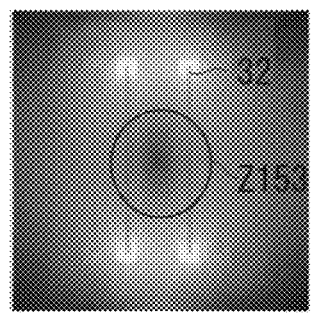
Figure 4C:
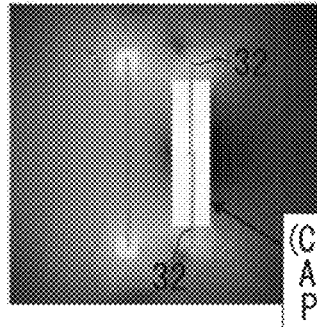
Figure 4D:
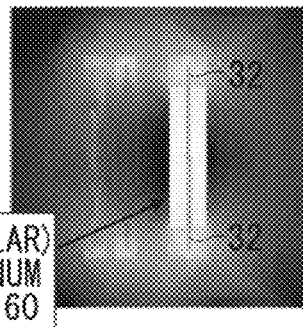

As the result of measurements, the transmission characteristic "S21" measured results in a waveform 141 having separate peaks on a low frequency side and a high frequency side as shown in FIG. 3. Of the separate peaks, the frequency on the high frequency side is indicated as fH, and the frequency on the low frequency side is indicated as fL.

When the frequency of the AC power to the power-supplying module 102 was set to the frequency fL nearby the peak on the low frequency side (inphase resonance mode), the power-supplying resonator 22 and the power-receiving resonator 32 were resonant with each other in inphase, and the current in the power-supplying resonator 22 and the current in the power-receiving resonator 32 both flowed in the same direction. The distribution of the magnetic field strength in this inphase resonance mode is shown in FIG. 4 (A). It should be understood from the distribution of magnetic field strength shown in FIG. 4 (A) that the influence of the magnetic field is weakened around the outer circumference sides of the power-supplying resonator 22 and the power-receiving resonator 32, and a magnetic field space Z151 having a relatively small magnetic field strength is confirmed. Note that the resonance state in which the current in the coil (power-supplying resonator 22) of the power-supplying module and the current in the coil (power-receiving resonator 32) of the power-receiving module both flow in the same direction is referred to as inphase resonance mode.

On the other hand, when the frequency of the AC power to the power-supplying module 102 was set to the frequency fH nearby the peak on the side of the high frequency side (antiphase resonance mode), the power-supplying resonator 22 and the power-receiving resonator 32 resonated with each other in antiphase, and the current in the power-supplying resonator 22 and the current in the power-receiving resonator 32 flowed opposite directions to each other. The distribution of magnetic field strengths in this antiphase resonance mode is shown in FIG. 4 (B). From the distribution of magnetic field strength shown in FIG. 4 (B), a magnetic field space Z153 with a relatively small magnetic field strength, which is less influenced by the magnetic field is confirmed around the inner circumference sides of the power-supplying resonator 22 and the power-receiving resonator 32. The resonance state in which the current in the coil (power-supplying resonator 22) of the power-supplying module and the current in the coil (power-receiving resonator 32) of the power-receiving module flow opposite directions to each other is referred to as antiphase resonance mode.

Next, in the wireless power supply system 100 related to the comparative example, the transmission characteristic "S21" was measured with the aluminum piece 60 arranged on the inner circumference side of the coil of the power-receiving resonator 32, with various frequencies of the AC power to the wireless power supply system 100.

The measurement results are shown in FIG. 3 as a waveform 142 representing the transmission characteristic "S21" measured with the aluminum piece 60 arranged on the inner circumference side of the power-receiving resonator 32. It should be understood from the waveform 142 that the transmission characteristic "S21" significantly lowers at the frequency fL nearby the peak on the low frequency side, as compared with the waveform 141 of the transmission characteristic "S21" in the case of not arranging the aluminum piece 60 on the inner circumference side of the coil of the power-receiving resonator 32. Similarly, it should be understood that the transmission characteristic "S21" significantly lowers at the frequency fH nearby the peak on the high frequency side, as compared with the waveform 141 of the transmission characteristic "S21" in the case of not arranging the aluminum piece 60 on the inner circumference side of the coil of the power-receiving resonator 32.

The distribution of magnetic field strength in the inphase resonance mode with the aluminum piece 60 on the inner circumference side of the coil of the power-receiving resonator 32 is shown in FIG. 4 (C). Further, the distribution of magnetic field strength in the antiphase resonance mode with the aluminum piece 60 on the inner circumference side of the coil of the power-receiving resonator 32 is shown in FIG. 4 (D). It should be understood from these figures, when the aluminum piece 60 is arranged on the inner circumference sides of the coils of the power-receiving resonator 32 in the wireless power supply system 100 related to the comparative example, the distribution of the magnetic field strength is directly influenced by the aluminum piece 60. In other words, the aluminum piece 60 is directly influenced by the magnetic field generated in the wireless power supply system 100.

(Structure of Wireless Power Supply System 200 Related to Example 1)

As shown in FIG. 5, the wireless power supply system 200 used in the example 1 includes: a power-supplying module 202 and a power-receiving module 203. The power-supplying module 202 includes: a power-supplying coil 21, a power-supplying resonator 22, and a cylindrical magnetic member 23 which covers the inner circumferential surface of the coil of the power-supplying resonator 22. The power-receiving module 203 includes: a power-receiving coil 31, a power-receiving resonator 32, and a cylindrical magnetic member 33 which covers the entire surface of the inner circumferential surface of the coil of the power-receiving resonator 32. As in the comparative example, the power-supplying coil 21 is connected to the output terminal 111 of the network analyzer 110, and the power-receiving coil 31 is connected to the input terminal 112 of the network analyzer 110.

The magnetic members 23 and 33 are made of a resin in which magnetic powder was dispersed therein. The resin used for the magnetic members 23 and 33 may be a thermosetting resin or a thermoplastic resin, and is not particularly limited. For example, examples of a thermosetting resin adoptable includes epoxy resin, phenol resin, melamine resin, vinyl ester resin, cyano ester resin, maleimide resin, silicon resin, and the like. Further, examples of a thermoplastic resin include acrylic resin, vinyl acetate based resin, poly vinyl alcohol based resin, and the like. In this example, a resin whose main constituent is epoxy resin was adopted.

As the magnetic powder dispersed in the resin, a soft magnetic powder was used. The soft magnetic powder is not particularly limited. For example, pure Fe, Fe—Si, Fe—Al—Si (sendust), Fe—Ni (permalloy), soft ferrites, Fe-base amorphous powder, Co-base amorphous powder, Fe—Co (permendur), and the like are adoptable.

The magnetic members 23 and 33 had a cylindrical shape with a thickness of 1 mm, an outer diameter of 80 mmφ, and an inner diameter of 78 mm. Its magnetic permeability was 100. The structures, other than those described above, were similar to that of the wireless power supply system 100 related to the comparative example.

(Measurement Result of Example 1)

For a magnetic field space Z formed by the wireless power supply system 200 related to an example 1, variations in its magnetic field strength and transmission characteristic "S21" were measured, with and without an aluminum piece 60 arranged on an inner circumference side of the coil of the power-receiving resonator 32. The results of the measurements are described below.

First, using the network analyzer 110, in the wireless power supply system 200 related to the example 1, the transmission characteristic "S21" was measured without the aluminum piece 60 arranged on the inner circumference side of the coil of the power-receiving resonator 32, with various frequencies of the AC power to the wireless power supply system 200.

Figure 6:
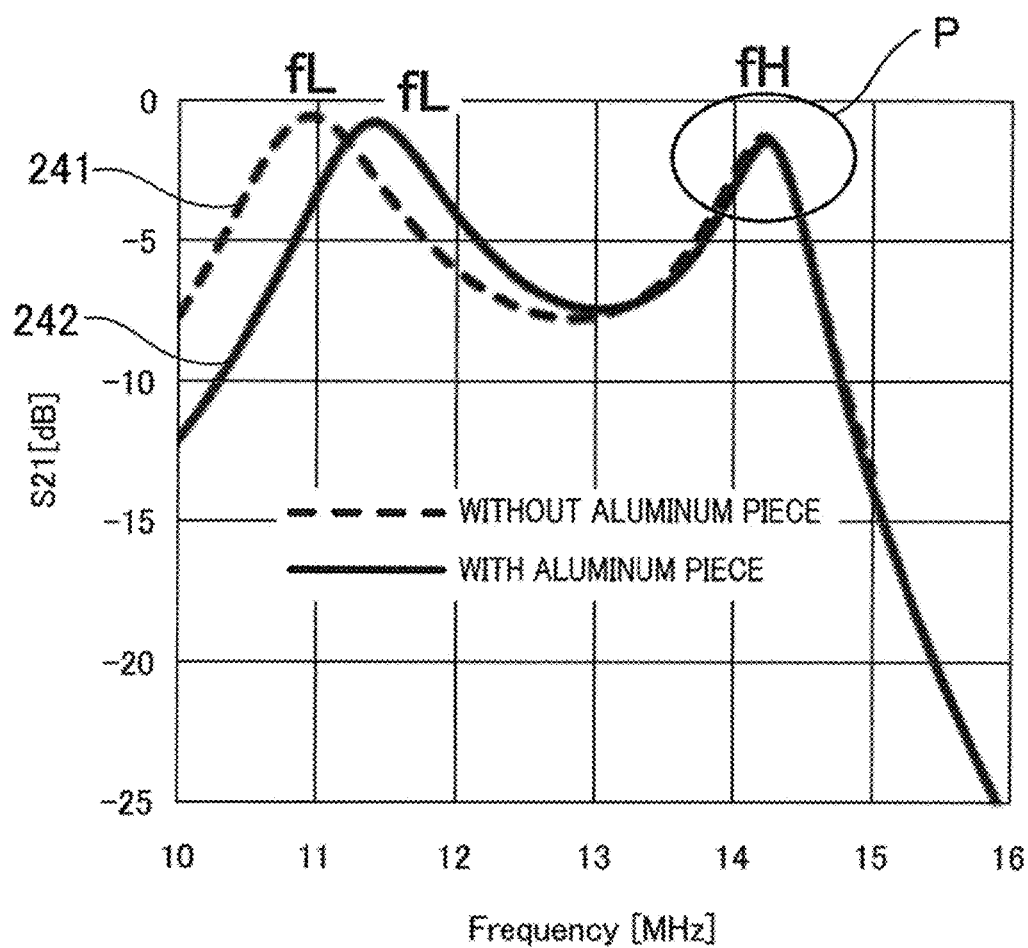
FIG. 6 is a graph indicating transmission characteristic S21 resulted from measurement in the example 1.
Figure 7A:
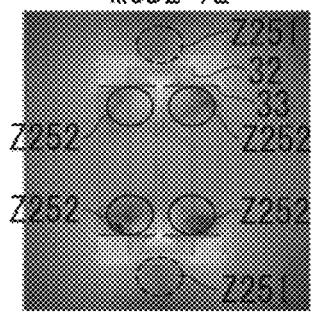
FIG. 7 is a diagram showing distribution of magnetic field strength related to the example 1.
Figure 7B:
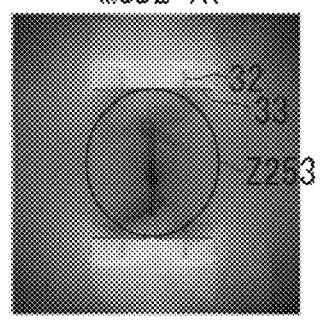
Figure 7C:
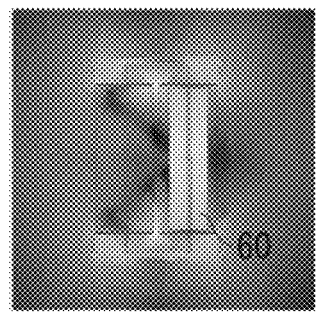
Figure 7D:
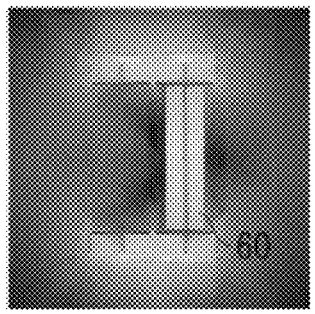

As the result of measurements, the transmission characteristic "S21" measured results in a waveform 241 having separate peaks on a low frequency side and a high frequency side as shown in FIG. 6.

The distribution of the magnetic field strength in the case of setting the frequency of the AC power to the power-supplying module 202 to the frequency fL nearby the peak on the low frequency side (inphase resonance mode) is shown in FIG. 7 (A). It should be understood from the distribution of magnetic field strength shown in FIG. 7 (A) that the influence of the magnetic field is weakened around the outer circumference sides of the power-supplying resonator 22 and the power-receiving resonator 32, and a magnetic field space Z251 having a relatively small magnetic field strength is confirmed. Further, a magnetic field space Z252 with magnetic field strength less influenced by the magnetic field was confirmed on the inner circumference side of each of the power-supplying resonator 22 and the power-receiving resonator 32. Thus, it is possible to form a magnetic field space Z252 whose magnetic field strength is relatively smaller than that in the comparative example on the inner circumference side of each of the power-supplying resonator 22 and the power-receiving resonator 32, in the inphase resonance mode.

Meanwhile, the distribution of the magnetic field strength in the case of setting the frequency of the AC power to the power-supplying module 202 to the frequency fH nearby the peak on the high frequency side (antiphase resonance mode) is shown in FIG. 7 (B). From the distribution of magnetic field strength shown in FIG. 7 (B), a magnetic field space Z253 with a relatively small magnetic field strength, which is less influenced by the magnetic field is confirmed around the inner circumference sides of the power-supplying resonator 22 and the power-receiving resonator 32. Thus, it is possible to form a magnetic field space Z253 whose magnetic field strength is relatively smaller than that in the comparative example on the inner circumference side of each of the power-supplying resonator 22 and the power-receiving resonator 32, in the antiphase resonance mode. The magnetic field space Z253 formed in the antiphase resonance mode was broader than the magnetic field space Z252 formed in the inphase resonance mode.

Next, in the wireless power supply system 200 related to the example 1, the transmission characteristic "S21" was measured with the aluminum piece 60 arranged on the inner circumference side of the coil of the power-receiving resonator 32, with various frequencies of the AC power to the wireless power supply system 200.

The measurement results are shown in FIG. 6 as a waveform 242 representing the transmission characteristic "S21" measured with the aluminum piece 60 arranged on the inner circumference side of the power-receiving resonator 32. Although the transmission characteristic "S21" at the frequency fL nearby the peak on the low frequency side shown by the waveform 242 is slightly lower than the transmission characteristic "S21" shown by the waveform 241 resulted with no aluminum piece 60 on the inner circumference side of the coil of the power-receiving resonator 32, it should be understood the transmission characteristic itself is maintained at a high value. The transmission characteristic "S21" at the frequency fH nearby the peak on the high frequency side, on the other hand, is substantially the same as the transmission characteristic "S21" shown by the waveform 241 resulting without no aluminum piece 60 on the inner circumference side of the coil of the power-receiving resonator 32 (see point P in FIG. 6).

The distribution of magnetic field strength in the inphase resonance mode with the aluminum piece 60 on the inner circumference side of the coil of the power-receiving resonator 32 is shown in FIG. 7 (C). Further, the distribution of magnetic field strength in the antiphase resonance mode with the aluminum piece 60 on the inner circumference side of the coil of the power-receiving resonator 32 is shown in FIG. 7(D). It should be understood from these figures, when the aluminum piece 60 is arranged on the inner circumference sides of the coils of the power-receiving resonator 32 in the wireless power supply system 200 related to the example 1, the distribution of the magnetic field strength is not influenced so much by the aluminum piece 60, as compared with the comparative example. In other words, when power transmission is conducted between the power-supplying module 202 and the power-receiving module 203, the magnetic members 23 and 33 blocks the magnetic field generated around the power-supplying resonator 22 and the power-receiving resonator 32, and the magnetic field space Z253 greater than the magnetic field space Z153 of the comparative example is formed on the inner circumference side of the coil of the power-supplying resonator 22 and the power-receiving resonator 32. Further, the aluminum piece 60 is less influenced by the magnetic field generated in the wireless power supply system 200.

(Structure of Wireless Power Supply System 300 of Example 2)

As shown in FIG. 8, the wireless power supply system 300 used in the example 2 includes: a power-supplying module 302 and a power-receiving module 303. The power-supplying module 302 includes: a power-supplying coil 21, a power-supplying resonator 22, a cylindrical magnetic member 23 which covers the entire inner circumferential surface of the coil of the power-supplying resonator 22, and a cylindrical magnetic member 24 which covers the entire outer circumferential surface of the coil of the power-supplying resonator 22. The power-receiving module 303 includes: a power-receiving coil 31, a power-receiving resonator 32, and a cylindrical magnetic member 33 which covers the entire inner circumferential surface of the coil of the power-receiving resonator 32, and a cylindrical magnetic member 34 which covers the entire outer circumferential surface of the coil of the power-receiving resonator 32. As in the example 1, the power-supplying coil 21 was connected to the output terminal 111 of the network analyzer 110, and the power-receiving coil 31 was connected to the input terminal 112 of the network analyzer 110.

The magnetic members 24 and 34 were made of a resin in which the magnetic powder was dispersed as in the case of the magnetic members 23 and 33 of the example 1. The magnetic members 24 and 34 each had a cylindrical shape, with a thickness of 1 mm, an outer diameter of 120 mmφ, and an inner diameter of 118 mmφ, and its magnetic permeability was 100. The structures, other than those described above, were similar to that of the wireless power supply system 200 related to the example 1.

(Measurement Result of Example 2)

For a magnetic field space Z formed by the wireless power supply system 300 related to the example 2, variations in its magnetic field strength and transmission characteristic "S21" were measured, with and without an aluminum piece 60 arranged on an inner circumference side of the coil of the power-receiving resonator 32. The results of the measurements are described below.

First, using the network analyzer 110, in the wireless power supply system 300 related to the example 2, the transmission characteristic "S21" was measured without the aluminum piece 60 arranged on the inner circumference side of the coil of the power-receiving resonator 32, with various frequencies of the AC power to the wireless power supply system 300.

Figure 9:
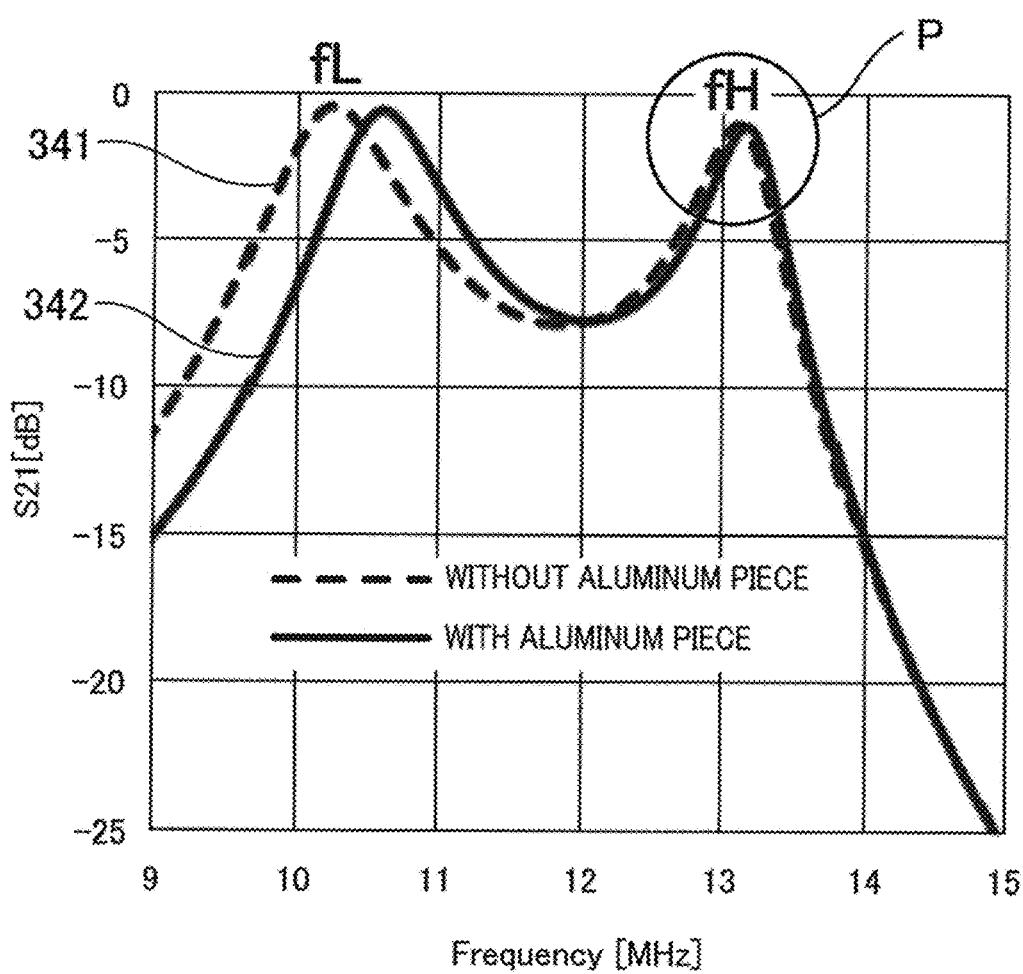
FIG. 9 is a graph indicating transmission characteristic S21 resulted from measurement in the example 2.

As the result of measurements, the transmission characteristic "S21" measured results in a waveform 341 having separate peaks on a low frequency side and a high frequency side as shown in FIG. 9.

The distribution of the magnetic field strength in the case of setting the frequency of the AC power to the power-supplying module 302 to the frequency fL nearby the peak on the low frequency side (inphase resonance mode) is shown in FIG. 10 (A). From the distribution of magnetic field strength shown in FIG. 10(B), a magnetic field space Z352 with slightly less influence of the magnetic field to its magnetic field strength is confirmed on the inner circumference sides of the power-supplying resonator 22 and the power-receiving resonator 32. Thus, it is possible to form a magnetic field space Z352 whose magnetic field strength is relatively smaller than that in the comparative example on the inner circumference side of each of the power-supplying resonator 22 and the power-receiving resonator 32, in the inphase resonance mode.

Meanwhile, the distribution of the magnetic field strength in the case of setting the frequency of the AC power to the power-supplying module 302 to the frequency fH nearby the peak on the high frequency side (antiphase resonance mode) is shown in FIG. 10 (B). From the distribution of magnetic field strength shown in FIG. 10 (B), a magnetic field space Z353 with a relatively small magnetic field strength, which is less influenced by the magnetic field is confirmed around the inner circumference sides of the power-supplying resonator 22 and the power-receiving resonator 32. Thus, it is possible to form a magnetic field space Z353 whose magnetic field strength is relatively smaller than that in the comparative example on the inner circumference side of each of the power-supplying resonator 22 and the power-receiving resonator 32, in the antiphase resonance mode. The magnetic field space Z353 formed in the antiphase resonance mode was broader than the magnetic field space Z352 formed in the inphase resonance mode.

Next, in the wireless power supply system 300 related to the example 2, the transmission characteristic "S21" was measured with the aluminum piece 60 arranged on the inner circumference side of the coil of the power-receiving resonator 32, with various frequencies of the AC power to the wireless power supply system 300.

The measurement results are shown in FIG. 9 as a waveform 342 representing the transmission characteristic "S21" measured with the aluminum piece 60 arranged on the inner circumference side of the coil of the power-receiving resonator 32. Although the transmission characteristic "S21" at the frequency fL nearby the peak on the low frequency side shown by the waveform 342 is slightly lower than the transmission characteristic "S21" shown by the waveform 341 resulted with no aluminum piece 60 on the inner circumference side of the coil of the power-receiving resonator 32, it should be understood the transmission characteristic itself is maintained at a high value. The transmission characteristic "S21" at the frequency fH nearby the peak on the high frequency side, on the other hand, is substantially the same as the transmission characteristic "S21" shown by the waveform 341 resulting without no aluminum piece 60 on the inner circumference side of the coil of the power-receiving resonator 32 (see point P in FIG. 9).

The distribution of magnetic field strength in the inphase resonance mode with the aluminum piece 60 on the inner circumference side of the coil of the power-receiving resonator 32 is shown in FIG. 10 (C). Further, the distribution of the magnetic field strength in the antiphase resonance mode with the aluminum piece 60 on the inner circumference side of the coil of the power-receiving resonator 32 is shown in FIG. 10 (D). It should be understood from these figures, when the aluminum piece 60 is arranged on the inner circumference sides of the coils of the power-receiving resonator 32 in the wireless power supply system 300 related to the example 2, the distribution of the magnetic field strength is not influenced so much by the aluminum piece 60, as compared with the comparative example. In other words, when power transmission is conducted between the power-supplying module 302 and the power-receiving module 303, the magnetic members 23 and 33 and the magnetic members 24 and 34 block the magnetic field generated around the power-supplying resonator 22 and the power-receiving resonator 32, and the magnetic field space Z353 greater than the magnetic field space Z153 of the comparative example is formed on the inner circumference side of the coil of the power-supplying resonator 22 and the power-receiving resonator 32. Further, the aluminum piece 60 was less influenced by the magnetic field generated in the wireless power supply system 300.

Further, the magnetic field space Z353 formed by the wireless power supply system 300 of the example 2 was broader than the magnetic field space Z253 formed by the wireless power supply system 200 related to the example 1. This is because, in the wireless power supply system 300 related to the example 2, the cylindrical magnetic members 24 and 34 which cover the entire outer circumferential surfaces of the coils of the power-supplying resonator 22 and the power-receiving resonator 32 blocks the magnetic field generated on the outer circumferential sides of the power-supplying resonator 22 and the power-receiving resonator 32.

(Structure of Wireless Power Supply System 400 Related to Example 3)

As shown in FIG. 11, the wireless power supply system 400 used in the example 3 includes: a power-supplying module 402 and a power-receiving module 403. The power-supplying module 402 includes: a power-supplying coil 21, a power-supplying resonator 22, a cylindrical magnetic member 23 which covers the entire inner circumferential surfaces of the coils of the power-supplying coil 21 and the power-supplying resonator 22, a cylindrical magnetic member 24 which covers the entire outer circumferential surfaces of the coils of the power-supplying coil 21 and the power-supplying resonator 22, and a ring-shaped magnetic member 25 which covers a side surface of the coil of the power-supplying resonator 22 opposite to the surface facing the power-receiving resonator 32. The power-receiving module 403 includes: a power-receiving coil 31, a power-receiving resonator 32, a cylindrical magnetic member 33 which covers the entire inner circumferential surfaces of the coils of the power-receiving coil 31 and the power-receiving resonator 32, a cylindrical magnetic member 34 which covers the entire outer circumferential surfaces of the coils of the power-receiving coil 31 and the power-receiving resonator 32, and a ring-shaped magnetic member 35 which covers a side surface of the coil of the power-receiving resonator 32 opposite to the surface facing the power-supplying resonator 22. As in the example 2, the power-supplying coil 21 was connected to the output terminal 111 of the network analyzer 110, and the power-receiving coil 31 was connected to the input terminal 112 of the network analyzer 110.

The magnetic members 25 and 35 were made of a resin in which the magnetic powder was dispersed as in the case of the magnetic members 23 and 33 of the example 1. The magnetic members 25 and 35 each had a shape of an O-ring, with a thickness of 1 mm, an outer diameter of 120 mm, and an inner diameter of 80 mm, and its magnetic permeability was 100. The structures, other than those described above, were similar to that of the wireless power supply system 300 related to the example 2.

(Measurement Result of Example 3)

For a magnetic field space Z formed by the wireless power supply system 400 related to the example 3, variations in its magnetic field strength and transmission characteristic "S21" were measured, with and without an aluminum piece 60 arranged on an inner circumference side of the coil of the power-receiving resonator 32. The results of the measurements are described below.

First, using the network analyzer 110, in the wireless power supply system 400 related to the example 3, the transmission characteristic "S21" was measured without the aluminum piece 60 arranged on the inner circumference side of the coil of the power-receiving resonator 32, with various frequencies of the AC power to the wireless power supply system 300.

Figure 12:
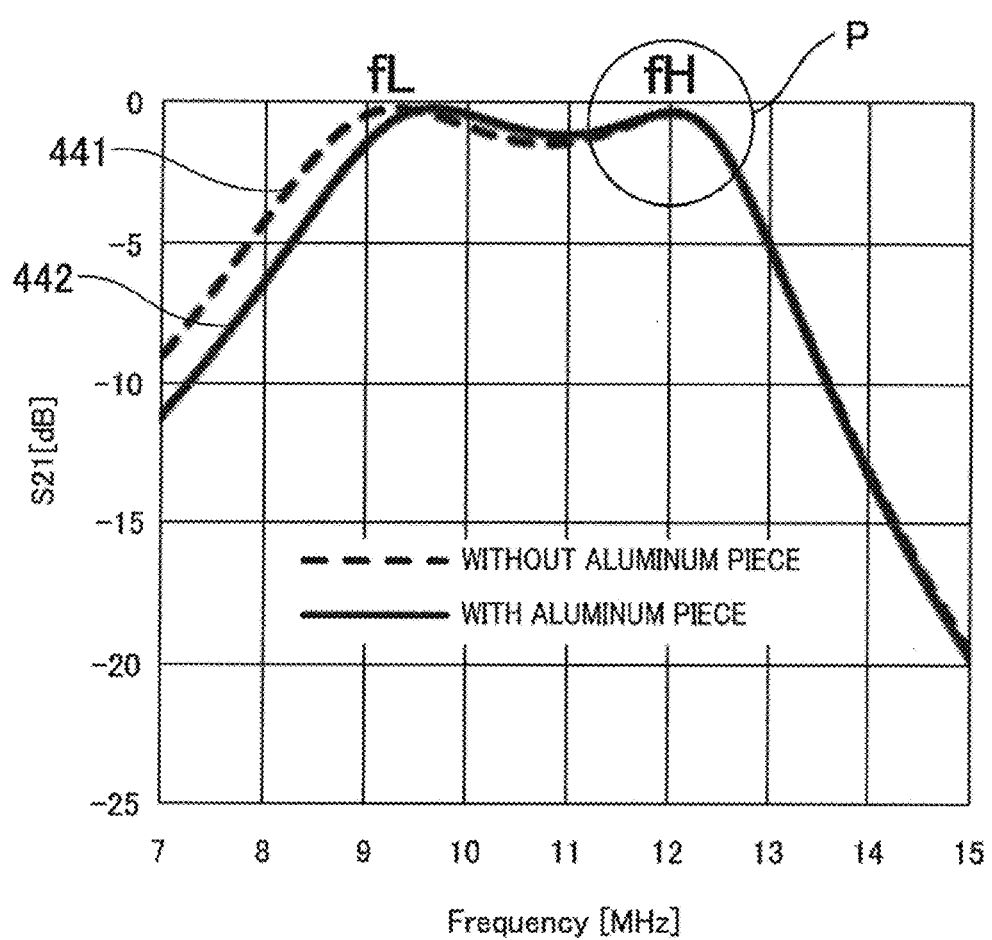
FIG. 12 is a graph indicating transmission characteristic S21 resulted from measurement in the example 3.

As the result of measurements, the transmission characteristic "S21" measured results in a waveform 441 having separate peaks on a low frequency side and a high frequency side as shown in FIG. 12.

Figure 13A:
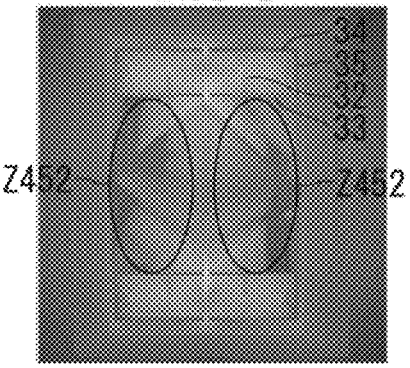
FIG. 13 is a diagram showing distribution of magnetic field strength related to the example 3.
Figure 13B:
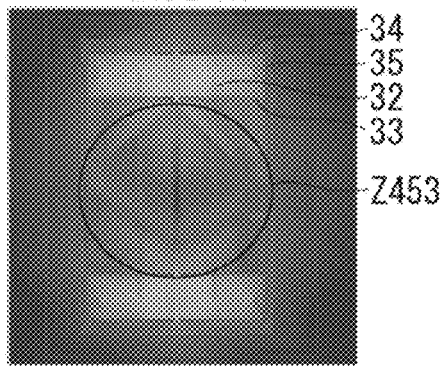

The distribution of the magnetic field strength in the case of setting the frequency of the AC power to the power-supplying module 402 to the frequency fL nearby the peak on the low frequency side (inphase resonance mode) is shown in FIG. 13(A). From the distribution of magnetic field strength shown in FIG. 13(B), a magnetic field space Z452 with slightly less influence of the magnetic field to its magnetic field strength is confirmed on the inner circumference sides of the power-supplying resonator 22 and the power-receiving resonator 32. Thus, it is possible to form a magnetic field space Z452 whose magnetic field strength is relatively smaller than that in the comparative example on the inner circumference side of each of the power-supplying resonator 22 and the power-receiving resonator 32, in the inphase resonance mode.

Meanwhile, the distribution of the magnetic field strength in the case of setting the frequency of the AC power to the power-supplying module 402 to the frequency fH nearby the peak on the high frequency side (antiphase resonance mode) is shown in FIG. 13 (B). From the distribution of magnetic field strength shown in FIG. 13(B), a magnetic field space Z453 with a relatively small magnetic field strength, which is less influenced by the magnetic field is confirmed around the inner circumference sides of the power-supplying resonator 22 and the power-receiving resonator 32. Thus, it is possible to form a magnetic field space Z453 whose magnetic field strength is relatively smaller than that in the comparative example on the inner circumference side of each of the power-supplying resonator 22 and the power-receiving resonator 32, in the antiphase resonance mode. The magnetic field space Z453 formed in the antiphase resonance mode was broader than the magnetic field space Z452 formed in the inphase resonance mode.

Next, in the wireless power supply system 400 related to the example 3, the transmission characteristic "S21" was measured with the aluminum piece 60 arranged on the inner circumference side of the coil of the power-receiving resonator 32, with various frequencies of the AC power to the wireless power supply system 400.

The measurement results are shown in FIG. 12 as a waveform 442 representing the transmission characteristic "S21" measured with the aluminum piece 60 arranged on the inner circumference side of the coil of the power-receiving resonator 32. The transmission characteristic "S21" at the frequency fL nearby the peak on the low frequency side shown by the waveform 442 is maintained at substantially the same value as the transmission characteristic "S21" shown by the waveform 441 resulted with no aluminum piece 60 on the inner circumference side of the coil of the power-receiving resonator 32. Further, the transmission characteristic "S21" at the frequency fH nearby the peak on the high frequency side was also maintained at substantially the same value as the transmission characteristic "S21" shown by the waveform 441 resulting with no aluminum piece 60 on the inner circumference side of the coil of the power-receiving resonator 32 (see point P on FIG. 12).

Figure 13C:
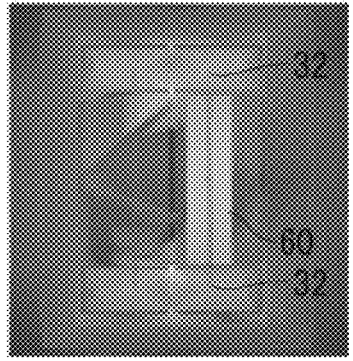
Figure 13D:
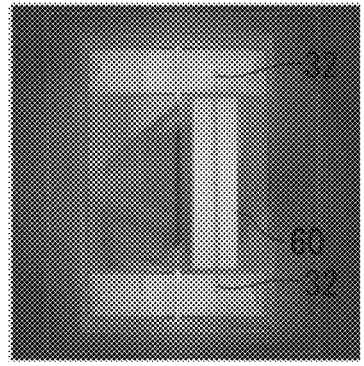

The distribution of magnetic field strength in the inphase resonance mode with the aluminum piece 60 on the inner circumference side of the coil of the power-receiving resonator 32 is shown in FIG. 13(C). Further, the distribution of magnetic field strength in the antiphase resonance mode with the aluminum piece 60 on the inner circumference side of the coil of the power-receiving resonator 32 is shown in FIG. 13(D). It should be understood from these figures, when the aluminum piece 60 is arranged on the inner circumference sides of the coils of the power-receiving resonator 32 in the wireless power supply system 400 related to the example 3, the distribution of the magnetic field strength is not influenced so much by the aluminum piece 60, as compared with the comparative example. In other words, when power transmission is conducted between the power-supplying module 402 and the power-receiving module 403, the magnetic members 23 and 33, the magnetic members 24 and 34, and the magnetic members 25 and 35 block the magnetic field generated around the power-supplying resonator 22 and the power-receiving resonator 32, and the magnetic field space Z453 greater than the magnetic field space Z153 of the comparative example is formed on the inner circumference side of the coil of the power-supplying resonator 22 and the power-receiving resonator 32. Further, the aluminum piece 60 was less influenced by the magnetic field generated in the wireless power supply system 400.

Further, the magnetic field space Z353 formed by the wireless power supply system 300 of the example 2 was broader than the magnetic field space Z453 formed by the wireless power supply system 400 related to the example 3. This is because, in the wireless power supply system 400 related to the example 3, the cylindrical magnetic members 25 and 35 which cover the side surfaces of the coils of the power-supplying resonator 22 and the power-receiving resonator 32 blocks the magnetic field generated on the side surfaces of the power-supplying resonator 22 and the power-receiving resonator 32.

(Changes in the Magnetic Field Space Z Due to Variation in Thickness of Magnetic Member)

Next, The following describes changes in the magnetic field space Z due to the thickness of the magnetic members 23 and 33, referring to the measurement of the magnetic field strength and the transmission characteristic "S21" of the examples 4 and 5.

(Structure of Wireless Power Supply System 500 Related to Example 4)

Specifically, the structures of the wireless power supply system 500 of the example 4 are the same as those of the wireless power supply system 200 of the example 1, except in that the magnetic members 123 and 133 adopted in the wireless power supply system 500 each has a thickness of 10 mm, whereas the magnetic members 23 and 33 in the wireless power supply system 200 of the example 1 each has a thickness of 1 mm (see FIG. 15). For the magnetic field space Z formed by this wireless power supply system 500, variation in the magnetic field strength and variation in the transmission characteristic "S21" were measured with and without the aluminum piece 60 on the inner circumference side of the coil of the power-receiving resonator 32.

(Measurement Result of Example 4)

First, with the use of the network analyzer 110, the transmission characteristic "S21" of the wireless power supply system 500 related to the example 4 was measured with the aluminum piece 60 on the inner circumference side of the coil of the power-receiving resonator 32, with various frequencies of the AC power to the wireless power supply system 500.

Figure 14:
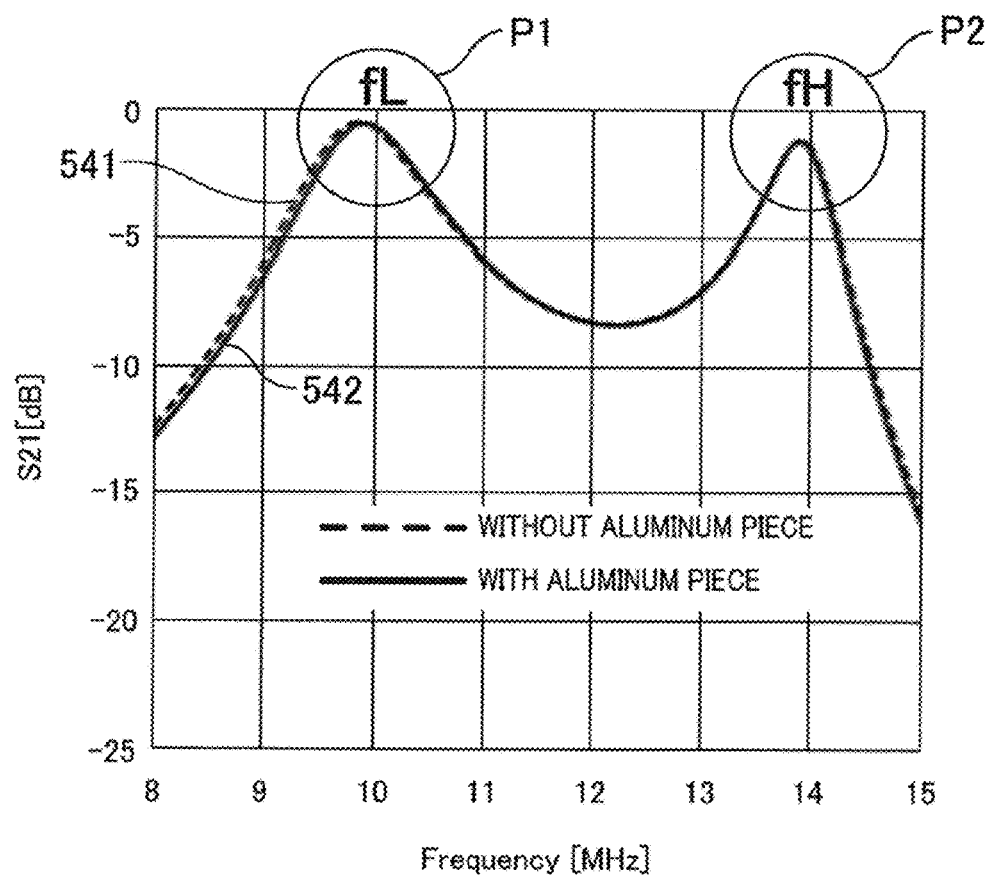
FIG. 14 is a graph indicating transmission characteristic S21 resulting from measurement in an example 4.

As the result of measurements, the transmission characteristic "S21" measured results in a waveform 541 having separate peaks on a low frequency side and a high frequency side as shown in FIG. 14.

The distribution of the magnetic field strength in the case of setting the frequency of the AC power to the power-supplying module 502 to the frequency fL nearby the peak on the low frequency side (inphase resonance mode) is shown in FIG. 15(A). From the distribution of magnetic field strength shown in FIG. 15(A), a magnetic field space Z552 with a magnetic field strength less influenced by the magnetic field is confirmed around the inner circumference sides of the power-supplying resonator 22 and the power-receiving resonator 32. Further, in the inphase resonance mode, the wireless power supply system 500 related to the example 4 forms a magnetic field space Z552 broader than the magnetic field space Z252 formed by the wireless power supply system 200 related to the example 1, on the inner circumference sides of the power-supplying resonator 22 and the power-receiving resonator 32. This is because, in the wireless power supply system 500 related to the example 4, the magnetic members 123 and 133 covering the inner circumferential surfaces of the power-supplying resonator 22 and the power-receiving resonator 32 is thicker than the example 1, and this enables more reliable blocking of the magnetic field generated on the inner circumferential surface side of the power-supplying resonator 22 and the power-receiving resonator 32.

Meanwhile, the distribution of the magnetic field strength in the case of setting the frequency of the AC power to the power-supplying module 502 to the frequency fH nearby the peak on the high frequency side (antiphase resonance mode) is shown in FIG. 15(B). From the distribution of magnetic field strength shown in FIG. 15(B), a magnetic field space Z553 with a relatively small magnetic field strength, which is less influenced by the magnetic field is confirmed around the inner circumference sides of the power-supplying resonator 22 and the power-receiving resonator 32. As described, in the antiphase resonance mode, it is possible to form a magnetic field space Z553 broader than the magnetic field space Z253 formed by the wireless power supply system 200 related to the example 1, on the inner circumference sides of the power-supplying resonator 22 and the power-receiving resonator 32. This is because, in the wireless power supply system 500 related to the example 4, the magnetic members 123 and 133 covering the inner circumferential surfaces of the power-supplying resonator 22 and the power-receiving resonator 32 is thicker than the example 1, and this enables more reliable blocking of the magnetic field generated on the inner circumferential surface side of the power-supplying resonator 22 and the power-receiving resonator 32. The magnetic field space Z553 formed in the antiphase resonance mode was broader than the magnetic field space Z552 formed in the inphase resonance mode.

Next, in the wireless power supply system 500 related to the example 4, the transmission characteristic "S21" was measured with the aluminum piece 60 arranged on the inner circumference side of the coil of the power-receiving resonator 32, with various frequencies of the AC power to the wireless power supply system 500.

The measurement results are shown in FIG. 14 as a waveform 542 representing the transmission characteristic "S21" measured with the aluminum piece 60 arranged on the inner circumference side of the coil of the power-receiving resonator 32. The transmission characteristic "S21" at the frequency fL nearby the peak on the low frequency side shown by the waveform 542 is maintained at substantially the same value as the transmission characteristic "S21" shown by the waveform 541 resulted with no aluminum piece 60 on the inner circumference side of the coil of the power-receiving resonator 32 (see point P1 of FIG. 14). Further, the transmission characteristic "S21" at the frequency fH nearby the peak on the high frequency side was also maintained at substantially the same value as the transmission characteristic "S21" shown by the waveform 541 resulting with no aluminum piece 60 on the inner circumference side of the coil of the power-receiving resonator 32 (see point P2 on FIG. 14).

The distribution of magnetic field strength in the inphase resonance mode with the aluminum piece 60 on the inner circumference side of the coil of the power-receiving resonator 32 is shown in FIG. 15(C). Further, the distribution of magnetic field strength in the antiphase resonance mode with the aluminum piece 60 on the inner circumference side of the coil of the power-receiving resonator 32 is shown in FIG. 15(D). It should be understood from these figures, when the aluminum piece 60 is arranged on the inner circumference sides of the coils of the power-receiving resonator 32 in the wireless power supply system 500 related to the example 4, the distribution from the magnetic field strength has little influence from the aluminum piece 60, as compared with the example 1. In other words, increasing the thickness of each of the magnetic members 123 and 133 which cover the inner circumferential surfaces of the power-supplying resonator 22 and the power-receiving resonator 32 enables formation of relatively large magnetic field spaces Z552 and Z553 on the inner circumference sides of the coils of the power-supplying resonator 22 and the power-receiving resonator 32, when power transmission is conducted between the power-supplying module 502 and the power-receiving module 503.

(Structure of Wireless Power Supply System 600 Related to Example 5)

Specifically, the structures of the wireless power supply system 600 in the example 5 are the same as those of the wireless power supply system 300 related to the example 2 except in that the magnetic members 23 and 33 adopted in the wireless power supply system 600 each has a thickness of 10 mm, whereas the magnetic members 123 and 133 adopted in the wireless power supply system 300 each has a thickness of 1 mm (see FIG. 17). For a magnetic field space Z formed by this wireless power supply system 600, variations in the magnetic field strength and the transmission characteristic "S21" were measured with and without the aluminum piece 60 on the inner circumference side of the coil of the power-receiving resonator 32.

(Measurement Result of Example 5)

First, using the network analyzer 110, in the wireless power supply system 600 related to the example 5, the transmission characteristic "S21" was measured without the aluminum piece 60 arranged on the inner circumference side of the coil of the power-receiving resonator 32, with various frequencies of the AC power to the wireless power supply system 600.

Figure 16:
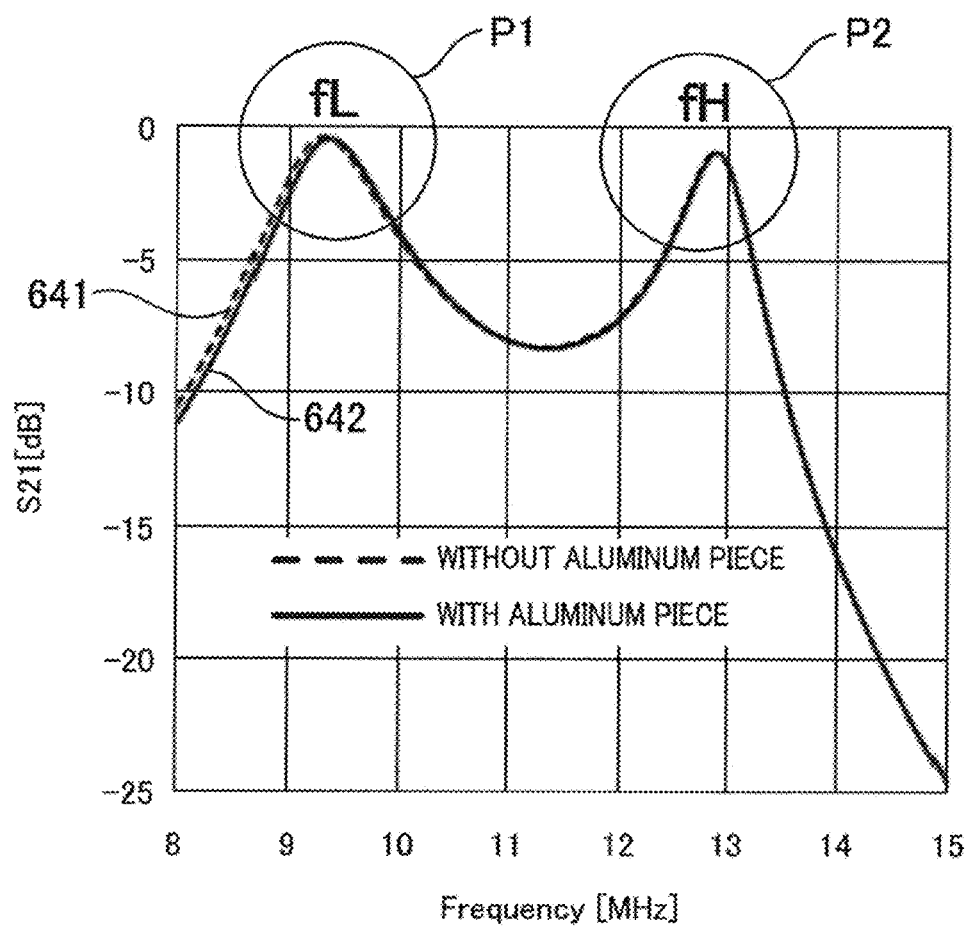
FIG. 16 is a graph indicating transmission characteristic S21 resulting from measurement in an example 5.

As the result of measurements, the transmission characteristic "S21" measured results in a waveform 641 having separate peaks on a low frequency side and a high frequency side as shown in FIG. 16.

The distribution of the magnetic field strength in the case of setting the frequency of the AC power to the power-supplying module 602 to the frequency fL nearby the peak on the low frequency side (inphase resonance mode) is shown in FIG. 17 (A). From the distribution of magnetic field strength shown in FIG. 17(A), a magnetic field space Z652 with a magnetic field strength less influenced by the magnetic field is confirmed around the inner circumference sides of the power-supplying resonator 22 and the power-receiving resonator 32. Further, in the inphase resonance mode, the wireless power supply system 600 related to the example 5 forms a magnetic field space Z652 broader than the magnetic field space Z352 formed by the wireless power supply system 300 related to the example 2, on the inner circumference sides of the power-supplying resonator 22 and the power-receiving resonator 32. This is because, in the wireless power supply system 600 related to the example 5, the magnetic members 123 and 133 covering the inner circumferential surfaces of the power-supplying resonator 22 and the power-receiving resonator 32 is thicker than the example 2, and this enables more reliable blocking of the magnetic field generated on the inner circumferential surface side of the power-supplying resonator 22 and the power-receiving resonator 32.

Figure 17A:
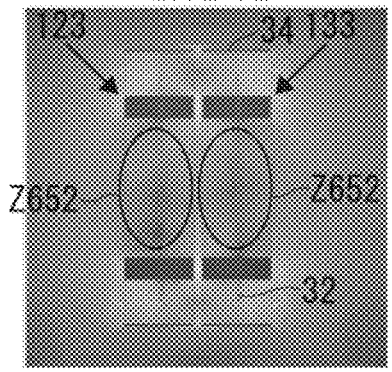
FIG. 17 is a diagram showing distribution of magnetic field strength related to the example 5.
Figure 17B:
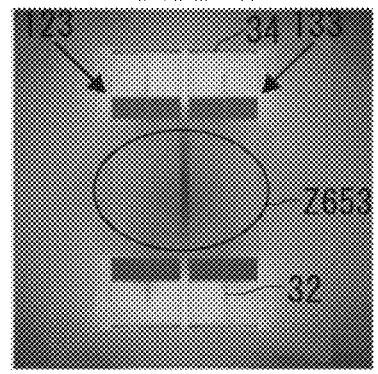

Meanwhile, the distribution of the magnetic field strength in the case of setting the frequency of the AC power to the power-supplying module 602 to the frequency fH nearby the peak on the high frequency side (antiphase resonance mode) is shown in FIG. 17(B). From the distribution of magnetic field strength shown in FIG. 17(B), a magnetic field space Z653 with a relatively small magnetic field strength, which is less influenced by the magnetic field is confirmed around the inner circumference sides of the power-supplying resonator 22 and the power-receiving resonator 32. As described, in the antiphase resonance mode, it is possible to form a magnetic field space Z653 broader than the magnetic field space Z353 formed by the wireless power supply system 300 related to the example 2, on the inner circumference sides of the power-supplying resonator 22 and the power-receiving resonator 32. This is because, in the wireless power supply system 600 related to the example 5, the magnetic members 123 and 133 covering the inner circumferential surfaces of the power-supplying resonator 22 and the power-receiving resonator 32 is thicker than the example 2, and this enables more reliable blocking of the magnetic field generated on the inner circumferential surface side of the power-supplying resonator 22 and the power-receiving resonator 32. The magnetic field space Z653 formed in the antiphase resonance mode was broader than the magnetic field space Z652 formed in the inphase resonance mode.

Next, in the wireless power supply system 600 related to the example 5, the transmission characteristic "S21" was measured with the aluminum piece 60 arranged on the inner circumference side of the coil of the power-receiving resonator 32, with various frequencies of the AC power to the wireless power supply system 600.

The measurement results are shown in FIG. 16 as a waveform 642 representing the transmission characteristic "S21" measured with the aluminum piece 60 arranged on the inner circumference side of the coil of the power-receiving resonator 32. The transmission characteristic "S21" at the frequency fL nearby the peak on the low frequency side shown by the waveform 642 is maintained at substantially the same value as the transmission characteristic "S21" shown by the waveform 641 resulted with no aluminum piece 60 on the inner circumference side of the coil of the power-receiving resonator 32 (see point P1 of FIG. 16). Further, the transmission characteristic "S21" at the frequency fH nearby the peak on the high frequency side was also maintained at substantially the same value as the transmission characteristic "S21" shown by the waveform 641 resulting with no aluminum piece 60 on the inner circumference side of the coil of the power-receiving resonator 32 (see point P2 on FIG. 16).

Figure 17C:
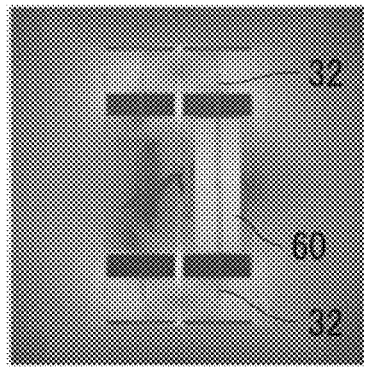
Figure 17D:
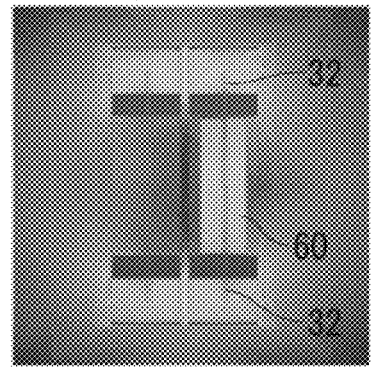

The distribution of magnetic field strength in the inphase resonance mode with the aluminum piece 60 on the inner circumference side of the coil of the power-receiving resonator 32 is shown in FIG. 17(C). Further, the distribution of magnetic field strength in the antiphase resonance mode with the aluminum piece 60 on the inner circumference side of the coil of the power-receiving resonator 32 is shown in FIG. 17(D). It should be understood from these figures, when the aluminum piece 60 is arranged on the inner circumference sides of the coils of the power-receiving resonator 32 in the wireless power supply system 600 related to the example 5, the distribution of the magnetic field strength has little influence from the aluminum piece 60, as compared with the example 2. In other words, increasing the thickness of each of the magnetic members 123 and 133 which cover the inner circumferential surfaces of the power-supplying resonator 22 and the power-receiving resonator 32 enables formation of relatively large magnetic field spaces Z652 and Z653 on the inner circumference sides of the coils of the power-supplying resonator 22 and the power-receiving resonator 32, when power transmission is conducted between the power-supplying module 602 and the power-receiving module 603.

(Second Example)

in the above wireless power supply systems 100, 200, 300, and 400, circular and solenoid cylindrical coils were adopted for the power-supplying coil and the power-supplying resonator of the power-supplying module and for the power-receiving coil and the power-receiving resonator of the power-receiving module. The second example however deals with a wireless power supply system adopting quadrangular and quadrangular tubular coils for the power-supplying coil and the power-supplying resonator of the power-supplying module and for the power-receiving coil and the power-receiving resonator of the power-receiving module. Specifically, the power-supplying resonator of the power-supplying module and the power-receiving resonator of the power-receiving module were arranged to face each other, and quadrangular tubular magnetic members covering the entire inner circumferential surfaces of the coils of the power-supplying resonator and the power-receiving resonator were arranged on the inner circumferential surface sides of the coils. Then, magnetic field strength of a magnetic field space Z formed by this wireless power supply system was measured. This is described below as the second example.

Figure 18:
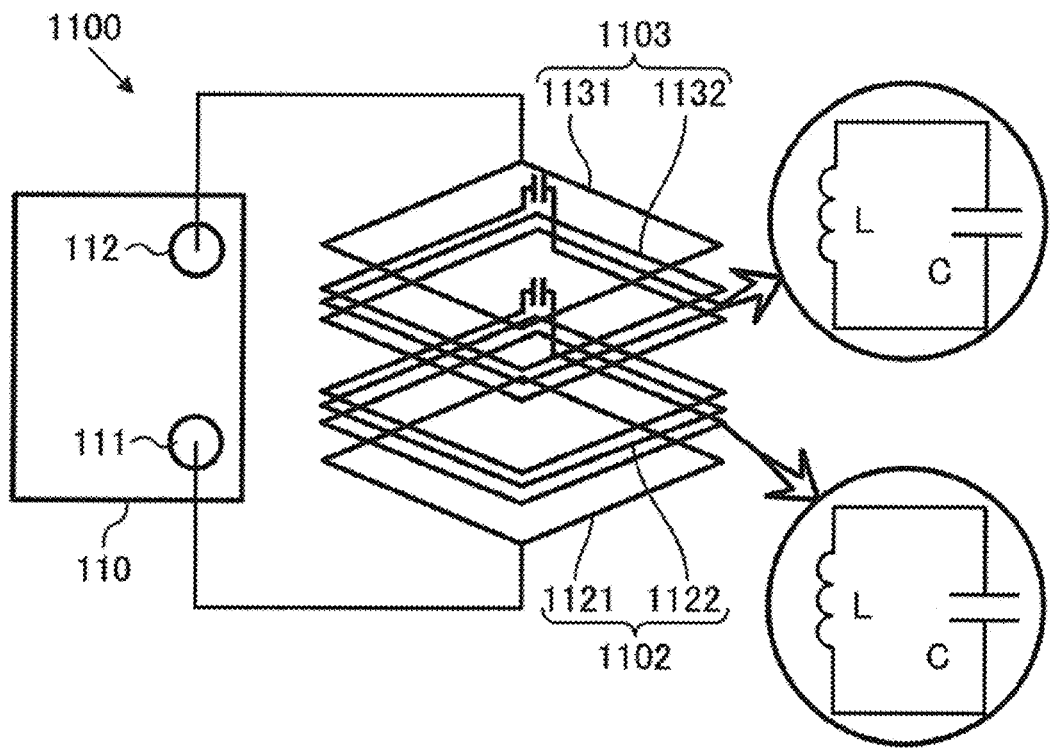
FIG. 18 is a diagram showing a structure of a wireless power supply system related to a second comparative example.

As in the first example, in the measurement, for the magnetic field space Z formed by the wireless power supply system 1100 having the power-supplying module 1102 and the power-receiving module 1103 without the magnetic members as shown in FIG. 18, variation in the transmission characteristic "S21" and variation in the magnetic field strength were measured with and without the aluminum piece 60 on the inner circumference side of the coil of the power-receiving resonator 1132, as a comparative example (hereinafter, simply referred to as second comparative example) relative to the second example.

Figure 21:
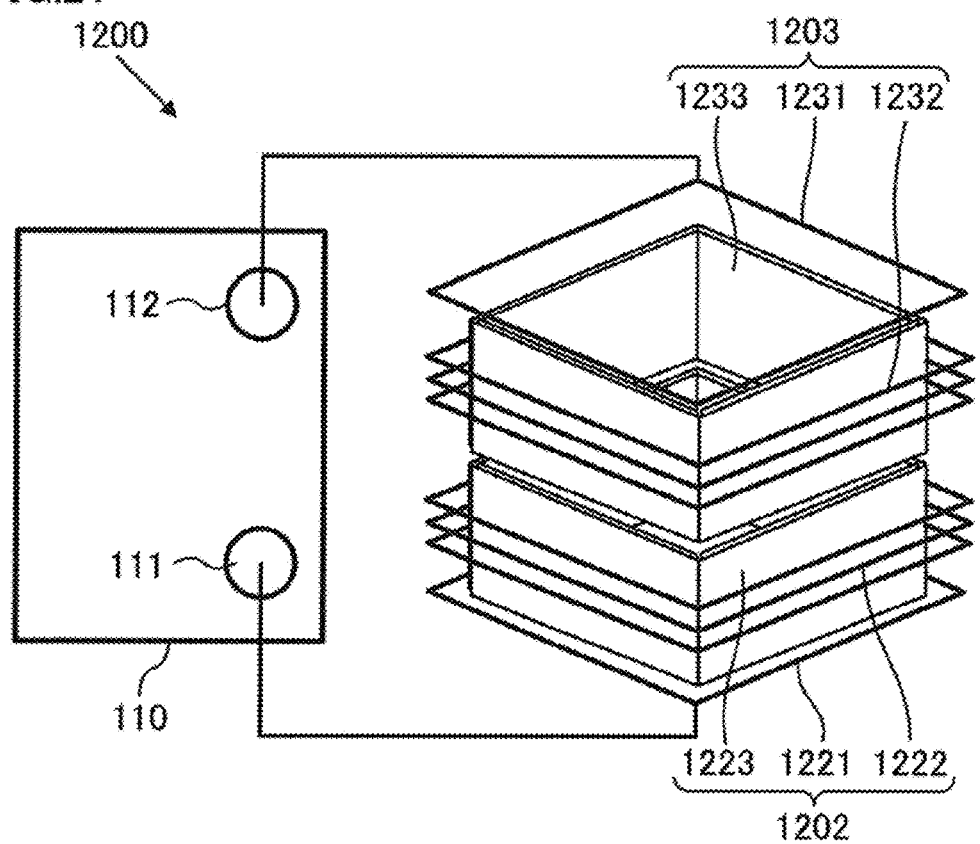
FIG. 21 is a diagram showing a structure of a wireless power supply system related to a second example.

Further, for the magnetic field space Z formed by the wireless power supply system 1200 having quadrangular tubular magnetic members 1223 and 1233 covering the entire inner circumferential surfaces of the coils of a power-supplying resonator 1222 of the power-supplying module 1202 and a power-receiving resonator 1232 of a power-receiving module 1203 respectively as shown in FIG. 21, variation in the transmission characteristic "S21" and variation in the magnetic field strength were measured with and without the aluminum piece 60 on the inner circumference side of the power-receiving resonator 1232, as an example in the second example (hereinafter, simply referred to as second example).

(Structure of Wireless Power Supply System 1100 of Second Comparative Example)

As shown in FIG. 18, the wireless power supply system 1100 used in the second comparative example includes: a power-supplying module 1102 having a quadrangular power-supplying coil 1121 and a power-supplying resonator 1122 having a quadrangular tubular coil structure; and a power-receiving module 1103 having a quadrangular power-receiving coil 1131 and a power-receiving resonator 1132 having a quadrangular tubular coil structure. As in the first example, the power-supplying coil 1121 was connected to the output terminal 111 of the network analyzer 110, and the power-receiving coil 1131 was connected to the input terminal 112 of the network analyzer 110.

The power-supplying coil 1121 plays a role of supplying power obtained from the network analyzer 110 to the power-supplying resonator 1122 by means of electromagnetic induction. This power-supplying coil 1121 was formed in a square shape with each side being 100 mm, by winding once a copper wire material (coated by insulation film) having a wire diameter of 1 mmφ.

The power-receiving coil 1131 plays a role of outputting the power transmitted as magnetic field energy from the power-supplying resonator 1122 to the power-receiving resonator 1132 to the input terminal 112 of the network analyzer 310 by means of electromagnetic induction. This power-receiving coil 1131 was formed in a square shape with each side being 1.00 mm, by winding once a copper wire material (coated by insulation film) having a wire diameter of 1 mmφ, as in the case of the power-supplying coil 1121.

The power-supplying resonator 1122 and the power-receiving resonator 1132 are each an LC resonance circuit, and play a role of creating the magnetic field resonant state. The power-supplying resonator 1122 and the power-receiving resonator 1132 each had a structure of a quadrangular tubular coil with each side of its cross section being 100 mm, and is formed by winding three times a copper wire material (coated by insulation film) having a wire diameter of 1 mmφ.

The distance between the power-supplying coil 1121 and the power-supplying resonator 1122 was set to be 15 mm, the distance between the power-supplying resonator 1122 and the power-receiving resonator 1132 was set to be 30 mm, and the distance between the power-receiving resonator 1132 and the power-receiving coil 1131 was set to be 15 mm. The resonance frequency of the power-supplying resonator 1122 and the power-receiving resonator 1132 was set to 14.2 MHz. The power-supplying resonator 1122 and the power-receiving resonator 1132 were arranged so that their coil surfaces face each other in parallel.

Note that, in the measurements of variations in the magnetic field strength and the transmission characteristic "S21", an aluminum piece 60 made of aluminum in a rectangular parallelepiped shape with a thickness of 20 mm and having a cross section with each side being 76 mmφ was used as the metal piece to be arranged on the coil inner circumference side of the power-receiving resonator 1132.
(Measurement Result of Second Comparative Example)

For a magnetic field space Z formed by the wireless power supply system 1100 related to the second comparative example, variations in its magnetic field strength and transmission characteristic "S21" were measured, with and without an aluminum piece 60 arranged on an inner circumference side of the coil of the power-receiving resonator 1132. The results of the measurements are described below.

First, using the network analyzer 110, in the wireless power supply system 1100, the transmission characteristic "S21" was measured without the aluminum piece 60 arranged on the inner circumference side of the coil of the power-receiving resonator 1132, with various frequencies of the AC power to the wireless power supply system 1100.

Figure 19:
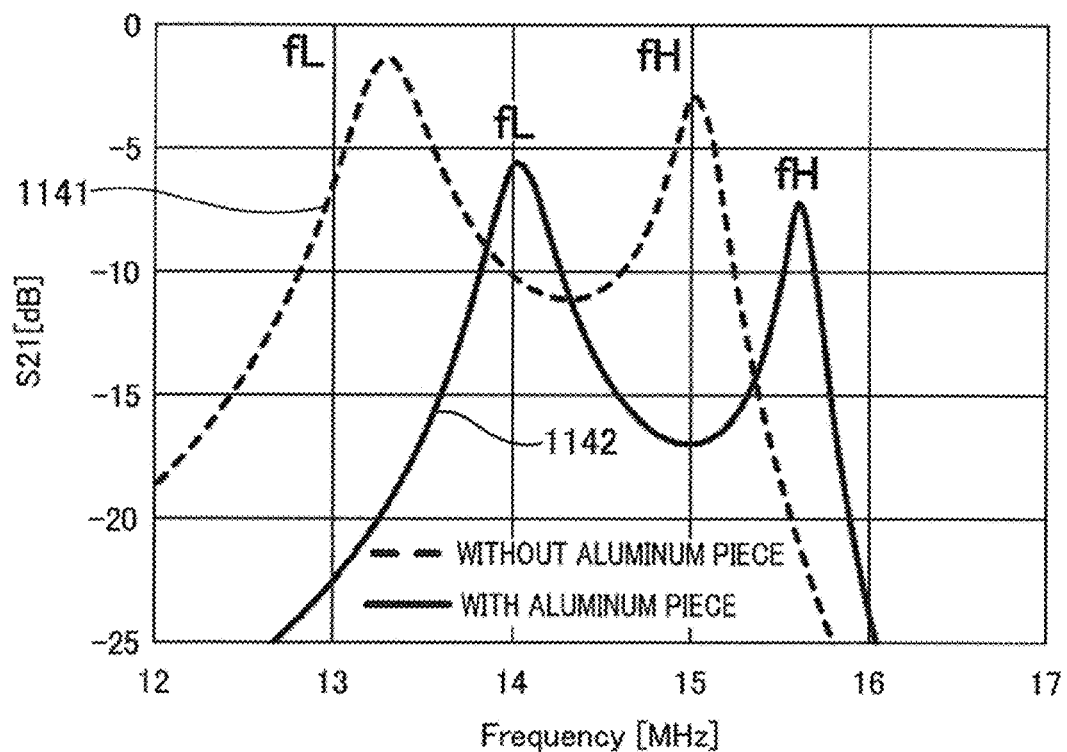
FIG. 19 is a graph indicating transmission characteristic S21 resulting from measurement in the second comparative example.

As the result of measurements, the transmission characteristic "S21" measured results in a waveform 1141 having separate peaks on a low frequency side and a high frequency side as shown in FIG. 19.

When the frequency of the AC power to the power-supplying module 1102 was set to the frequency fL nearby the peak on the low frequency side (inphase resonance mode), the power-supplying resonator 1122 and the power-receiving resonator 1132 were resonant with each other in inphase, and the current in the power-supplying resonator 1122 and the current in the power-receiving resonator 1132 both flowed in the same direction. The distribution of the magnetic field strength in this inphase resonance mode is shown in FIG. 20 (A). It should be understood from the distribution of magnetic field strength shown in FIG. 20(A) that the influence of the magnetic field is weakened around the outer circumference sides of the power-supplying resonator 1122 and the power-receiving resonator 1132, and a magnetic field space Z1151 having a relatively small magnetic field strength is confirmed.

On the other hand, when the frequency of the AC power to the power-supplying module 1102 was set to the frequency fH nearby the peak on the side of the high frequency side (antiphase resonance mode), the power-supplying resonator 1122 and the power-receiving resonator 1132 resonated with each other in antiphase, and the current in the power-supplying resonator 1122 and the current in the power-receiving resonator 1132 flowed opposite directions to each other. The distribution of magnetic field strengths in this antiphase resonance mode is shown in FIG. 20(B). From the distribution of magnetic field strength shown in FIG. 20 (B), a magnetic field space Z1153 with a relatively small magnetic field strength, which is less influenced by the magnetic field is confirmed around the inner circumference sides of the power-supplying resonator 1122 and the power-receiving resonator 1132.

Next, in the wireless power supply system 1100, the transmission characteristic "S21" was measured with the aluminum piece 60 arranged on the inner circumference side of the coil of the power-receiving resonator 1132, with various frequencies of the AC power to the wireless power supply system 1100.

The measurement results are shown in FIG. 19 as a waveform 1142 representing the transmission characteristic "S21" measured with the aluminum piece 60 arranged on the inner circumference side of the coil of the power-receiving resonator 1132. It should be understood from the waveform 1142 that the transmission characteristic "S21" significantly lowers at the frequency fL nearby the peak on the low frequency side, as compared with the waveform 1141 of the transmission characteristic "S21" in the case of not arranging the aluminum piece 60 on the inner circumference side of the coil of the power-receiving resonator 1132. Similarly, it should be understood that the transmission characteristic "S21" significantly lowers at the frequency fH nearby the peak on the high frequency side, as compared with the waveform 1141 of the transmission characteristic "S21" in the case of not arranging the aluminum piece 60 on the inner circumference side of the coil of the power-receiving resonator 1132.

The distribution of magnetic field strength in the inphase resonance mode with the aluminum piece 60 on the inner circumference side of the coil of the power-receiving resonator 1132 is shown in FIG. 20(C). Further, the distribution of magnetic field strength in the antiphase resonance mode with the aluminum piece 60 on the inner circumference side of the coil of the power-receiving resonator 1132 is shown in FIG. 20(D). It should be understood from these figures, when the aluminum piece 60 is arranged on the inner circumference sides of the coils of the power-receiving resonator 1132 in the wireless power supply system 1100, the distribution of the magnetic field strength is directly influenced by the aluminum piece 60. In other words, the aluminum piece 60 is directly influenced by the magnetic field generated in the wireless power supply system 1100.
(Structure of Wireless Power Supply System 1200 Related to Second Example)

As shown in FIG. 21, the wireless power supply system 1200 used in the second example included a power-supplying module 1202 and a power-receiving module 1203. The power-supplying module 1202 included: a quadrangular power-supplying coil 1221, a power-supplying resonator 1222 having a structure of a quadrangular tubular coil, and a quadrangular tubular magnetic member 1223 which covered the entire inner circumferential surface of the coil of the power-supplying resonator 1222. The power-receiving module 1203 included: a quadrangular power-receiving coil 1231, a power-receiving resonator 1232 having a structure of a quadrangular tubular coil, and a quadrangular tubular magnetic member 1233 which covered the entire circumferential surface of the coil of the power-receiving resonator 1232. As in the second comparative example, the power-supplying coil 1221 was connected to the output terminal 111 of the network analyzer 110, and the power-receiving coil 1231 was connected to the input terminal 112 of the network analyzer 110.

The magnetic members 1223 and 1233 are made of a resin in which magnetic powder was dispersed therein. These magnetic members 1223 and 1233 were formed in a shape of a quadrangular tube, with a thickness of 1 mm, a length of each outer side of 82 mm, a length of each inner side of 80 mm, and a height of 30 mm, and its magnetic permeability is 100. The structures of the power-supplying coil 1221, the power-supplying resonator 1222, the power-receiving coil 1231, and the power-receiving resonator 1232, other than those described above, were the same as those in the wireless power supply system 1100 related to the second comparative example.

(Measurement Result of Second Example)

For a magnetic field space Z formed by the wireless power supply system 1200 related to the second example, variations in its magnetic field strength and transmission characteristic "S21" were measured, with and without an aluminum piece 60 arranged on an inner circumference side of the coil of the power-receiving resonator 1232. The results of the measurements are described below.

First, using the network analyzer 110, in the wireless power supply system 1200, the transmission characteristic "S21" was measured without the aluminum piece 60 arranged on the inner circumference side of the coil of the power-receiving resonator 1232, with various frequencies of the AC power to the wireless power supply system 1200.

Figure 22:
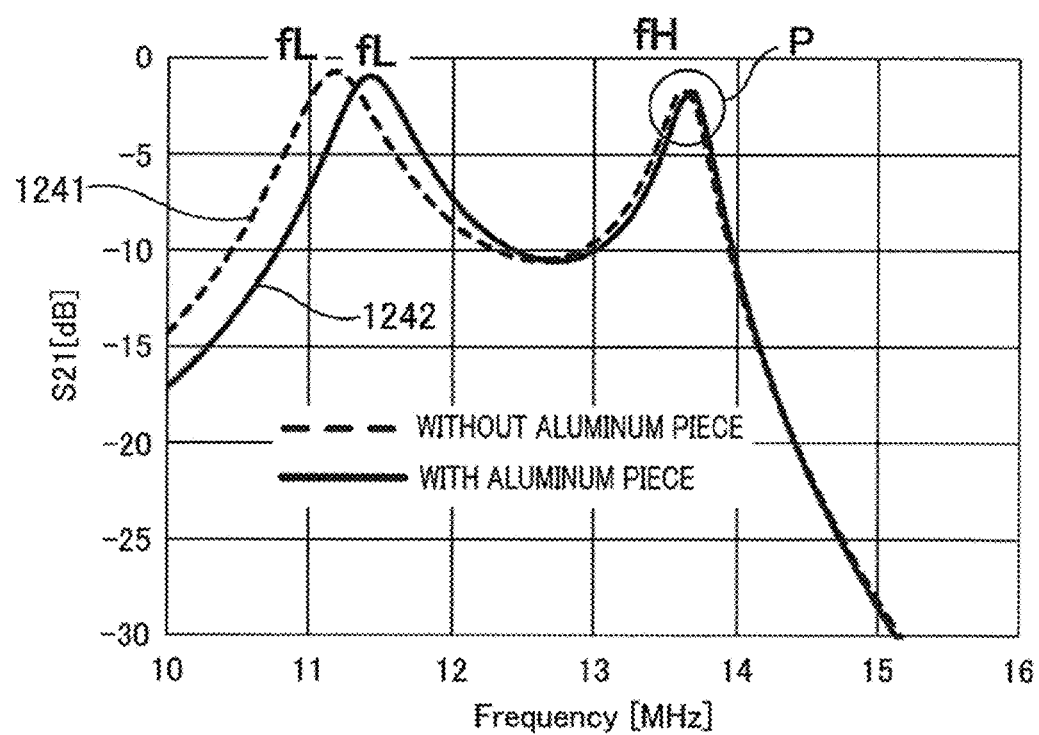
FIG. 22 is a graph indicating transmission characteristic S21 resulting from measurement in a second example.

As the result of measurements, the transmission characteristic "S21" measured results in a waveform 1241 having separate peaks on a low frequency side and a high frequency side as shown in FIG. 22.

Figure 23A:
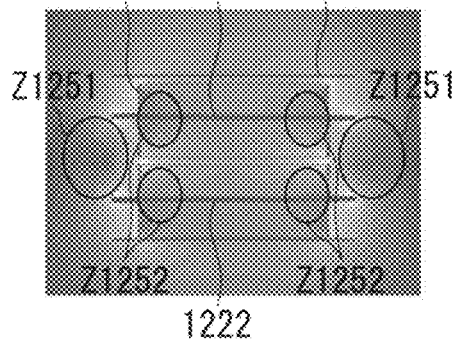
FIG. 23 is a diagram showing distribution of magnetic field strength related to the second example.
Figure 23B:
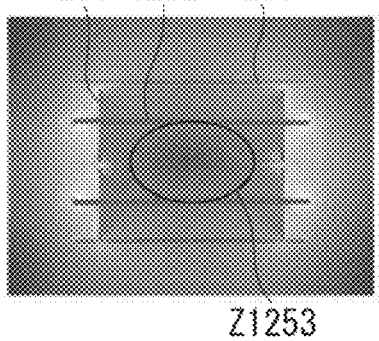

The distribution of the magnetic field strength in the case of setting the frequency of the AC power to the power-supplying module 1202 to the frequency fL nearby the peak on the low frequency side (inphase resonance mode) is shown in FIG. 23(A). It should be understood from the distribution of magnetic field strength shown in FIG. 23(A) that the influence of the magnetic field is weakened around the outer circumference sides of the power-supplying resonator 1222 and the power-receiving resonator 1232, and a magnetic field space Z1251 having a relatively small magnetic field strength is confirmed. Further, a magnetic field space Z1252 with magnetic field strength slightly less influenced by the magnetic field was confirmed on the inner circumference side of each of the power-supplying resonator 1222 and the power-receiving resonator 1232. Thus, it is possible to form a magnetic field space Z1252 whose magnetic field strength is relatively smaller than that in the second comparative example on the inner circumference side of each of the power-supplying resonator 1222 and the power-receiving resonator 1232, in the inphase resonance mode.

Meanwhile, the distribution of the magnetic field strength in the case of setting the frequency of the AC power to the power-supplying module 1202 to the frequency fH nearby the peak on the high frequency side (antiphase resonance mode) is shown in FIG. 23 (B). From the distribution of magnetic field strength shown in FIG. 23(B), a magnetic field space Z1253 with a relatively small magnetic field strength, which is less influenced by the magnetic field is confirmed around the inner circumference sides of the power-supplying resonator 1222 and the power-receiving resonator 1232. Thus, it is possible to form a magnetic field space Z1253 whose magnetic field strength is relatively smaller than that in the second comparative example on the inner circumference side of each of the power-supplying resonator 1222 and the power-receiving resonator 1232, in the antiphase resonance mode. The magnetic field space Z1253 formed in the antiphase resonance mode was broader than the magnetic field space Z1252 formed in the inphase resonance mode.

Next, in the wireless power supply system 1200, the transmission characteristic "S21" was measured with the aluminum piece 60 arranged on the inner circumference side of the coil of the power-receiving resonator 1232, with various frequencies of the AC power to the wireless power supply system 1200.

The measurement results are shown in FIG. 22 as a waveform 1242 representing the transmission characteristic "S21" measured with the aluminum piece 60 arranged on the inner circumference side of the coil of the power-receiving resonator 1232. Although the transmission characteristic "S21" at the frequency fL nearby the peak on the low frequency side shown by the waveform 1242 is slightly lower than the transmission characteristic "S21" shown by the waveform 1241 resulted with no aluminum piece 60 on the inner circumference side of the coil of the power-receiving resonator 1232, it should be understood the transmission characteristic itself is maintained at a high value. The transmission characteristic "S21" at the frequency fH nearby the peak on the high frequency side, on the other hand, is substantially the same as the transmission characteristic "S21" shown by the waveform 1241 resulting without no aluminum piece 60 on the inner circumference side of the coil of the power-receiving resonator 1232 (see point P in FIG. 22).

Figure 23C:
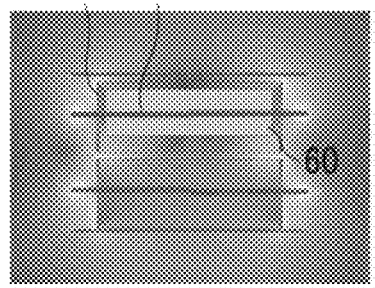
Figure 23D:
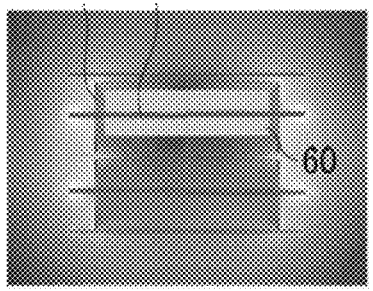

The distribution of magnetic field strength in the inphase resonance mode with the aluminum piece 60 on the inner circumference side of the coil of the power-receiving resonator 1232 is shown in FIG. 23(C). Further, the distribution of magnetic field strength in the antiphase resonance mode with the aluminum piece 60 on the inner circumference side of the coil of the power-receiving resonator 1232 is shown in FIG. 23(D). It should be understood from these figures, when the aluminum piece 60 is arranged on the inner circumference sides of the coils of the power-receiving resonator 1232 in the wireless power supply system 1200 related to the second example, the distribution of the magnetic field strength is not influenced so much by the aluminum piece 60, as compared with the second comparative example. That is, the wireless power supply system 1200 which adopts quadrangular and quadrangular tubular coils for the power-supplying coil and the power-supplying resonator in the power-supplying module and the power-receiving coil and the power-receiving resonator in the power-receiving module and adopts a quadrangular tubular magnetic members on the inner circumferential surfaces of the power-supplying resonator and the power-receiving resonator is capable of shielding, with the use of the magnetic members 1223 and 1233, the magnetic field occurring around the power-supplying resonator 1222 and the power-receiving resonator 1232 at the time of conducting power transmission between the power-supplying module 1202 and the power-receiving module 1203, and form the magnetic field space Z1253 broader than the magnetic field space Z1153 related to the second comparative example on the inner circumference side of the coils of the power-supplying resonator 1222 and the power-receiving resonator 1232. Further, the aluminum piece 60 was less influenced by the magnetic field generated in the wireless power supply system 1200.

(Third Example)

Figure 24:
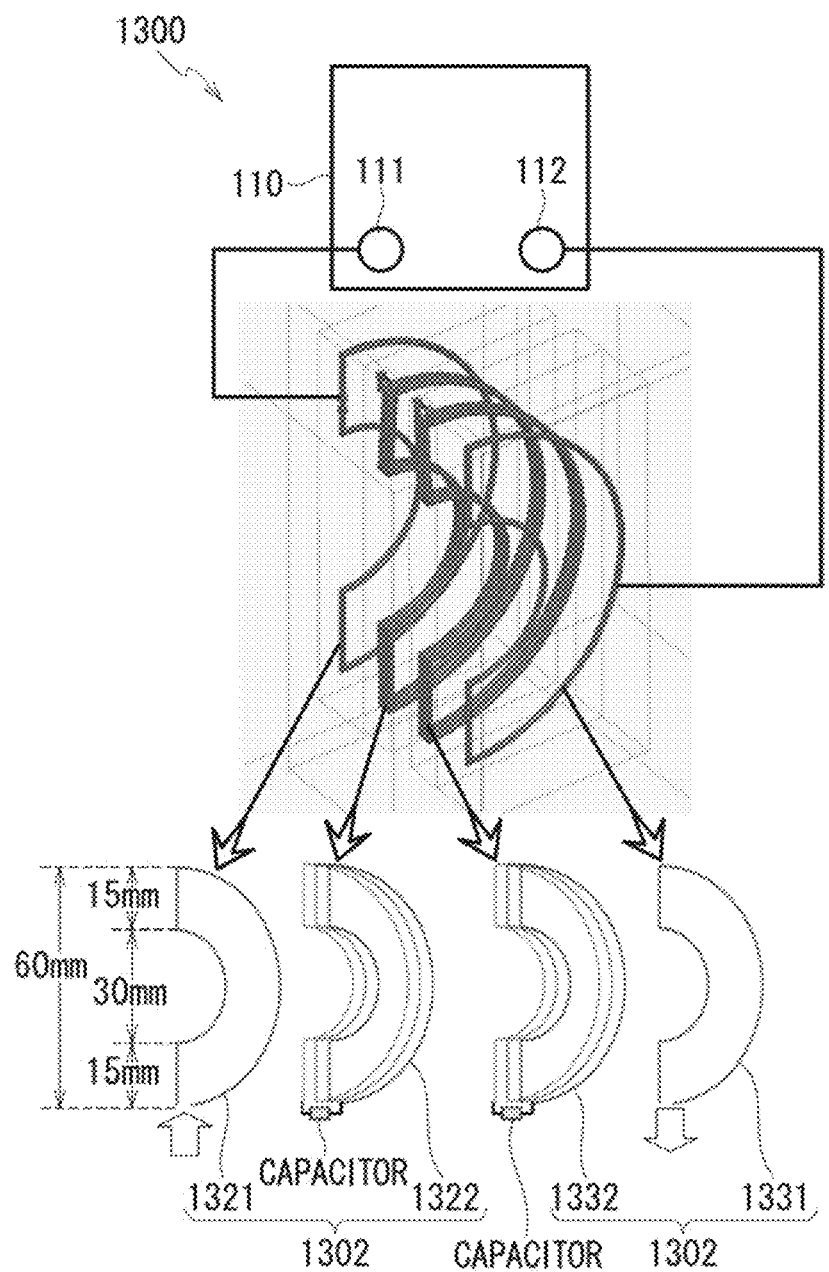
FIG. 24 is a diagram showing a structure of a wireless power supply system related to a third comparative example.

The first example deals with the wireless power supply systems 100, 200, 300, and 400, each of which adopts a circular and solenoid cylindrical coils for the power-supplying coil and the power-supplying resonator in the power-supplying module, and the power-receiving coil and the power-receiving resonator of the power-receiving module. The second example deals with a wireless power supply system 1200 adopting a quadrangular coils and quadrangular tubular coils for the power-supplying coil and the power-supplying resonator of the power-supplying module and for the power-receiving coil and the power-receiving resonator of the power-receiving module. The third example however deals with a wireless power supply system adopting coils in a crescent shape and crescent tubular coils for a power-supplying coil and the power-supplying resonator of the power-supplying module and for the power-receiving coil and the power-receiving resonator of the power-receiving module, as shown in FIG. 24. Specifically, the power-supplying resonator of the power-supplying module and the power-receiving resonator of the power-receiving module were arranged to face each other. A crescent tubular magnetic member which covers the entire inner circumferential surface of the coil was arranged on the inner circumferential surface side of the coils of the power-supplying resonator and the power-receiving resonator. Then, for the magnetic field space Z formed by this wireless power supply system, the magnetic field strength and the like were measured. This is described below as the third example.

As in the first example, in the measurement, for the magnetic field space Z formed by the wireless power supply system 1300 having the power-supplying module 1302 and the power-receiving module 1303 without the magnetic members as shown in FIG. 24, variation in the transmission characteristic "S21" and variation in the magnetic field strength were measured with and without the aluminum piece 60 on the inner circumference side of the coil of the power-receiving resonator 1332, as a comparative example (hereinafter, simply referred to as third comparative example) relative to the third example.

Figure 27:
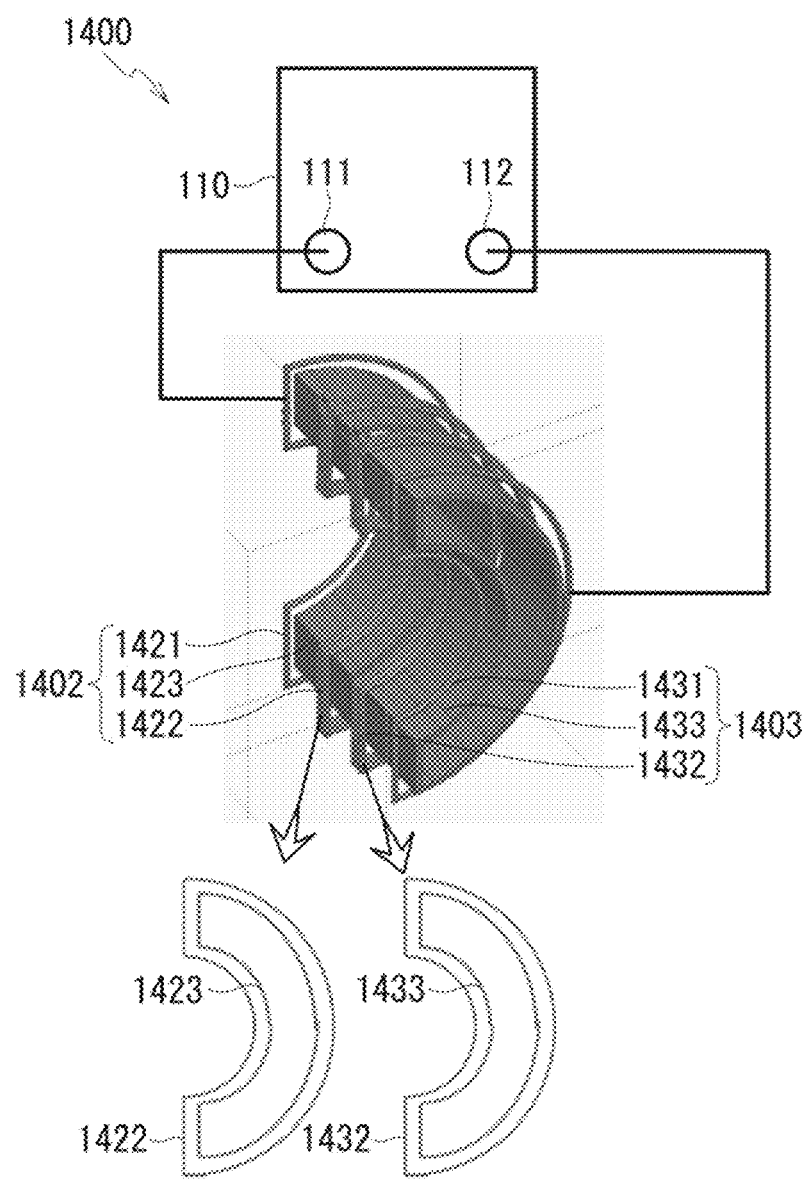
FIG. 27 is a diagram showing a structure of a wireless power supply system related to a third example.

Further, for the magnetic field space Z formed by the wireless power supply system 1400 having crescent tubular magnetic members 1423 and 1433 covering the entire inner circumferential surfaces of the coils of a power-supplying resonator 1422 of the power-supplying module 1402 and a power-receiving resonator 1432 of a power-receiving module 1403 respectively as shown in FIG. 27, variation in the transmission characteristic "S21" and variation in the magnetic field strength were measured with and without the aluminum piece 60 on the inner circumference side of the power-receiving resonator 1432, as an example in the third example (hereinafter, simply referred to as third example).

(Structure of Wireless Power Supply System 1300 Related to Third Comparative Example)

As shown in FIG. 24, the wireless power supply system 1300 used in the third comparative example includes: a power-supplying module 1302 having a crescent power-supplying coil 1321 and a power-supplying resonator 1322 having a crescent tubular coil structure; and a power-receiving module 1303 having a crescent power-receiving coil 1331 and a power-receiving resonator 1332 having a crescent tubular coil structure. As in the first example, the power-supplying coil 1321 was connected to the output terminal 111 of the network analyzer 110, and the power-receiving coil 1331 was connected to the input terminal 112 of the network analyzer 110.

The power-supplying coil 1321 plays a role of supplying power obtained from the network analyzer 110 to the power-supplying resonator 1322 by means of electromagnetic induction. The power-supplying coil 1321 was formed by winding once a copper wire material (coated by insulation film) having a wire diameter of 1 mmφ. It has a crescent shape such that the diameter of the outer circle was 60 mm and the diameter of the inner circle was 30 nm, as shown in FIG. 24.

The power-receiving coil 1331 plays a role of outputting the power transmitted as magnetic field energy from the power-supplying resonator 1322 to the power-receiving resonator 1332 to the input terminal 112 of the network analyzer 110 by means of electromagnetic induction. The power-receiving coil 1331 was formed by winding once a copper wire material (coated by insulation film) having a wire diameter of 1 mmφ. It has a crescent shape such that the diameter of the outer circle was 60 mm and the diameter of the inner circle was 30 mm, as in the case of the power-supplying coil 1321.

The power-supplying resonator 1322 and the power-receiving resonator 1332 are each an LC resonance circuit, and play a role of creating the magnetic field resonant state. The power-supplying resonator 1322 and the power-receiving resonator 1332 were each formed by winding three times a copper wire material (coated by insulation film) having a wire diameter of 1 mmφ (at intervals of 0.1 mm between windings). The power-supplying resonator 1322 and the power-receiving resonator 1332 each had a structure of a crescent tubular coil such that the diameter of the outer circle was 60 mm and the diameter of the inner circle was 30 mm.

The distance between the power-supplying coil 1321 and the power-supplying resonator 1322 was set to be 10 mm, the distance between the power-supplying resonator 1322 and the power-receiving resonator 1332 was set to be 8 mm, and the distance between the power-receiving resonator 1332 and the power-receiving coil 1331 was set to be 10 mm. The resonance frequency of the power-supplying resonator 1322 and the power-receiving resonator 1332 was set to 15.5 MHz. The power-supplying resonator 1322 and the power-receiving resonator 1332 were arranged so that their coil surfaces face each other in parallel.

Note that, in the measurement of variation in the magnetic field strength and variation in the transmission characteristic "S21", a quadrangular parallelepiped aluminum piece 60 made of aluminum having a thickness of 5 mm and having a shape that fits the shape of the inner circumferential surface of coil of the power-receiving resonator 1332 (crescent shape) was used as the metal piece to be arranged on the inner circumference side of the coil of the power-receiving resonator 1332.

(Measurement Result of Third Comparative Example)

For a magnetic field space Z formed by the wireless power supply system 1300 related to the third comparative example, variations in its magnetic field strength and transmission characteristic "S21" were measured, with and without an aluminum piece 60 arranged on an inner circumference side of the coil of the power-receiving resonator 1332. The results of the measurements are described below.

First, using the network analyzer 110, in the wireless power supply system 1300, the transmission characteristic "S21" was measured without the aluminum piece 60 arranged on the inner circumference side of the coil of the power-receiving resonator 1332, with various frequencies of the AC power to the wireless power supply system 1300.

Figure 25:
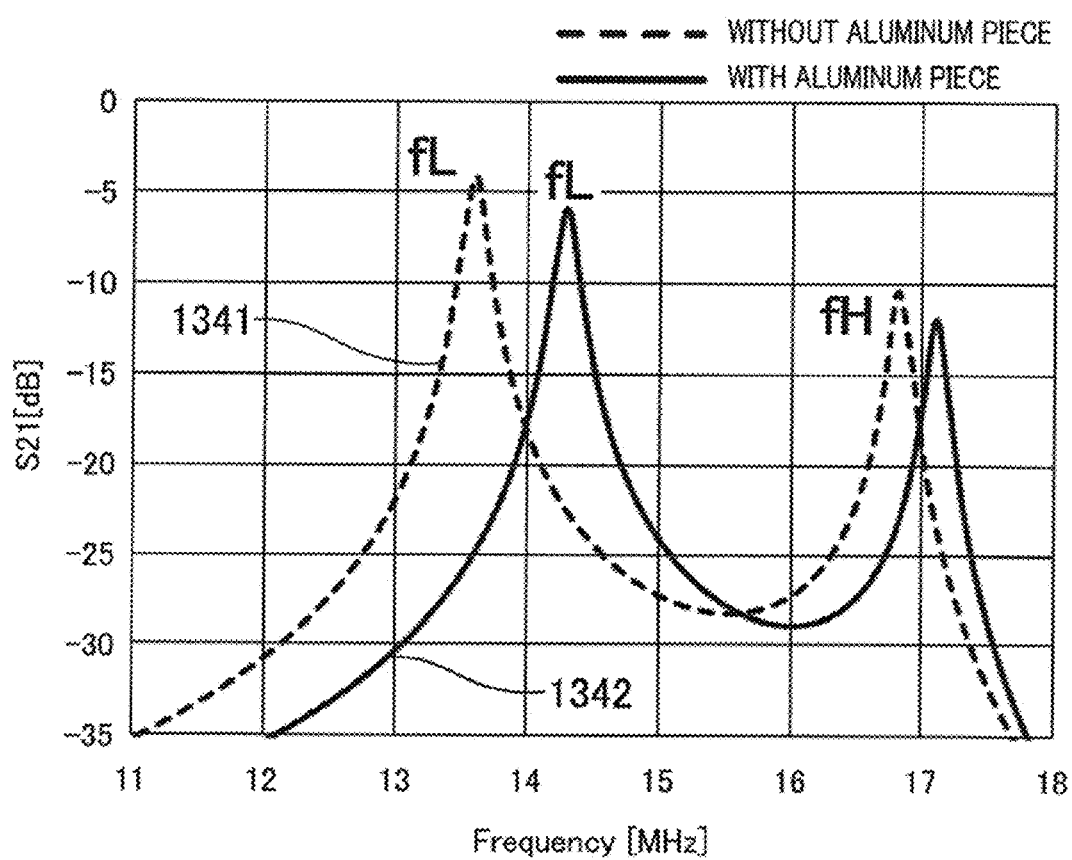
FIG. 25 is a graph indicating transmission characteristic S21 resulting from measurement in the third comparative example.

As the result of measurements, the transmission characteristic "S21" measured results in a waveform 1341 having separate peaks on a low frequency side and a high frequency side as shown in FIG. 25.

When the frequency of the AC power to the power-supplying module 1302 was set to the frequency fL nearby the peak on the low frequency side (inphase resonance mode), the power-supplying resonator 1322 and the power-receiving resonator 1332 were resonant with each other in inphase, and the current in the power-supplying resonator 1322 and the current in the power-receiving resonator 1332 both flowed in the same direction. The distribution of the magnetic field strength in this inphase resonance mode is shown in FIG. 26 (A). It should be understood from the distribution of magnetic field strength shown in FIG. 20(A) that the influence of the magnetic field is weakened around the outer circumference sides of the power-supplying resonator 1322 and the power-receiving resonator 1332, and a magnetic field space Z1351 having a relatively small magnetic field strength is confirmed.

On the other hand, when the frequency of the AC power to the power-supplying module 1302 was set to the frequency fH nearby the peak on the side of the high frequency side (antiphase resonance mode), the power-supplying resonator 1322 and the power-receiving resonator 1332 resonated with each other in antiphase, and the current in the power-supplying resonator 1322 and the current in the power-receiving resonator 1332 flowed opposite directions to each other. The distribution of magnetic field strengths in this antiphase resonance mode is shown in FIG. 26(B). From the distribution of magnetic field strength shown in FIG. 26(B), a magnetic field space Z1353 with a relatively small magnetic field strength, which is less influenced by the magnetic field is confirmed around the inner circumference sides of the power-supplying resonator 1322 and the power-receiving resonator 1332.

Next, in the wireless power supply system 1300, the transmission characteristic "S21" was measured with the aluminum piece 60 arranged on the inner circumference side of the coil of the power-receiving resonator 1332, with various frequencies of the AC power to the wireless power supply system 1300.

The measurement results are shown in FIG. 25 as a waveform 1342 representing the transmission characteristic "S21" measured with the aluminum piece 60 arranged on the inner circumference side of the coil of the power-receiving resonator 1332. It should be understood from the waveform 1342 that the transmission characteristic "S21" significantly lowers at the frequency fL, nearby the peak on the low frequency side, as compared with the waveform 1341 of the transmission characteristic "S21" in the case of not arranging the aluminum piece 60 on the inner circumference side of the coil of the power-receiving resonator 1332. Similarly, it should be understood that the transmission characteristic "S21" significantly lowers at the frequency fH nearby the peak on the high frequency side, as compared with the waveform 1341 of the transmission characteristic "S21" in the case of not arranging the aluminum piece 60 on the inner circumference side of the coil of the power-receiving resonator 1332.

The distribution of magnetic field strength in the inphase resonance mode with the aluminum piece 60 on the inner circumference side of the coil of the power-receiving resonator 1332 is shown in FIG. 26(C). Further, the distribution of magnetic field strength in the antiphase resonance mode with the aluminum piece 60 on the inner circumference side of the coil of the power-receiving resonator 1332 is shown in FIG. 26(D). It should be understood from these figures, when the aluminum piece 60 is arranged on the inner circumference sides of the coils of the power-receiving resonator 1332 in the wireless power supply system 1300, the distribution of the magnetic field strength is directly influenced by the aluminum piece 60. In other words, the aluminum piece 60 is directly influenced by the magnetic field generated in the wireless power supply system 1300.

(Structure of Wireless Power Supply System 1400 Related to Third Example)

As shown in FIG. 27, the wireless power supply system 1400 used in the third example included a power-supplying module 1402 and a power-receiving module 1403. The power-supplying module 1402 included a power-supplying coil 1421 in a crescent shape, a power-supplying resonator 1422 having a structure of a crescent tubular coil, and a crescent tubular magnetic member 1423 which covered the entire inner circumferential surface of the coil of the power-supplying resonator 1422. The power-receiving module 1403 included a power-receiving coil 1431 in a crescent shape, a power-receiving resonator 1432 having a structure of a crescent tube, a crescent tubular magnetic member 1433 which covered the entire inner circumferential surface of the coil of the power-receiving resonator 1432. As in the third comparative example, the power-supplying coil 1421 was connected to the output terminal 111 of the network analyzer 110 and the power-receiving coil 1431 was connected to an input terminal 112 of the network analyzer 110.

The magnetic members 1423 and 1433 are made of a resin in which magnetic powder was dispersed therein. These magnetic members 1423 and 1433 each had a shape of a crescent tube with a thickness of 1 mm, whose outline matched with the inner circumferential surface of the power-supplying resonator 1422 and power-receiving resonator 1432. The magnetic permeability was 100. The structures of the power-supplying coil 1421, the power-supplying resonator 1422, the power-receiving coil 1431, and the power-receiving resonator 1432, other than those described above, were the same as those in the wireless power supply system 1300 related to the third comparative example.

(Measurement Results of Third Example)

For a magnetic field space Z formed by the wireless power supply system 1400 related to the third example, variations in its magnetic field strength and transmission characteristic "S21" were measured, with and without an aluminum piece 60 arranged on an inner circumference side of the coil of the power-receiving resonator 1432. The results of the measurements are described below.

First, using the network analyzer 110, in the wireless power supply system 1400, the transmission characteristic "S21" was measured without the aluminum piece 60 arranged on the inner circumference side of the coil of the power-receiving resonator 1432, with various frequencies of the AC power to the wireless power supply system 1400.

Figure 28:
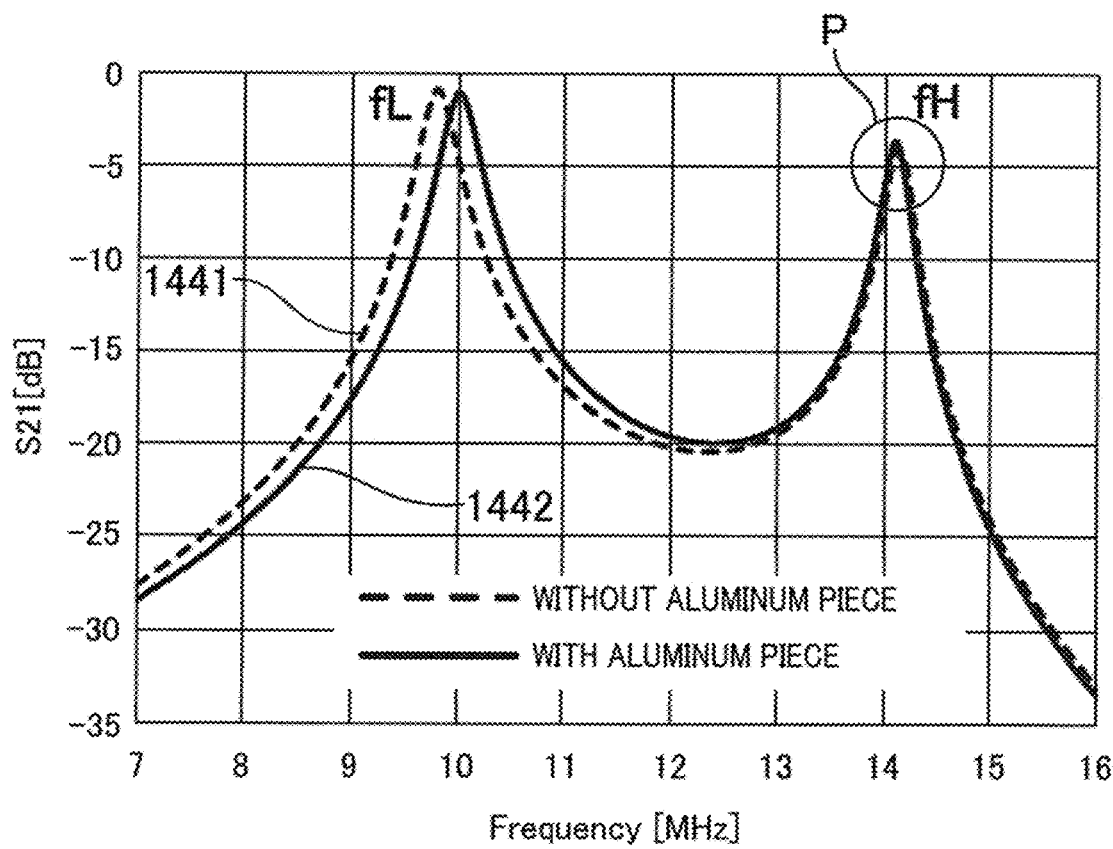
FIG. 28 is a graph indicating transmission characteristic S21 resulting from measurement in the third example.

As the result of measurements, the transmission characteristic "S21" measured results in a waveform 1441 having separate peaks on a low frequency side and a high frequency side as shown in FIG. 28.

The distribution of the magnetic field strength in the case of setting the frequency of the AC power to the power-supplying module 1402 to the frequency fL nearby the peak on the low frequency side (inphase resonance mode) is shown in FIG. 29 (A). It should be understood from the distribution of magnetic field strength shown in FIG. 29(A) that the influence of the magnetic field is weakened around the outer circumference sides of the power-supplying resonator 1422 and the power-receiving resonator 1432, and a magnetic field space Z1451 having a relatively small magnetic field strength is confirmed. Further, a magnetic field space Z1452 with magnetic field strength slightly less influenced by the magnetic field was confirmed on the inner circumference side of each of the power-supplying resonator 1422 and the power-receiving resonator 1432. Thus, it is possible to form a magnetic field space Z1452 whose magnetic field strength is relatively smaller than that in the third comparative example on the inner circumference side of each of the power-supplying resonator 1422 and the power-receiving resonator 1432, in the inphase resonance mode.

Meanwhile, the distribution of the magnetic field strength in the case of setting the frequency of the AC power to the power-supplying module 1402 to the frequency fH nearby the peak on the high frequency side (antiphase resonance mode) is shown in FIG. 29(B). From the distribution of magnetic field strength shown in FIG. 29(B), a magnetic field space Z1453 with a relatively small magnetic field strength, which is less influenced by the magnetic field is confirmed around the inner circumference sides of the power-supplying resonator 1422 and the power-receiving resonator 1432. Thus, it is possible to form a magnetic field space Z1453 whose magnetic field strength is relatively smaller than that in the third comparative example on the inner circumference side of each of the power-supplying resonator 1422 and the power-receiving resonator 1432, in the antiphase resonance mode. The magnetic field space Z1453 formed in the antiphase resonance mode was broader than the magnetic field space Z1452 formed in the inphase resonance mode.

Next, in the wireless power supply system 1400, the transmission characteristic "S21" was measured with the aluminum piece 60 arranged on the inner circumference side of the coil of the power-receiving resonator 1432, with various frequencies of the AC power to the wireless power supply system 1400.

The measurement results are shown in FIG. 28 as a waveform 1442 representing the transmission characteristic "S21" measured with the aluminum piece 60 arranged on the inner circumference side of the coil of the power-receiving resonator 1432. Although the transmission characteristic "S21" at the frequency fL nearby the peak on the low frequency side shown by the waveform 1442 is slightly lower than the transmission characteristic "S21" shown by the waveform 1441 resulted with no aluminum piece 60 on the inner circumference side of the coil of the power-receiving resonator 1432, it should be understood the transmission characteristic itself is maintained at a high value. The transmission characteristic "S21" at the frequency fH nearby the peak on the high frequency side, on the other hand, is substantially the same as the transmission characteristic "S21" shown by the waveform 1441 resulting without no aluminum piece 60 on the inner circumference side of the coil of the power-receiving resonator 1432 (see point P in FIG. 28).

The distribution of magnetic field strength in the inphase resonance mode with the aluminum piece 60 on the inner circumference side of the coil of the power-receiving resonator 1432 is shown in FIG. 29(C). Further, the distribution of magnetic field strength in the antiphase resonance mode with the aluminum piece 60 on the inner circumference side of the coil of the power-receiving resonator 1432 is shown in FIG. 29(D). It should be understood from these figures, when the aluminum piece 60 is arranged on the inner circumference sides of the coils of the power-receiving resonator 1432 in the wireless power supply system 1400 related to the third example, the distribution of the magnetic field strength is not influenced so much by the aluminum piece 60, as compared with the third comparative example. That is, the wireless power supply system 1400 which adopts coils in a crescent shape and quadrangular tubular coils for the power-supplying coil and the power-supplying resonator in the power-supplying module and the power-receiving coil and the power-receiving resonator in the power-receiving module and adopts crescent tubular magnetic members on the inner circumferential surfaces of the power-supplying resonator and the power-receiving resonator is capable of shielding, with the use of the magnetic members 1423 and 1433, the magnetic field occurring around the power-supplying resonator 1422 and the power-receiving resonator 1432 at the time of conducting power transmission between the power-supplying module 1402 and the power-receiving module 1403, and form the magnetic field space Z1453 broader than the magnetic field space Z1353 related to the third comparative example on the inner circumference side of the coils of the power-supplying resonator 1222 and the power-receiving resonator 1232. Further, the aluminum piece 60 was less influenced by the magnetic field generated in the wireless power supply system 1400.

(Fourth Example)

Figure 30:
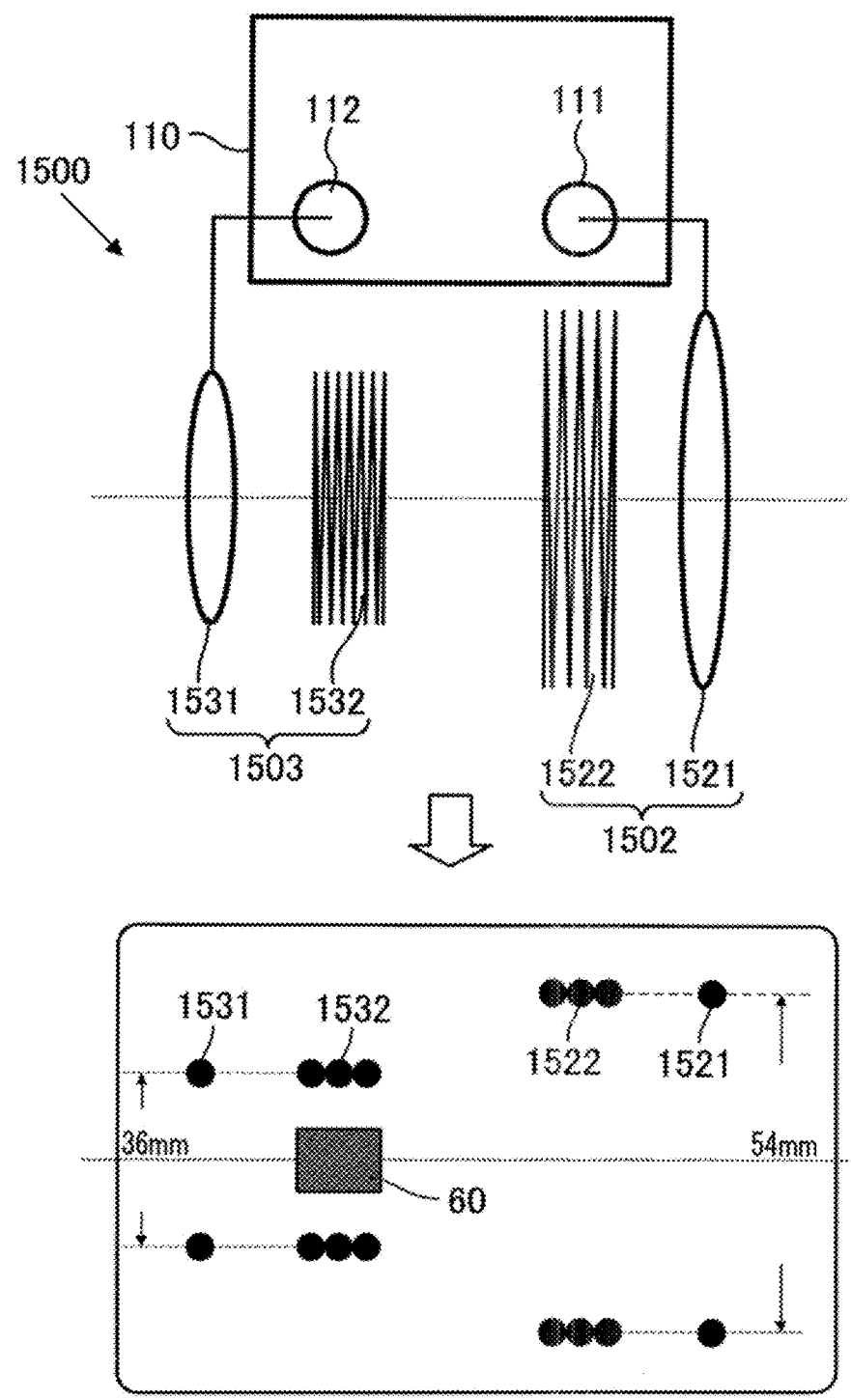
FIG. 30 is a diagram showing a structure of a wireless power supply system related to a fourth comparative example.

The wireless power supply systems 200, 300, and 400 of the first example each adopted coils with their coil diameters being set at the same diameter of 100 mmφ, for the power-supplying coil and the power-supplying resonator in the power-supplying module and for the power-receiving coil and the power-receiving resonator in the power-receiving module. A wireless power supply system of the fourth example however adopts coils with their coil diameters being different from each other, for the power-supplying coil and the power-supplying resonator in the power-supplying module and for the power-receiving coil and the power-receiving resonator in the power-receiving module, as shown in FIG. 30. Specifically, the coil diameters of the power-receiving coil and the power-receiving resonator in the power-receiving module were made smaller than those of the power-supplying coil and the power-supplying resonator in the power-supplying module. The power-supplying resonator of the power-supplying module and the power-receiving resonator of the power-receiving module were arranged to face each other, and cylindrical magnetic members covering the entire inner circumferential surfaces of the coils of the power-supplying resonator and the power-receiving resonator were arranged on the inner circumferential surface sides of the coils. Then, magnetic field strength of a magnetic field space Z formed by this wireless power supply system was measured. This is described below as the fourth example.

As in the first example, in the measurement, for the magnetic field space Z formed by the wireless power supply system 1500 having the power-supplying module 1502 and the power-receiving module 1503 without the magnetic members as shown in FIG. 30, variation in the transmission characteristic "S21" was measured with and without the aluminum piece 60 on the inner circumference side of the coil of the power-receiving resonator 1532, as a comparative example (hereinafter, simply referred to as fourth comparative example) relative to the fourth example.

Figure 32:
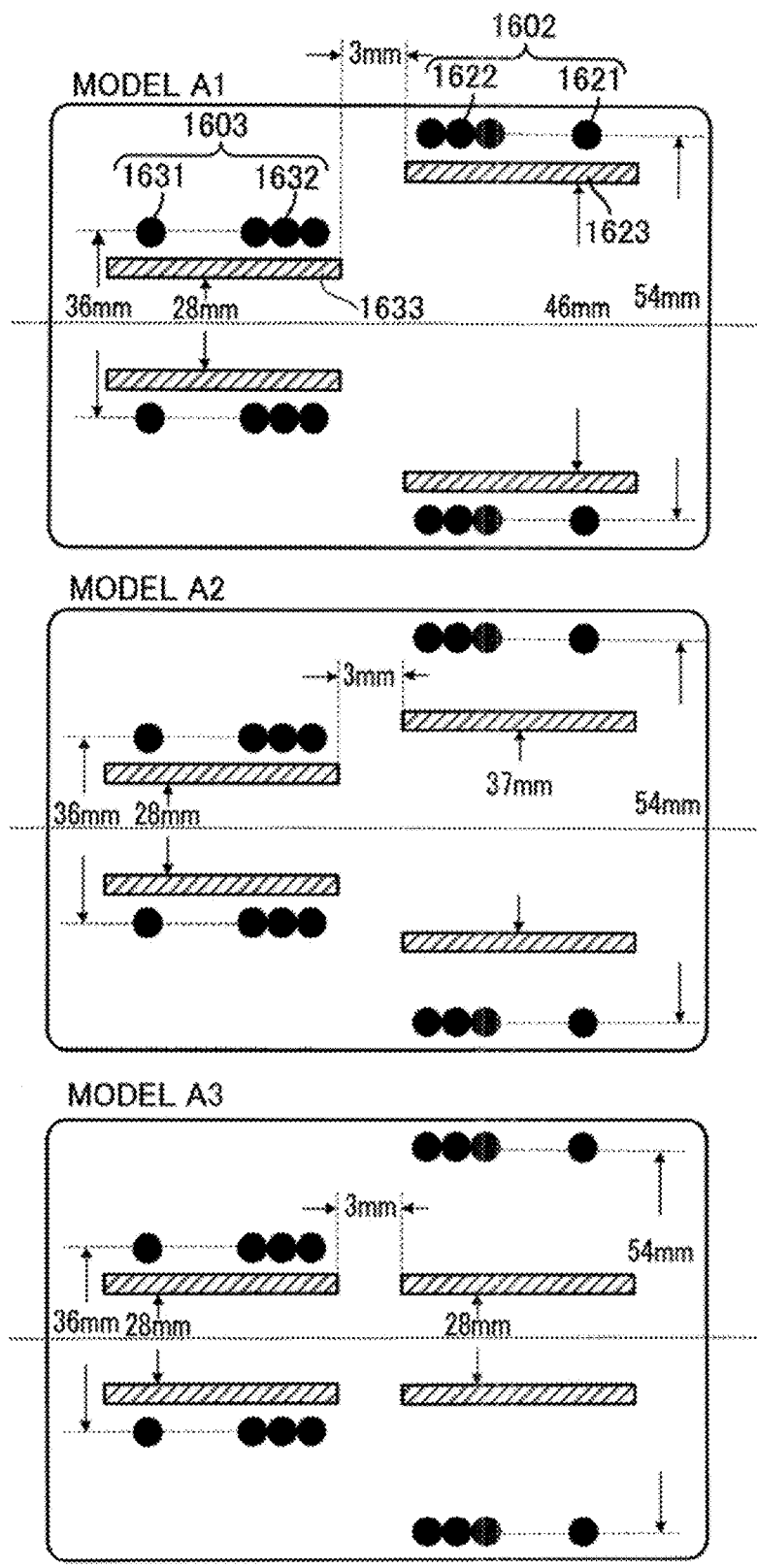
FIG. 32 is a diagram showing a structure of a wireless power supply system related to a fourth example.

Further, for the magnetic field space Z formed by the wireless power supply system 1600 having cylindrical magnetic members 1623 and 1633 covering the entire inner circumferential surfaces of the coils of a power-supplying resonator 1622 of the power-supplying module 1602 and a power-receiving resonator 1632 of a power-receiving module 1603 respectively as shown in FIG. 32, variation in the transmission characteristic "S21" and variation in the magnetic field strength were measured with and without the aluminum piece 60 on the inner circumference side of the power-receiving resonator 1632, and the magnetic field strength was measured without the aluminum piece 60, as an example in the second example (hereinafter, simply referred to as fourth example). Note that the fourth example includes three models (model A1, model A2, and model A3 which are detailed later) with different diameters of the cylindrical magnetic member 1623 which covers the entire inner circumferential surface of the coil of the power-supplying resonator 1622.

(Structure of Wireless Power Supply System 1500 Related to Fourth Comparative Example)

As shown in FIG. 30, the wireless power supply system 1500 used in the fourth comparative example included a power-supplying module 1502 and a power-receiving module 1503. The power-supplying module 1502 included a circular power-supplying coil 1521, and a power-supplying resonator 1522 in a cylindrical shape. The power-receiving module 1503 included a circular power-receiving coil 1531, and a power-receiving resonator 1532 having a cylindrical shape. As in the first example, the power-supplying coil 1521 was connected to the output terminal 111 of the network analyzer 110, and the power-receiving coil 1531 was connected to the input terminal 112 of the network analyzer 110.

The power-supplying coil 1521 plays a role of supplying power obtained from the network analyzer 110 to the power-supplying resonator 1522 by means of electromagnetic induction. The power-supplying coil 1521 was formed in a circular shape by winding once a copper wire material (coated by insulation film) having a wire diameter of 1 mmφ, and its inner diameter was set to 54 mmφ.

The power-receiving coil 1531 plays a role of outputting the power transmitted as magnetic field energy from the power-supplying resonator 1522 to the power-receiving resonator 1532 to the input terminal 112 of the network analyzer 110 by means of electromagnetic induction. The power-receiving coil 1531 was formed in a circular shape by winding once a copper wire material (coated by insulation film) having a wire diameter of 1 mmφ, and its inner diameter was set to 36 mmφ.

The power-supplying resonator 1522 and the power-receiving resonator 1532 are each an LC resonance circuit, and play a role of creating the magnetic field resonant state. The power-supplying resonator 1522 was a solenoid coil formed by winding four times a copper wire material (coated by insulation film) having a wire diameter of 1 mmφ in the form of solenoid, and its inner diameter was set to be 54 mmφ. The resonance frequency was set to 17.2 MHz. On the other hand, the power-receiving resonator 1532 was formed by winding six times a copper wire material (coated by insulation film) having a wire diameter of 1 mmφ, and was a solenoid coil with its inner diameter being 36 mmφ. The resonance frequency was set to 17.2 MHz.

The distance between the power-supplying coil 1521 and the power-supplying resonator 1522 was set to be 5 mm, the distance between the power-supplying resonator 1522 and the power-receiving resonator 1532 was set to be 18 mm, and the distance between the power-receiving resonator 1532 and the power-receiving coil 1531 was set to be 5 mm. The power-supplying resonator 1522 and the power-receiving resonator 1532 were arranged so that their coil surfaces face each other in parallel.

Note that, in the measurements of variations in the magnetic field strength and the transmission characteristic "S21", a cylindrical aluminum piece 60 made of aluminum with a thickness of 10 mm and a diameter of 27 mmφ was used as the metal piece to be arranged on the coil inner circumference side of the power-receiving resonator 1532.

(Measurement Result of Fourth Comparative Example)

For a magnetic field space Z formed by the wireless power supply system 1500 related to the fourth comparative example, variations in its magnetic field strength and transmission characteristic "S21" were measured, with and without an aluminum piece 60 arranged on an inner circumference side of the coil of the power-receiving resonator 1532. The results of the measurements are described below.

First, using the network analyzer 110, in the wireless power supply system 1500, the transmission characteristic "S21" was measured without the aluminum piece 60 arranged on the inner circumference side of the coil of the power-receiving resonator 1532, with various frequencies of the AC power to the wireless power supply system 1500.

Figure 31:
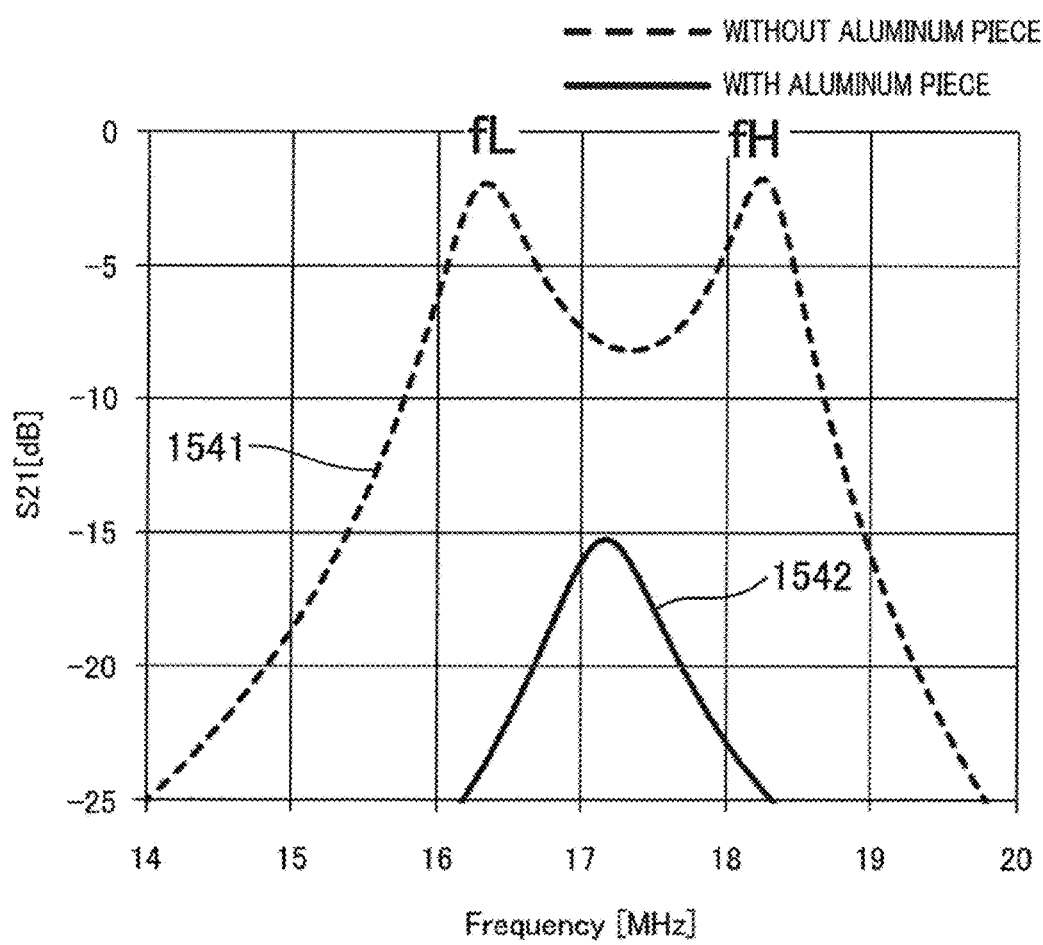
FIG. 31 is a graph indicating transmission characteristic S21 resulting from measurement in the fourth comparative example.

As the result of measurements, the transmission characteristic "S21" measured results in a waveform 1541 having separate peaks on a low frequency side and a high frequency side as shown in FIG. 31.

Next, in the wireless power supply system 1500, the transmission characteristic "S21" was measured with the aluminum piece 60 arranged on the inner circumference side of the coil of the power-receiving resonator 1532, with various frequencies of the AC power to the wireless power supply system 1500.

The measurement results are shown in FIG. 31 as a waveform 1542 representing the transmission characteristic "S21" measured with the aluminum piece 60 arranged on the inner circumference side of the coil of the power-receiving resonator 1532. It should be understood from the waveform 1542 that the transmission characteristic "S21" significantly lowers at the frequency fL nearby the peak on the low frequency side and at the frequency fH nearby the peak on the high frequency side, as compared with the waveform 1541 of the transmission characteristic "S21" in the case of not arranging the aluminum piece 60 on the inner circumference side of the coil of the power-receiving resonator 1532.

(Structure of Wireless Power Supply System 1600 Related to Fourth Example)

As shown in FIG. 32, the wireless power supply system 1600 used in the fourth example included a power-supplying module 1602 and a power-receiving module 1603. The power-supplying module 1602 included: a circular power-supplying coil 1621, a power-supplying resonator 1622 in a cylindrical shape, and a cylindrical magnetic member 1623 which covered the entire inner circumferential surface of the coil of the power-supplying resonator 1622. The power-receiving module 1603 included a circular power-receiving coil 1631, a power-receiving resonator 1632 in a cylindrical shape, and a cylindrical magnetic member 1633 which covered the entire inner circumferential surface of the coil of the power-receiving resonator 1632. As in the fourth comparative example, the power-supplying coil 1621 was connected to the output terminal 111 of the network analyzer 110, and the power-receiving coil 1631 was connected to the input terminal 112 of the network analyzer 110.

The magnetic members 1623 and 1633 are made of a resin in which magnetic powder was dispersed therein. The magnetic member 1623 of the model A1 had a cylindrical shape, with an inner diameter of 46 mmφ and a thickness of 1 mm, and its magnetic permeability was 100, as shown in FIG. 32.

The magnetic member 1623 of the model A2 had a cylindrical shape, with an inner diameter of 37 mmφ and a thickness of 1 mm, and its magnetic permeability was 100, as shown in FIG. 32. The magnetic member 1623 of the model A3 had a cylindrical shape, with an inner diameter of 28 mmφ and a thickness of 1 mm, and its magnetic permeability was 100, as shown in FIG. 32. Note that the magnetic member 1633 of each of the model A1, the model A2, and the model A3 had a cylindrical shape with a common inner diameter of 28 mmφ, and a thickness of 1 mm, and its magnetic permeability was 100. The structures of the power-supplying coil 1621, the power-supplying resonator 1622, the power-receiving coil 1631, and the power-receiving resonator 1632, other than those described above, were the same as the structures in the wireless power supply system 1500 related to the fourth comparative example.
(Measurement Result of Fourth Example)

For a magnetic field space Z formed by the wireless power supply system 1600 related to the fourth example, variations in its magnetic field strength and transmission characteristic "S21" were measured, with and without an aluminum piece 60 arranged on an inner circumference side of the coil of the power-receiving resonator 1632. The results of the measurements are described below.

First, using the network analyzer 110, in the wireless power supply system 1600, the transmission characteristic "S21" was measured without the aluminum piece 60 arranged on the inner circumference side of the coil of the power-receiving resonator 1632, with various frequencies of the AC power to the wireless power supply system 1600.

Figure 33:
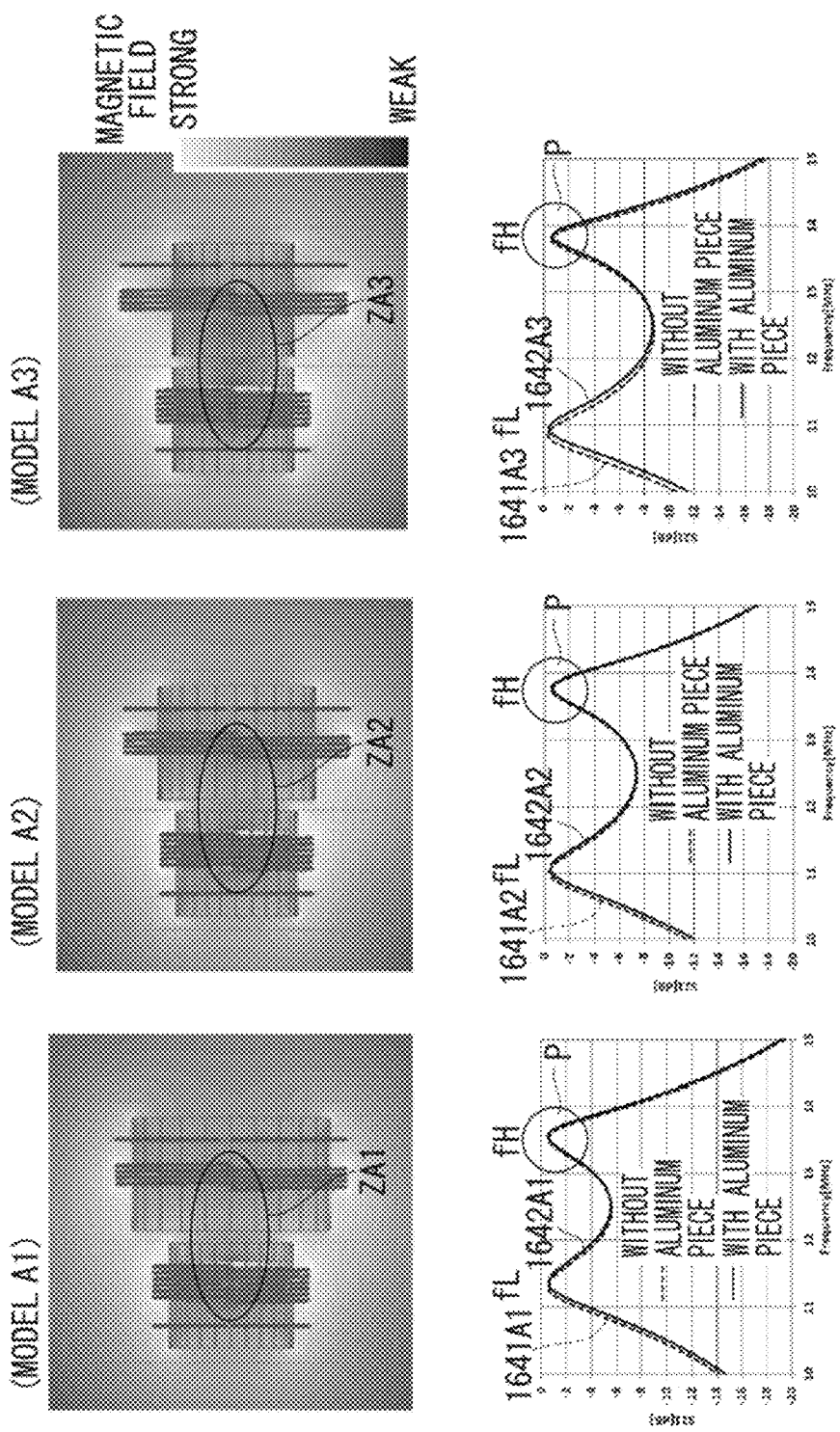
FIG. 33 includes a graph indicating the transmission characteristic S21 resulting from measurement in the fourth example, and a diagram showing distribution of magnetic field strength related to the fourth example.

As the result of measurement for the model A1, the resulting waveform 1641A1 of the measured transmission characteristic "S21" had separate peaks; one on a low frequency side and another on a high frequency side, as shown in FIG. 33.

Meanwhile, the distribution of the magnetic field strength of the model A1 in the case of setting the frequency of the AC power to the power-supplying module 1602 to the frequency fH nearby the peak on the high frequency side (antiphase resonance mode) is shown in FIG. 33. From this distribution of magnetic field strength, it is confirmed that the magnetic field space ZA1 less affected by the magnetic field and having relatively weak magnetic field strength is formed on the inner circumference sides of the power-supplying resonator 1622 and the power-receiving resonator 1632. Thus, it is possible to form a magnetic field space ZA1 having small magnetic field strength, on the inner circumference sides of the power-supplying resonator 1622 and the power-receiving resonator 1632, in the antiphase resonance mode.

Likewise, in the model A2, the resulting waveform 1641A2 of the measured transmission characteristic "S21" had separate peaks; one on a low frequency side and another on a high frequency side.

Meanwhile, the distribution of the magnetic field strength of the model A2 in the case of setting the frequency of the AC power to the power-supplying module 1602 to the frequency fH nearby the peak on the high frequency side (antiphase resonance mode) is shown in FIG. 33. From this distribution of magnetic field strength, it is confirmed that the magnetic field space ZA2 less affected by the magnetic field and having relatively weak magnetic field strength is formed on the inner circumference sides of the power-supplying resonator 1622 and the power-receiving resonator 1632, as in the case of the model A1. Even with the model A2 whose inner diameter is smaller than that of the magnetic member 1623 in the model A1, it is possible to form a magnetic field space ZA2 whose magnetic field strength is similar to that in the model A1, on the inner circumference side of the power-supplying resonator 1622 and the power-receiving resonator 1632, in the antiphase resonance mode.

Likewise, in the model A3, the resulting waveform 1641A3 of the measured transmission characteristic "S21" had separate peaks; one on a low frequency side and another on a high frequency side.

Meanwhile, the distribution of the magnetic field strength of the model A3 in the case of setting the frequency of the AC power to the power-supplying module 1602 to the frequency fB nearby the peak on the high frequency side (antiphase resonance mode) is shown in FIG. 33. From this distribution of magnetic field strength, it is confirmed that the magnetic field space ZA3 less affected by the magnetic field and having relatively weak magnetic field strength is formed on the inner circumference sides of the power-supplying resonator 1622 and the power-receiving resonator 1632, as in the case of the model A1 and model A2. Even with the model A3 whose inner diameter is smaller than those of the magnetic members 1623 in the model A1 and the model A2, it is possible to form a magnetic field space ZA3 whose magnetic field strength is similar to those in the model A1 and the model. A2, on the inner circumference side of the power-supplying resonator 1622 and the power-receiving resonator 1632, in the antiphase resonance mode.

Next, in the wireless power supply system 1600, the transmission characteristic "S21" was measured with the aluminum piece 60 arranged on the inner circumference side of the coil of the power-receiving resonator 1632, with various frequencies of the AC power to the wireless power supply system 1600.

The measurement results of the model A1 are shown in FIG. 33 as a waveform 1642A1 representing the transmission characteristic "S21" measured with the aluminum piece 60 arranged on the inner circumference side of the coil of the power-receiving resonator 1632. Although the transmission characteristic "S21" at the frequency fL nearby the peak on the low frequency side shown by the waveform 1642A1 is slightly lower than the transmission characteristic "S21" shown by the waveform 1641A1 resulted with no aluminum piece 60 on the inner circumference side of the coil of the power-receiving resonator 1632, it should be understood the transmission characteristic itself is maintained at a high value. The transmission characteristic "S21" at the frequency fH nearby the peak on the high frequency side, on the other hand, is substantially the same as the transmission characteristic "S21" shown by the waveform 1641A1 resulting without no aluminum piece 60 on the inner circumference side of the coil of the power-receiving resonator 1632 (see point P of the model A1 in FIG. 33).

The measurement results of the model A2 are shown in FIG. 33 as a waveform 1642A2 representing the transmission characteristic "S21" measured with the aluminum piece 60 arranged on the inner circumference side of the coil of the power-receiving resonator 1632. Although the transmission characteristic "S21" at the frequency fL nearby the peak on the low frequency side shown by the waveform 1642A2 is slightly lower than the transmission characteristic "S21" shown by the waveform 1641A2 resulted with no aluminum piece 60 on the inner circumference side of the coil of the power-receiving resonator 1632, it should be understood the transmission characteristic itself is maintained at a high value. The transmission characteristic "S21" at the frequency fH nearby the peak on the high frequency side, on the other hand, is substantially the same as the transmission characteristic "S21" shown by the waveform 1641A2 resulting without no aluminum piece 60 on the inner circumference side of the coil of the power-receiving resonator 1632 (see point P of the model A2 in FIG. 33).

The measurement results of the model. A3 are shown in FIG. 33 as a waveform 1642A3 representing the transmission characteristic "S21" measured with the aluminum piece 60 arranged on the inner circumference side of the coil of the power-receiving resonator 1632. Although the transmission characteristic "S21" at the frequency fL nearby the peak on the low frequency side shown by the waveform 1642A3 is slightly lower than the transmission characteristic "S21" shown by the waveform 1641A3 resulted with no aluminum piece 60 on the inner circumference side of the coil of the power-receiving resonator 1632, it should be understood the transmission characteristic itself is maintained at a high value. The transmission characteristic "S21" at the frequency fH nearby the peak on the high frequency side, on the other hand, is substantially the same as the transmission characteristic "S21" shown by the waveform 1641A3 resulting without no aluminum piece 60 on the inner circumference side of the coil of the power-receiving resonator 1632 (see point P of the model A3 in FIG. 33).

From the above measurement results, it should be understood that, for the three models (model A1, model A2, and model A3) of the cylindrical magnetic members 1623 for covering the entire inner circumferential surface of the coil of the power-supplying resonator 1622, each having a diameter different from the others, the transmission characteristic "S21" at the frequency fH nearby the peak on the high frequency side is maintained substantially at the same value as the transmission characteristic "S21" represented by the waveform 1641A3, which resulted in the case of not arranging the aluminum piece 60 on the inner circumference side of the coil of the power-receiving resonator 1632. In other words, even when the inner diameter of the magnetic member 1623 is reduced, it is possible to form a magnetic field space with a relatively small magnetic field strength on the inner circumference sides of the power-supplying resonator 1622 and the power-receiving resonator 1632.

Although the wireless power supply system 1600 of the fourth example adopted the magnetic members 1623 and 1633 whose respective thicknesses were 1 mm, in the fourth example 2, the thickness of each of the magnetic members 1623 and 1633 were increased to 2 mm. Then, for the magnetic field space Z formed by the wireless power supply system 1600 adopting these magnetic members 1623 and 1633, variation in the transmission characteristic "S21" was measured with and without the aluminum piece 60 on the inner circumference side of the power-receiving resonator 1632. Note that the thicknesses of the magnetic members 1623 and 1533 in the model A1 of the fourth example are changed from 1 mm to 2 mm, and described as a model A1-2 in the following description. Similarly, the thicknesses of the magnetic members 1623 and 1633 in the model A2 of the fourth example are changed from 1 mm to 2 mm, and described as a model A2-2 in the following description. Further, the thicknesses of the magnetic members 1623 and 1633 in the model A3 of the fourth example are changed from 1 mm to 2 mm, and described as a model A3-2 in the following description. The structures, other than those described above, were similar to that of the wireless power supply system 1600 related to the fourth example.

Figure 34:
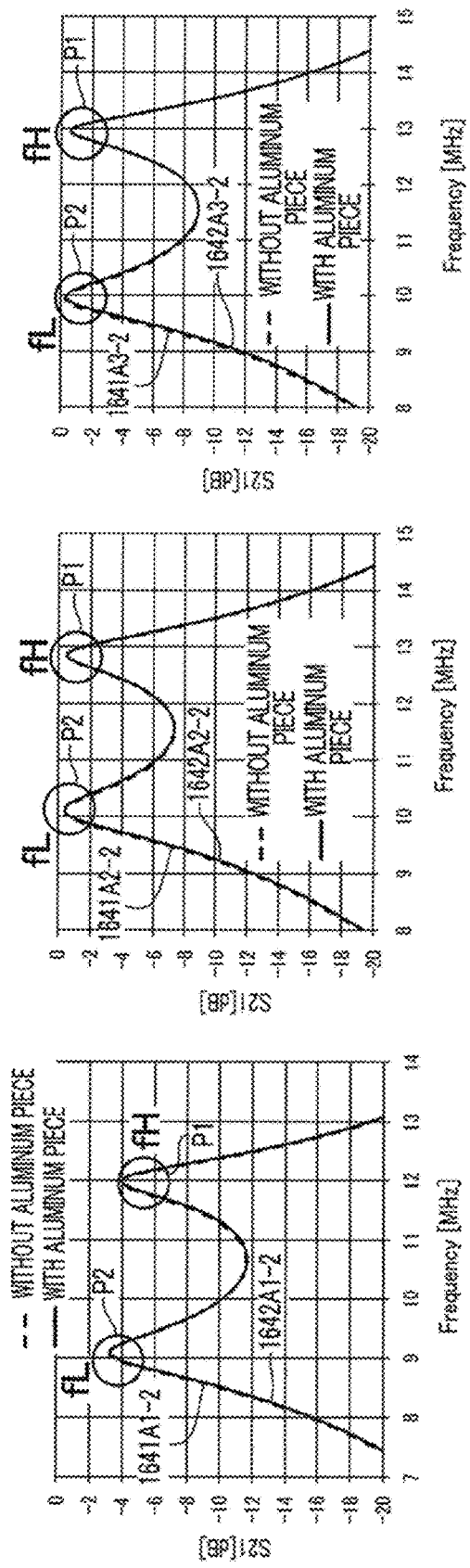
FIG. 34 is a graph indicating transmission characteristic S21 resulting from measurement in the fourth example 2.

As the result of measurement for the model A1-2, the resulting waveform 1641A1-2 of the measured transmission characteristic "S21" had separate peaks in cases of both with and without the aluminum piece 60 on the inner circumference side of the coil of the power-receiving resonator 1632; one on a low frequency side and another on a high frequency side, as shown in FIG. 34.

On the other hand, FIG. 34 shows a waveform 1642A1-2 representing a resulting transmission characteristic "S21", when measured with the aluminum piece 60 on the inner circumference side of the coil of the power-receiving resonator 1632 in the model A1-2. In this waveform 1642A1-2, the transmission characteristic "S21" at the frequency fH nearby the peak on the high frequency side is substantially the same as the transmission characteristic "S21" shown by the waveform 1641A1-2 resulting without no aluminum piece 60 on the inner circumference side of the coil of the power-receiving resonator 1632 (see point P1 of the model A1-2 in FIG. 34). Further, the transmission characteristic "S21" at the frequency fL nearby the peak on the low frequency side is maintained at substantially the same value as the transmission characteristic "S21" shown by the waveform 1641A1-2 resulted with no aluminum piece 60 on the inner circumference side of the coil of the power-receiving resonator 1632 (see point P2 of model A1-2 in FIG. 34).

Further, the resulting waveform 1641A2-2 of the measured transmission characteristic "S21" in the model. A2-2 also had separate peaks in cases of both with and without the aluminum piece 60 on the inner circumference side of the coil of the power-receiving resonator 1632; one on a low frequency side and another on a high frequency side.

On the other hand, FIG. 34 shows a waveform 1642A2-2 representing a resulting transmission characteristic "S21", when measured with the aluminum piece 60 on the inner circumference side of the coil of the power-receiving resonator 1632 in the model A2-2. In this waveform 1642A2-2, the transmission characteristic "S21" at the frequency fH nearby the peak on the high frequency side is substantially the same as the transmission characteristic "S21" shown by the waveform 1641A2-2 resulting without no aluminum piece 60 on the inner circumference side of the coil of the power-receiving resonator 1632 (see point P1 of the model A2-2 in FIG. 34). Further, the transmission characteristic "S21" at the frequency fL nearby the peak on the low frequency side is maintained at substantially the same value as the transmission characteristic "S21" shown by the waveform 1641A2-2 resulted with no aluminum piece 60 on the inner circumference side of the coil of the power-receiving resonator 1632 (see point P2 of model A2-2 in FIG. 34).

Further, the resulting waveform 1641A3-2 of the measured transmission characteristic "S21" in the model A3-2 also had separate peaks in cases of both with and without the aluminum piece 60 on the inner circumference side of the coil of the power-receiving resonator 1632; one on a low frequency side and another on a high frequency side.

On the other hand, FIG. 34 shows a waveform 1642A3-2 representing a resulting transmission characteristic "S21", when measured with the aluminum piece 60 on the inner circumference side of the coil of the power-receiving resonator 1632 in the model A3-2. In this waveform 1642A3-2, the transmission characteristic "S21" at the frequency fH nearby the peak on the high frequency side is substantially the same as the transmission characteristic "S21" shown by the waveform 1641A3-2 resulting without no aluminum piece 60 on the inner circumference side of the coil of the power-receiving resonator 1632 (see point P1 of the model A3-2 in FIG. 34). Further, the transmission characteristic "S21" at the frequency fL nearby the peak on the low frequency side is maintained at substantially the same value as the transmission characteristic "S21" shown by the waveform 1641A3-2 resulted with no aluminum piece 60 on the inner circumference side of the coil of the power-receiving resonator 1632 (see point P2 of model A3-2 in FIG. 34).

From the above measurement results, it should be understood that, for the three models (model A1-2, model A2-2, and model A3-2) of the cylindrical magnetic members 1623 for covering the entire inner circumferential surface of the coil of the power-supplying resonator 1622, each having an increased thickness, arranging of the aluminum piece 60 on the inner circumferential side of the coil of the power-receiving resonator 1632 results in the transmission characteristic "S21" at the frequency fH nearby the peak on the high frequency side and the transmission characteristic "S21" at the frequency fL nearby the peak on the low frequency side, which are maintained substantially at the same value as those resulted in the case of not arranging the aluminum piece 60 on the inner circumference side of the coil of the power-receiving resonator 1632.

(Fifth Example)

In the above described wireless power supply system 200 or the like, the distance A between the power-supplying coil 21 and the power-supplying resonator 22 was set to 15 mm, the distance B between the power-receiving coil 31 and the power-receiving resonator 32 was set to 15 mm, and the distance C between the power-supplying resonator 22 and the power-receiving resonator 32 was set to 30 mm (see FIG. 2). The fifth example deals with a wireless power supply system in which the distance A between the power-supplying coil and the power-supplying resonator and the distance B between the power-receiving coil and the power-receiving resonator were set to 0 mm. In other words, in the apparatus of the fifth example, the power-supplying coil was arranged on the inner circumference side of the power-supplying resonator, and the power-receiving coil was arranged on the inner circumference side of the power-receiving resonator. Specifically, in the power-supplying module, the power-supplying coil was arranged on the inner circumference side of the power-supplying resonator, and the cylindrical magnetic member was arranged on the inner circumference side of the power-supplying coil. In the power-receiving module, the power-receiving coil was arranged on the inner circumference side of the power-receiving resonator, and the cylindrical magnetic member was arranged on the inner circumference side of the power-receiving coil. Then, for the magnetic field space Z formed by the wireless power supply system having such a structure, magnetic field strength and the like were measured. This is described below as the fifth example.

Figure 35:
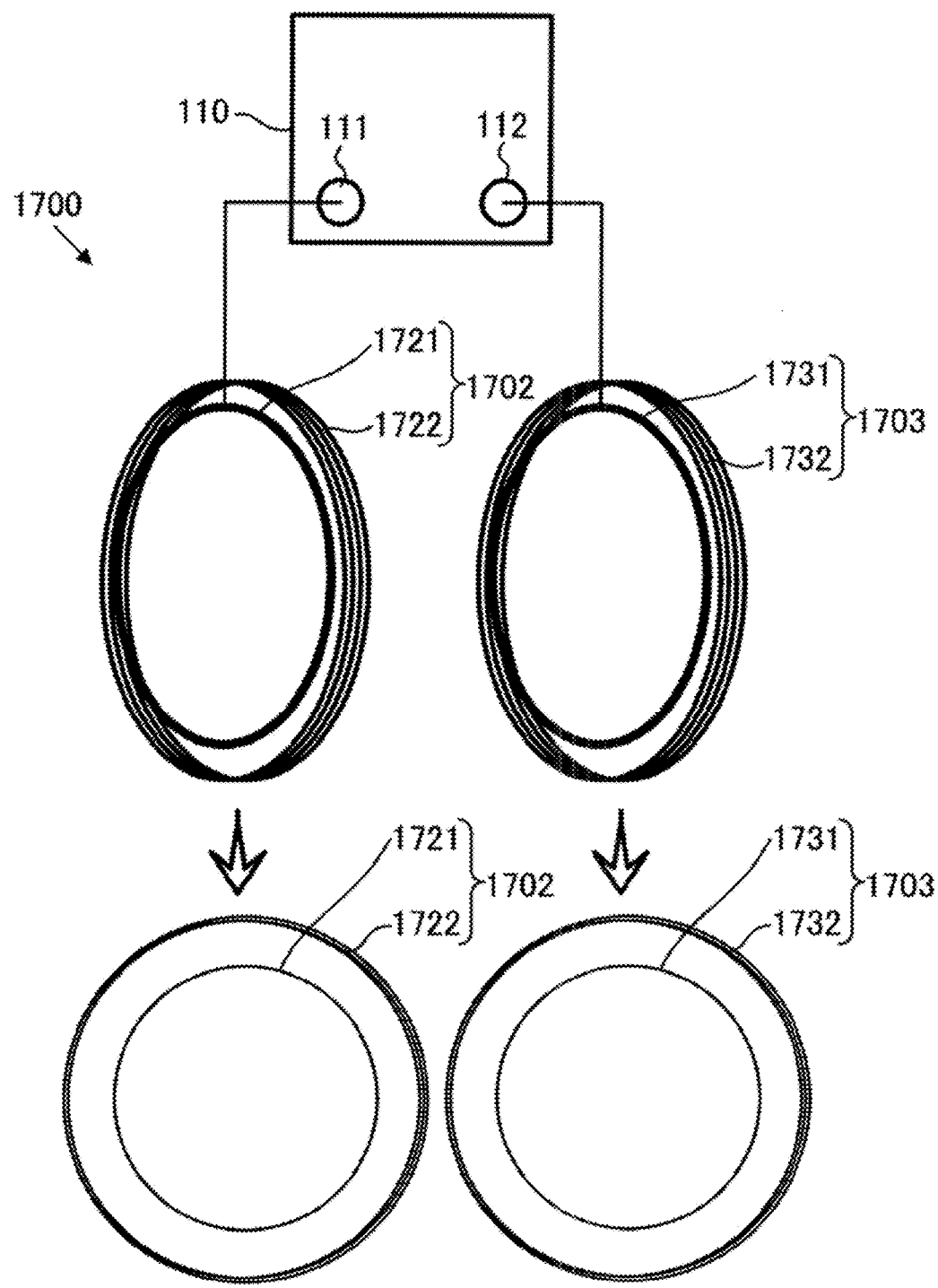
FIG. 35 is a diagram showing a structure of a wireless power supply system related to a fifth comparative example.

As in the first example, in the measurement, for the magnetic field space Z formed by the wireless power supply system 1700 having the power-supplying module 1702 and the power-receiving module 1703 without the magnetic members as shown in FIG. 35, variation in the transmission characteristic "S21" and variation in the magnetic field strength were measured with and without the aluminum piece 60 on the inner circumference side of the coil of the power-receiving resonator 1732, as a comparative example (hereinafter, simply referred to as fifth comparative example) relative to the fifth example.

Figure 38:
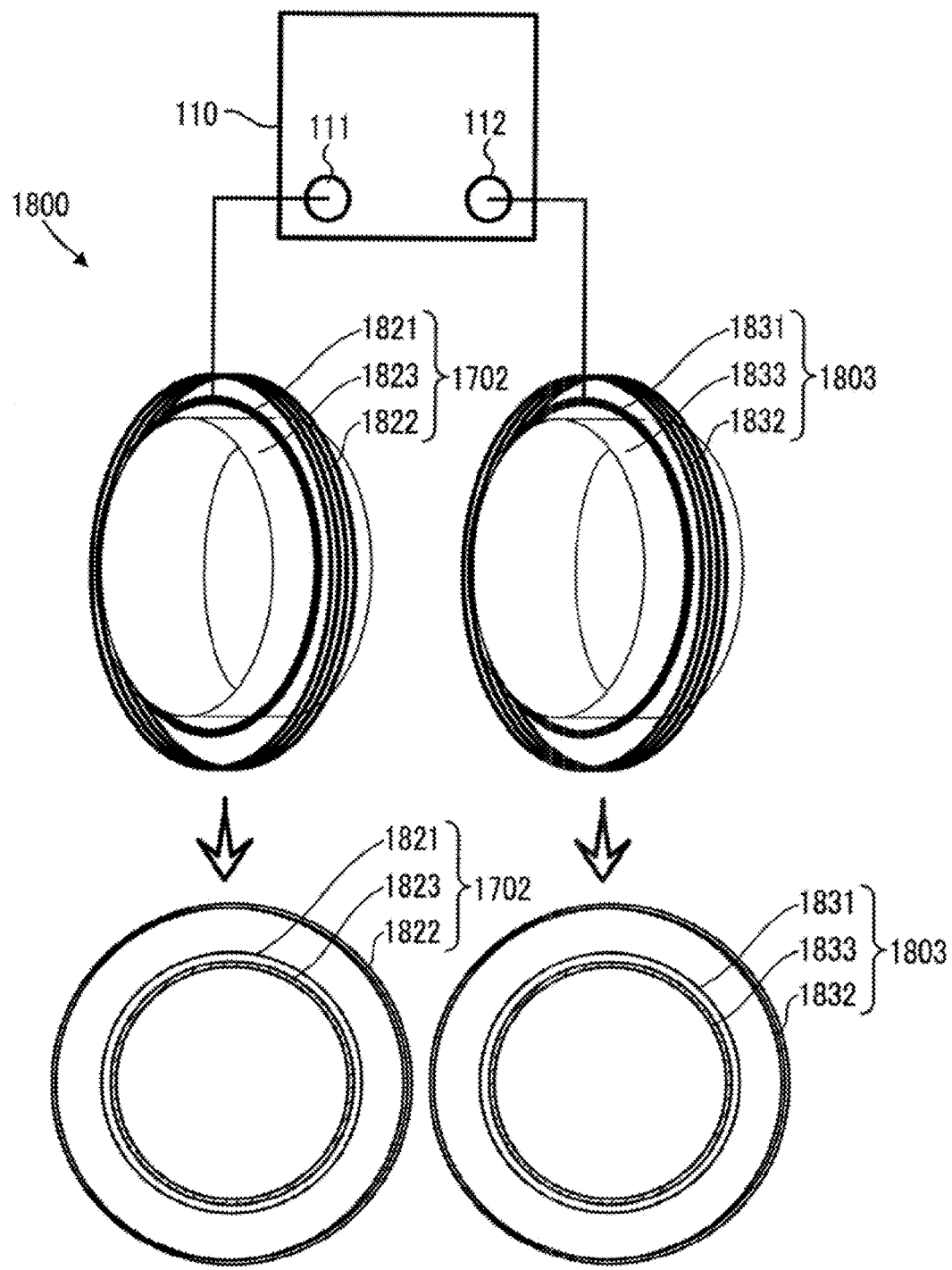
FIG. 38 is a diagram showing a structure of a wireless power supply system related to a fifth example.

Further, for the magnetic field space Z formed by the wireless power supply system 1800 having cylindrical magnetic members 1823 and 1833 covering the entire inner circumferential surfaces of the coils of a power-supplying resonator 1822 of the power-supplying module 1802 and a power-receiving resonator 1832 of a power-receiving module 1803 respectively as shown in FIG. 38, variation in the transmission characteristic "S21" and variation in the magnetic field strength were measured with and without the aluminum piece 60 on the inner circumference side of the power-receiving resonator 1832, as an example in the fifth example (hereinafter, simply referred to as fifth example).

(Structure of Wireless Power Supply System 1700 Related to Fifth Comparative Example)

As shown in FIG. 35, the wireless power supply system 1700 used in the fifth comparative example included a power-supplying module 1702 having a power-supplying coil 1721 on the inner circumference side of a power-supplying resonator 1722, and a power-receiving module 1703 having a power-receiving coil 1731 arranged on the inner circumference side of a power-receiving resonator 1732. As in the first example, the power-supplying coil 1721 was connected to the output terminal 111 of the network analyzer 110, and the power-receiving coil 1731 was connected to the input terminal 112 of the network analyzer 110.

The power-supplying coil 1721 plays a role of supplying power obtained from the network analyzer 110 to the power-supplying resonator 1722 by means of electromagnetic induction. The power-supplying coil 1721 was formed in a circular shape by winding once a copper wire material (coated by insulation film) having a wire diameter of 1 mmφ, and its inner diameter was set to 70 mmφ.

The power-receiving coil 1731 plays a role of outputting the power transmitted as magnetic field energy from the power-supplying resonator 1722 to the power-receiving resonator 1732 to the input terminal 112 of the network analyzer 110 by means of electromagnetic induction. The power-receiving coil 1731 was formed in a circular shape by winding once a copper wire material (coated by insulation film) having a wire diameter of 1 mmφ, and its inner diameter was set to 70 mmφ.

The power-supplying resonator 1722 and the power-receiving resonator 1732 are each an LC resonance circuit, and play a role of creating the magnetic field resonant state. The power-supplying resonator 1722 and the power-receiving resonator 1732 each had a solenoid coil and were formed by winding three times a copper wire material (coated by insulation film) having a wire diameter of 1 mmφ in the form of solenoid. The inner diameter was set to be 100 mmφ. The resonance frequency was set to 12.9 MHz.

The distance between the power-supplying resonator 1722 and the power-receiving resonator 1732 was set 30 mm.

Note that, in the measurements of variations in the magnetic field strength and the transmission characteristic "S21", a cylindrical aluminum piece 60 made of aluminum with a thickness of 20 mm and a diameter of 58 mmφ was used as the metal piece to be arranged on the coil inner circumference side of the power-receiving resonator 1732.

(Measurement Results of Fifth Comparative Example)

For a magnetic field space Z formed by the wireless power supply system 1700 related to the fifth comparative example, variations in its magnetic field strength and transmission characteristic "S21" were measured, with and without an aluminum piece 60 arranged on an inner circumference side of the coil of the power-receiving resonator 1732. The results of the measurements are described below.

First, using the network analyzer 110, in the wireless power supply system 1700, the transmission characteristic "S21" was measured without the aluminum piece 60 arranged on the inner circumference side of the coil of the power-receiving resonator 1732, with various frequencies of the AC power to the wireless power supply system 1700.

Figure 36:
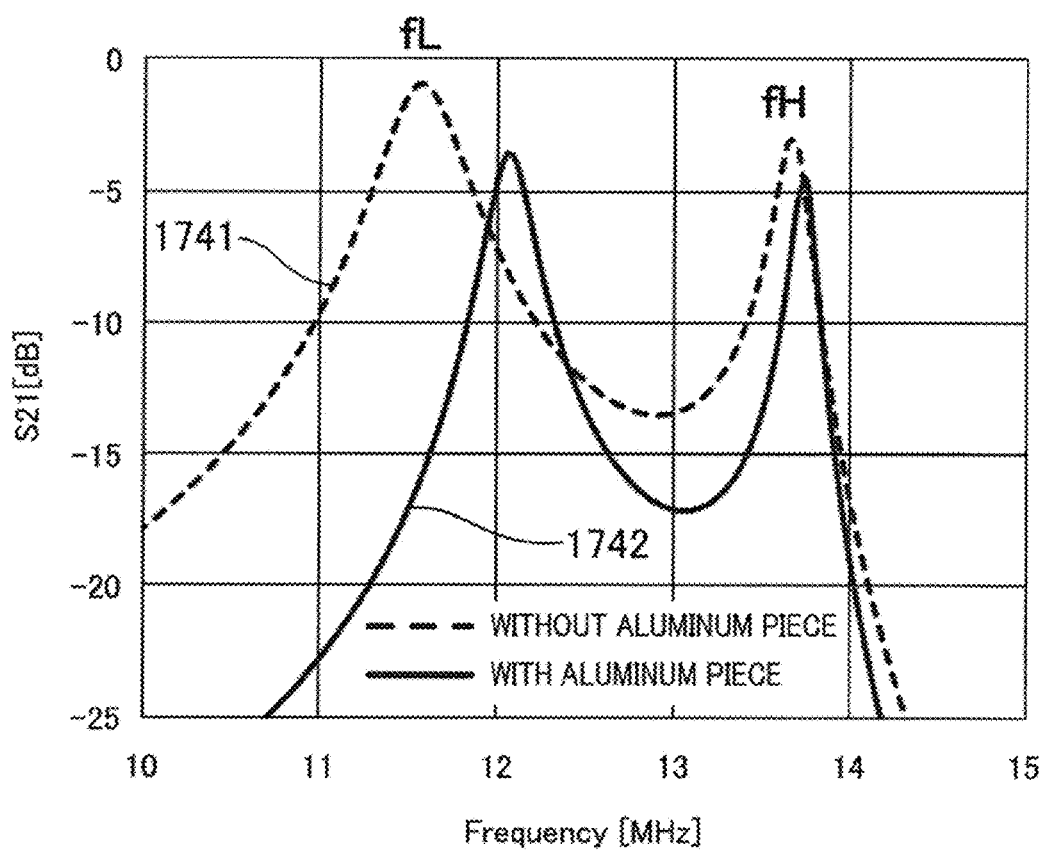
FIG. 36 is a graph indicating transmission characteristic S21 resulting from measurement in the fifth comparative example.

As the result of measurements, the transmission characteristic "S21" measured results in a waveform 1741 having separate peaks or a low frequency side and a high frequency side as shown in FIG. 36.

When the frequency of the AC power to the power-supplying module 1702 was set to the frequency fL nearby the peak on the low frequency side (inphase resonance mode), the power-supplying resonator 1722 and the power-receiving resonator 1732 were resonant with each other in inphase, and the current in the power-supplying resonator 1722 and the current in the power-receiving resonator 1732 both flowed in the same direction. The distribution of the magnetic field strength in this inphase resonance mode is shown in FIG. 37 (A). It should be understood from the distribution of magnetic field strength shown in FIG. 37(A) that the influence of the magnetic field is weakened around the outer circumference sides of the power-supplying resonator 1722 and the power-receiving resonator 1732, and a magnetic field space Z1751 having a relatively small magnetic field strength is confirmed.

Figure 37A:
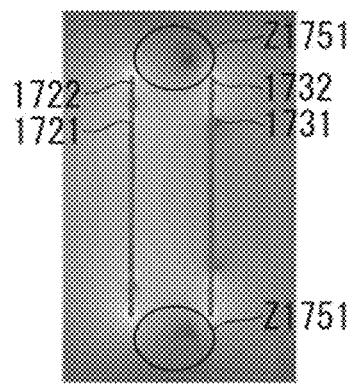
FIG. 37 is a diagram showing distribution of magnetic field strength related to the fifth comparative example.
Figure 37B:
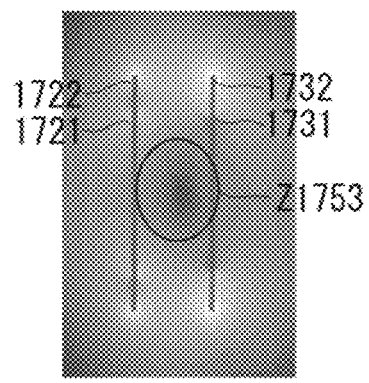

On the other hand, when the frequency of the AC power to the power-supplying module 1702 was set to the frequency fH nearby the peak on the side of the high frequency side (antiphase resonance mode), the power-supplying resonator 1722 and the power-receiving resonator 1732 resonated with each other in antiphase, and the current in the power-supplying resonator 1722 and the current in the power-receiving resonator 1732 flowed opposite directions to each other. The distribution of magnetic field strengths in this antiphase resonance mode is shown in FIG. 37(B). From the distribution of magnetic field strength shown in FIG. 37 (B), a magnetic field space Z1753 with a relatively small magnetic field strength, which is less influenced by the magnetic field is confirmed around the inner circumference sides of the power-supplying resonator 1722 and the power-receiving resonator 1732.

Next, in the wireless power supply system 1700, the transmission characteristic "S21" was measured with the aluminum piece 60 arranged on the inner circumference side of the coil of the power-receiving resonator 1732, with various frequencies of the AC power to the wireless power supply system 1700.

The measurement results are shown in FIG. 36 as a waveform 1742 representing the transmission characteristic "S21" measured with the aluminum piece 60 arranged on the inner circumference side of the coil of the power-receiving resonator 1732. It should be understood from the waveform 1742 that the transmission characteristic "S21" significantly lowers at the frequency fL nearby the peak on the low frequency side, as compared with the waveform 1741 of the transmission characteristic "S21" in the case of not arranging the aluminum piece 60 on the inner circumference side of the coil of the power-receiving resonator 1732. Similarly, it should be understood that the transmission characteristic "S21" significantly lowers at the frequency fH nearby the peak on the high frequency side, as compared with the waveform 1741 of the transmission characteristic "S21" in the case of not arranging the aluminum piece 60 on the inner circumference side of the coil of the power-receiving resonator 1732.

Figure 37C:
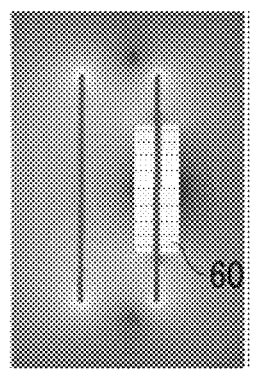
Figure 37D:
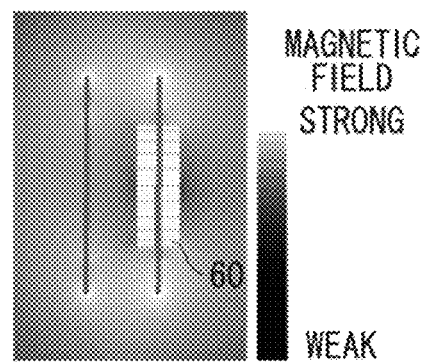

The distribution of magnetic field strength in the inphase resonance mode with the aluminum piece 60 on the inner circumference side of the coil of the power-receiving resonator 1732 is shown in FIG. 37(C). Further, the distribution of magnetic field strength in the antiphase resonance mode with the aluminum piece 60 on the inner circumference side of the coil of the power-receiving resonator 1732 is shown in FIG. 37 (D). It should be understood from these figures, when the aluminum piece 60 is arranged on the inner circumference sides of the coils of the power-receiving resonator 1732 in the wireless power supply system 1700, the distribution of the magnetic field strength is directly influenced by the aluminum piece 60. In other words, the aluminum piece 60 is directly influenced by the magnetic field generated in the wireless power supply system 1700.

(Structure of Wireless Power Supply System 1800 Related to Fifth Example)

As shown in FIG. 38, the wireless power supply system 1800 used in the fifth example included: a power-supplying module 1802 in which a power-supplying coil 1821 was arranged on the inner circumference side of the power-supplying resonator 1822 and a cylindrical magnetic member 1823 was arranged on the inner circumference side of the power-supplying coil 1821; and a power-receiving module 1803 in which a power-receiving coil 1831 was arranged on the inner circumference side of the power-receiving resonator 1832 and a cylindrical magnetic member 1833 was arranged on the inner circumference side of the power-receiving coil 1831. As in the fifth comparative example, the power-supplying coil 1821 was connected to the output terminal 111 of the network analyzer 110 and the power-receiving coil 1831 was connected to the input terminal 112 of the network analyzer 110.

The magnetic members 1823 and 1833 are made of a resin in which magnetic powder was dispersed therein. The magnetic members 1823 and 1833 each had a cylindrical shape, with an inner diameter of 60 mmφ, a height of 30 mm, and a thickness of 1 mm, and with its magnetic permeability being 100. The structures of the power-supplying coil 1821, the power-supplying resonator 1822, the power-receiving coil 1831, and the power-receiving resonator 1332, other than those described above, were the same as the structures in the wireless power supply system 1700 related to the fifth comparative example.

(Measurement Results of Fifth Example)

For a magnetic field space Z formed by the wireless power supply system 1800 related to the fifth example, variations in its magnetic field strength and transmission characteristic "S21" were measured, with and without an aluminum piece 60 arranged on an inner circumference side of the coil of the power-receiving resonator 1832 (more specifically, on the inner circumferential side of the magnetic member 1833). The results of the measurements are described below.

First, using the network analyzer 110, in the wireless power supply system 1800, the transmission characteristic "S21" was measured without the aluminum piece 60 arranged on the inner circumference side of the coil of the power-receiving resonator 1832, with various frequencies of the AC power to the wireless power supply system 1800.

Figure 39:
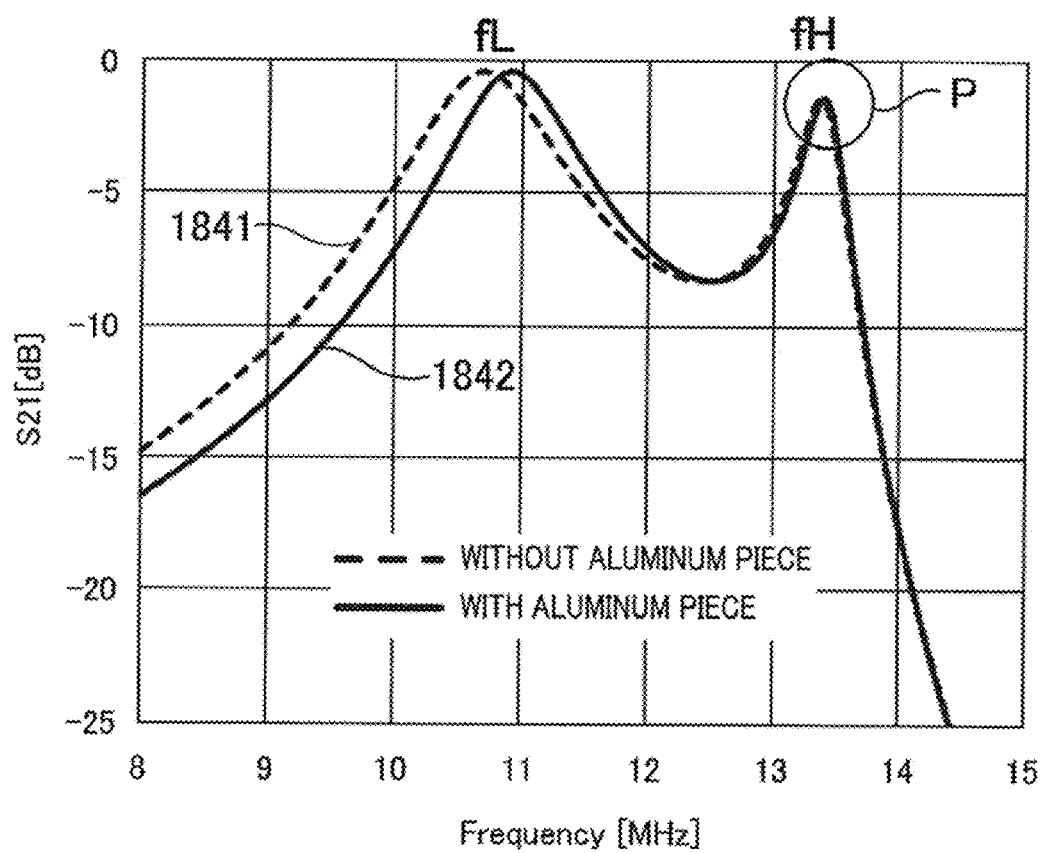
FIG. 39 is a graph indicating transmission characteristic S21 resulting from measurement in the fifth example.

As the result of measurements, the transmission characteristic "S21" measured results in a waveform 1841 having separate peaks or a low frequency side and a high frequency side as shown in FIG. 39.

Figure 40A:
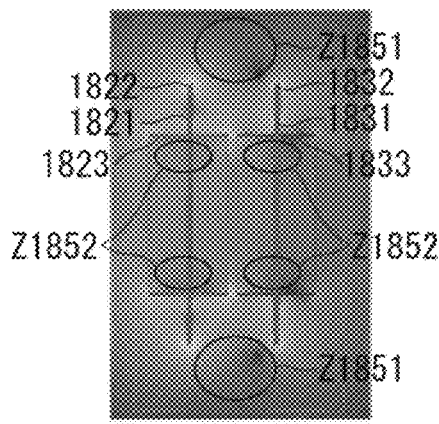
FIG. 40 is a diagram showing distribution of magnetic field strength related to the fifth example.

The distribution of the magnetic field strength in the case of setting the frequency of the AC power to the power-supplying module 1802 to the frequency fL nearby the peak on the low frequency side (inphase resonance mode) is shown in FIG. 40(A). It should be understood from the distribution of magnetic field strength shown in FIG. 40(A) that the influence of the magnetic field is weakened around the outer circumference sides of the power-supplying resonator 1822 and the power-receiving resonator 1832, and a magnetic field space Z1851 having a relatively small magnetic field strength is confirmed. Further, a magnetic field space Z1852 with magnetic field strength slightly less influenced by the magnetic field was confirmed on the inner circumference side of each of the power-supplying resonator 1822 and the power-receiving resonator 1832. Thus, it is possible to form a magnetic field space Z1852 whose magnetic field strength is relatively smaller than that in the fifth comparative example on the inner circumference side of each of the power-supplying resonator 1822 and the power-receiving resonator 1832, in the inphase resonance mode.

Figure 40B:
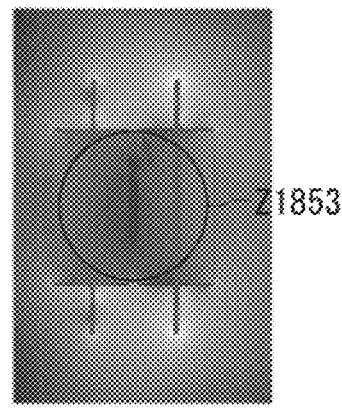

Meanwhile, the distribution of the magnetic field strength in the case of setting the frequency of the AC power to the power-supplying module 1802 to the frequency fH nearby the peak on the high frequency side (antiphase resonance mode) is shown in FIG. 40(B). From the distribution of magnetic field strength shown in FIG. 40(B), a magnetic field space Z1853 with a relatively small magnetic field strength, which is less influenced by the magnetic field is confirmed around the inner circumference sides of the power-supplying resonator 1822 and the power-receiving resonator 1832. Thus, it is possible to form a magnetic field space Z1853 whose magnetic field strength is relatively smaller than that in the fifth comparative example on the inner circumference side of each of the power-supplying resonator 1822 and the power-receiving resonator 1832, in the antiphase resonance mode. The magnetic field space Z1853 formed in the antiphase resonance mode was broader than the magnetic field space Z1852 formed in the inphase resonance mode.

Next, in the wireless power supply system 1800, the transmission characteristic "S21" was measured with the aluminum piece 60 arranged on the inner circumference side of the coil of the power-receiving resonator 1832 (more specifically, on the inner circumferential side of the magnetic member 1833), with various frequencies of the AC power to the wireless power supply system 1800.

The measurement results are shown in FIG. 39 as a waveform 1842 representing the transmission characteristic "S21" measured with the aluminum piece 60 arranged on the inner circumference side of the coil of the power-receiving resonator 1832. Although the transmission characteristic "S21" at the frequency fL nearby the peak on the low frequency side shown by the waveform 1842 is slightly lower than the transmission characteristic "S21" shown by the waveform 1841 resulted with no aluminum piece 60 on the inner circumference side of the coil of the power-receiving resonator 1832, it should be understood the transmission characteristic itself is maintained at a high value. The transmission characteristic "S21" at the frequency fH nearby the peak on the high frequency side, on the other hand, is substantially the same as the transmission characteristic "S21" shown by the waveform 1841 resulting without no aluminum piece 60 on the inner circumference side of the coil of the power-receiving resonator 1832 (see point P in FIG. 39).

Figure 40C:
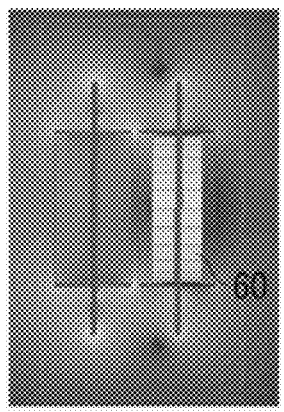
Figure 40D:
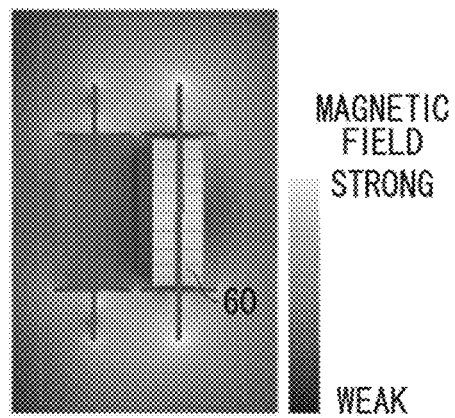

The distribution of magnetic field strength in the inphase resonance mode with the aluminum piece 60 on the inner circumference side of the coil of the power-receiving resonator 1832 is shown in FIG. 40(C). Further, the distribution of magnetic field strength in the antiphase resonance mode with the aluminum piece 60 on the inner circumference side of the coil of the power-receiving resonator 1832 is shown in FIG. 40(D). It should be understood from these figures, when the aluminum piece 60 is arranged on the inner circumference sides of the coils of the power-receiving resonator 1832 in the wireless power supply system 1800 related to the fifth example, the distribution of the magnetic field strength is not influenced so much by the aluminum piece 60, as compared with the fifth comparative example. That is, the wireless power supply system 1800 having the power-supplying module in which the power-supplying coil is arranged on the inner circumference side of the power-supplying resonator and the cylindrical magnetic member is arranged on the inner circumference side of the power-supplying coil and a power-receiving module in which the power-receiving coil is arranged on the inner circumference side of the power-receiving resonator and the cylindrical magnetic member is arranged on the inner circumference side of the power-receiving coil is capable of shielding, with the use of the magnetic members 1823 and 1833, the magnetic field occurring around the power-supplying resonator 1822 and the power-receiving resonator 1832 at the time of conducting power transmission between the power-supplying module 1802 and the power-receiving module 1803 and forming a magnetic field space Z1853 which is broader than the magnetic field space Z1753 related to the fifth comparative example, on the inner circumference sides of the coils of the power-supplying resonator 1822 and the power-receiving resonator 1832. Further, the aluminum piece 60 was less influenced by the magnetic field generated in the wireless power supply system 1800.

Since the power-supplying coil 1821 is arranged on the inner circumference side of the power-supplying resonator 1822 and the magnetic member 1823 is arranged on the inner circumference side of the power-supplying coil 1821, the power-supplying module 1802 used in the wireless power supply system 1800 is symmetrical with respect to the middle cross section of the power-supplying module 1802. Therefore, no matter on which side of the power-supplying module 1802 the power-receiving module 1803 is placed (as long as the other conditions such as the distance are the same), the magnetic field resonant state occurs between the power-supplying resonator 1822 of the power-supplying module 1802 and the power-receiving resonator 1832 of the power-receiving module 1803, thus enabling wireless power transmission. This improves the degree of freedom in arrangement (design) of the power-supplying module 1802 or the like in the structure of the wireless power supply system 1800. Further, arranging the power-receiving modules 1803 on both sides of the power-supplying module 1802 enables wireless power transmission from single power-supplying module 1802 to two power-receiving modules 1803. Further, in the power-supplying module 1802 used in the wireless power supply system 1800, the power-supplying coil 1821 may be arranged on the outer circumference side of the power-supplying resonator 1822. In this case, the magnetic member 1823 is arranged on the inner circumference side of the power-supplying resonator 1822. Similarly, in the power-receiving module 1803, the power-receiving coil 1831 may be arranged on the outer circumference side of the power-receiving resonator 1832. In this case, the magnetic member 1833 is arranged on the inner circumference side of the power-receiving resonator 1832.

(Sixth Example)

As shown in FIG. 13, in the wireless power supply system 400 related to the example 3 of the first example, the power-supplying resonator 22 of the power-supplying module 402 and the power-receiving resonator 32 of the power-receiving module 403 were arranged so that the resonators face each other, and the center axis of the coil of the power-supplying resonator 22 and that of the coil of the power-receiving resonator 32 coincided with each other (see FIG. 11 to 13). As shown in FIG. 41(A) to FIG. 41(C), the sixth example deals with a wireless power supply system 1900 in which the positions of the coil center axis 1927 of the power-supplying resonator 1922 and the position of the coil center axis 1937 of the power-receiving resonator 1932 are misaligned (the center axes do not match with each other). Note that the wireless power supply system 1900 has the same structure as that of the wireless power supply system 400 related to the example 3 of the first example, except in that the coil center axis 1927 of the power-supplying resonator 1922 and the coil center axis 1937 of the power-receiving resonator 1932 do not coincide with each other.

Figure 41:
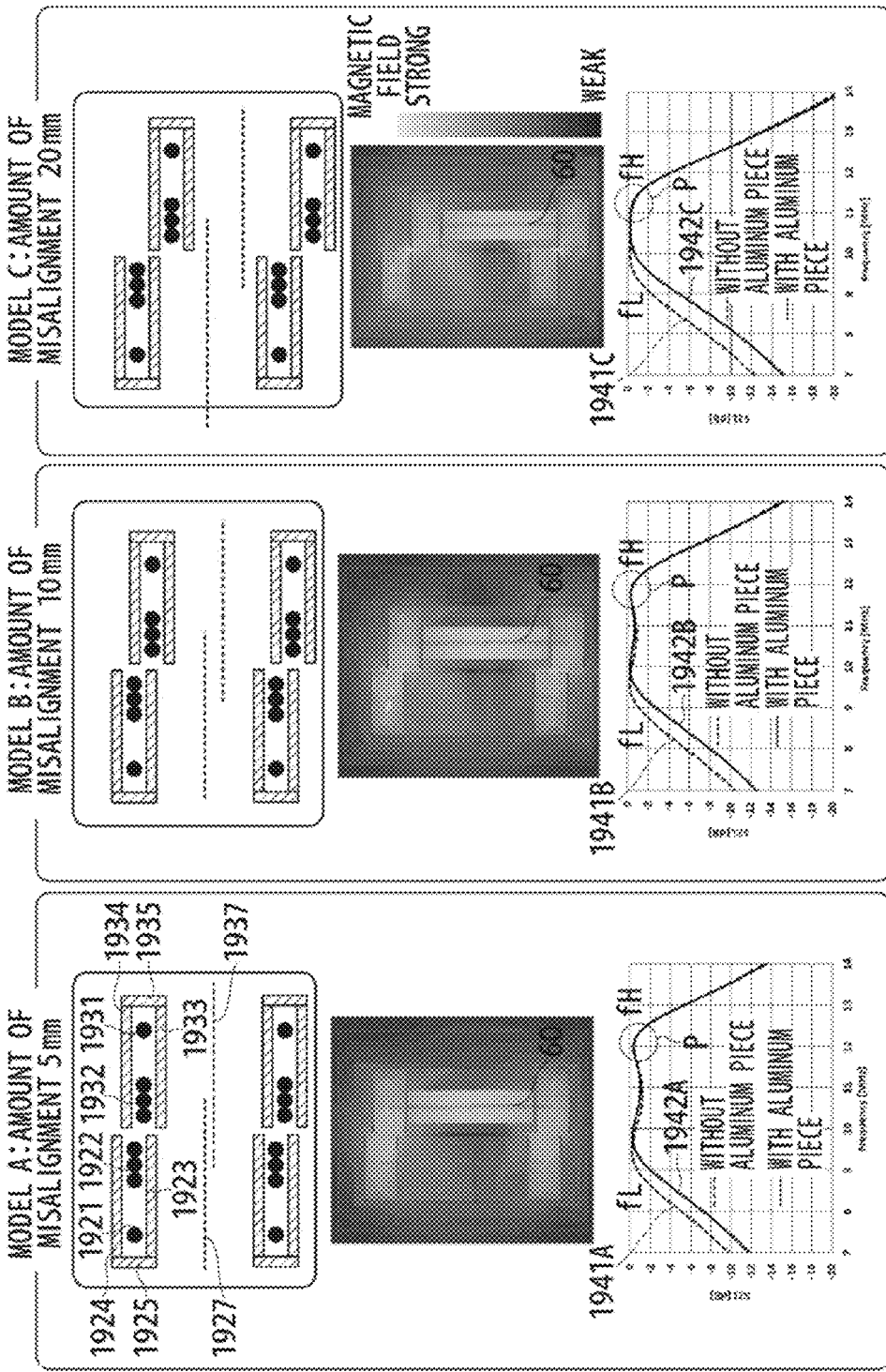
FIG. 41 includes a diagram showing a structure of a wireless power supply system related to a sixth example, a graph indicating transmission characteristic S21 resulting from measurement in the sixth example, and a diagram showing distribution of magnetic field strength related to the sixth example.

Specifically, As shown in the cross sectional view of FIG. 41, the wireless power supply system 1900 used in the sixth example included a power-supplying module 1902 and a power-receiving module 1903. The power-supplying module 1902 included: a power-supplying coil 1921, a power-supplying resonator 1922, a cylindrical magnetic member 1923 which covered the entire inner circumferential surfaces of the power-supplying coil 1921 and the coil of the power-supplying resonator 1922, a cylindrical magnetic member 1924 which covers the entire outer circumferential surfaces of the power-supplying coil 21 and the coil of the power-supplying resonator 1922, and a ring-shaped magnetic member 1925 which covered a side surface of the coil of the power-supplying resonator 1922 opposite to the side surface to face the other coil. The power-receiving module 1903 included: a power-receiving coil 1931, a power-receiving resonator 1932, a cylindrical magnetic member 1933 which covered the entire inner circumferential surfaces of the power-receiving coil 1931 and the coil of the power-receiving resonator 1932, a cylindrical magnetic member 1934 which covered the entire outer circumferential surfaces of the power-receiving coil 1931 and the coil of the power-receiving resonator 1932, and a ring-shaped magnetic member 1935 which covered a side surface of the coil of the power-receiving resonator 1932 opposite to the surface to face the other coil. The power-supplying coil 1921 was connected to the output terminal 111 of the network analyzer 110 and the power-receiving coil 1931 was connected to the input terminal 112 of the network analyzer 110.

For a magnetic field space Z formed by the wireless power supply system 1900, variations in its magnetic field strength and transmission characteristic "S21" were measured, with and without an aluminum piece 60 arranged on an inner circumference side of the coil of the power-receiving resonator 1932 (more specifically, on the inner circumferential side of the magnetic member 1933). There was also measured the magnetic field strength in case of arranging the aluminum piece 60. Note that the measurements in this sixth example involves three models: i.e., a model A in which an amount by which the coil center axis 1927 of the power-supplying resonator 1922 and the coil center axis 1937 of the power-receiving resonator 1932 were misaligned was 5 mm, a model B in which the amount of misalignment was 10 mm, and a model C in which the amount of misalignment was 20 mm.

(Measurement Result of Sixth Example)

For a magnetic field space Z formed by the wireless power supply system 1900 related to the fifth example, variations in its magnetic field strength and transmission characteristic "S21" were measured, with and without an aluminum piece 60 arranged on an inner circumference side of the coil of the power-receiving resonator 1932 (more specifically, on the inner circumferential side of the magnetic member 1933). The results of the measurements are described below.

First, using the network analyzer 110, in the wireless power supply system 1900, the transmission characteristic "S21" was measured without the aluminum piece 60 arranged on the inner circumference side of the coil of the power-receiving resonator 1932, with various frequencies of the AC power to the wireless power supply system 1900.

As the result of measurement for the model A (the amount of misalignment: 5 mm), the resulting waveform 1941A of the measured transmission characteristic "S21" had separate peaks; one on a low frequency side and another on a high frequency side, as shown in FIG. 41.

Next, in the wireless power supply system 1900 of the model A, the transmission characteristic "S21" was measured with the aluminum piece 60 arranged on the inner circumference side of the coil of the power-receiving resonator 1932, with various frequencies of the AC power to the wireless power supply system 1900.

The measurement results of the model A are shown in FIG. 41 as a waveform 1942A representing the transmission characteristic "S21" measured with the aluminum piece 60 arranged on the inner circumference side of the coil of the power-receiving resonator 1932. Although the transmission characteristic "S21" at the frequency fL nearby the peak on the low frequency side shown by the waveform 1942A is slightly lower than the transmission characteristic "S21" shown by the waveform 1941A resulted with no aluminum piece 60 on the inner circumference side of the coil of the power-receiving resonator 1932, it should be understood the transmission characteristic itself is maintained at a high value. The transmission characteristic "S21" at the frequency fH nearby the peak on the high frequency side, on the other hand, is substantially the same as the transmission characteristic "S21" shown by the waveform 1941A resulting without no aluminum piece 60 on the inner circumference side of the coil of the power-receiving resonator 1932 (see point P of the model A in FIG. 41).

The transmission characteristic "S21" in the wireless power supply system 1900 of the model B resulted in the waveform 1941B having separate peaks; one on the low frequency side and the other on the high frequency side, as shown in FIG. 41, when no aluminum piece 60 was arranged on the inner circumference side of the coil of the power-receiving resonator 1932.

Next, in the wireless power supply system 1900 of the model B, the transmission characteristic "S21" was measured with the aluminum piece 60 arranged on the inner circumference side of the coil of the power-receiving resonator 1932, with various frequencies of the AC power to the wireless power supply system 1900.

The measurement results of the model B are shown in FIG. 41 as a waveform 1942B representing the transmission characteristic "S21" measured with the aluminum piece 60 arranged on the inner circumference side of the coil of the power-receiving resonator 1932. Although the transmission characteristic "S21" at the frequency fL nearby the peak on the low frequency side shown by the waveform 1942B is slightly lower than the transmission characteristic "S21" shown by the waveform 1941B resulted with no aluminum piece 60 on the inner circumference side of the coil of the power-receiving resonator 1932, it should be understood the transmission characteristic itself is maintained at a high value. The transmission characteristic "S21" at the frequency fH nearby the peak on the high frequency side, on the other hand, is substantially the same as the transmission characteristic "S21" shown by the waveform 1941B resulting without no aluminum piece 60 on the inner circumference side of the coil of the power-receiving resonator 1932 (see point P of the model B in FIG. 41).

The transmission characteristic "S21" in the wireless power supply system 1900 of the model C resulted in the waveform 1941C having separate peaks; one on the low frequency side and the other on the high frequency side, as shown in FIG. 41, when no aluminum piece 60 was arranged on the inner circumference side of the coil of the power-receiving resonator 1932.

Next, in the wireless power supply system 1900 of the model C, the transmission characteristic "S21" was measured with the aluminum piece 60 arranged on the inner circumference side of the coil of the power-receiving resonator 1932, with various frequencies of the AC power to the wireless power supply system 1900.

The measurement results of the model C are shown in FIG. 41 as a waveform 1942C representing the transmission characteristic "S21" measured with the aluminum piece 60 arranged on the inner circumference side of the coil of the power-receiving resonator 1932. Although the transmission characteristic "S21" at the frequency fL nearby the peak on the low frequency side shown by the waveform 1942C is slightly lower than the transmission characteristic "S21" shown by the waveform 1941C resulted with no aluminum piece 60 on the inner circumference side of the coil of the power-receiving resonator 1932, it should be understood the transmission characteristic itself is maintained at a high value. The transmission characteristic "S21" at the frequency fH nearby the peak on the high frequency side, on the other hand, is substantially the same as the transmission characteristic "S21" shown by the waveform 1941C resulting without no aluminum piece 60 on the inner circumference side of the coil of the power-receiving resonator 1932 (see point P of the model C in FIG. 41).

From the above measurement results, it should be understood that, in all of the three models, i.e., the model. A in which the amount by which the coil center axis 1927 of the power-supplying resonator 1922 and the coil center axis 1937 of the power-receiving resonator 1932 are misaligned was 5 mm, the model B in which the amount of misalignment was 10 mm, and the model C in which the amount of misalignment was 20 mm, the transmission characteristic "S21" at the frequency fH nearby the peak on the high frequency side was maintained at substantially the same value as the transmission characteristic "S21" represented by the waveforms 1941A, 1941B, and 1941C resulted without the aluminum piece 60 on the inner circumference side of the coil of the power-receiving resonator 1932. That is, a magnetic field space with relatively small magnetic field strength is formed on the inner circumference sides of the power-supplying resonator 1922 and the power-receiving resonator 1932, even when the coil center axis 1927 of the power-supplying resonator 1922 and the coil center axis 1937 of the power-receiving resonator 1932 are misaligned.

(Embodiment 1)

Next, the following briefly describes an exemplary use of the magnetic field space Z described in the above examples, as an embodiment 1.

For example, a wireless power supply system 200 essentially includes a power-supplying module 202 having a power-supplying coil 21 and a power-supplying resonator 22, and a power-receiving module 203 having a power-receiving coil 31 and a power-receiving resonator 32. Solenoid coils are adopted as the power-supplying resonator 22 and the power-receiving resonator 32. The power-supplying resonator 22 and the power-receiving resonator 32 are arranged so that the coil surface of the power-supplying resonator 22 and the coil surface of the power-receiving resonator 32 face each other. Further, on the inner circumferential surface side of the coil of the power-supplying resonator 22, a cylindrical magnetic member 23 which covers the inner circumferential surface of the coil is arranged. Similarly, on the inner circumferential surface side of the coil of the power-receiving resonator 32, a cylindrical magnetic member 33 which covers the entire inner circumferential surface of the coil of the power-receiving resonator 32 is arranged. In this embodiment, the power-supplying coil 21 of the power-supplying module 202 is connected, in place of the output terminal 11 of the network analyzer 110, to an AC power source via an oscillation circuit configured to adjust the frequency of power supplied to the power-supplying module 202. The power-receiving coil 31 of the power-receiving module 203 is connected, in place of the input terminal 112 of the network analyzer 110, to a rechargeable battery via a charging circuit configured to prevent overcharge and a rectifier/stabilizer circuit configured to rectify the AC power received.

Figure 43:
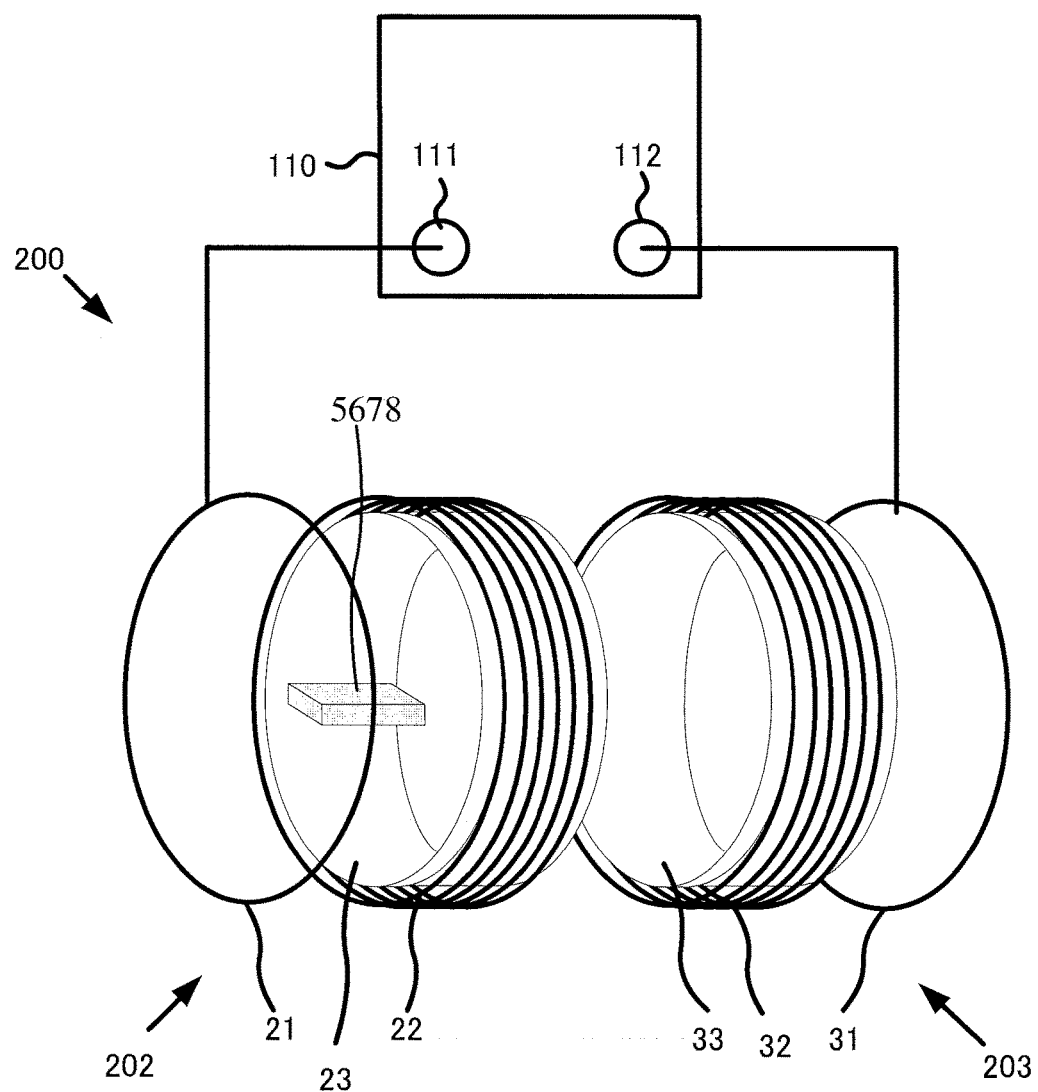
FIG. 43 is an explanatory diagram of a wireless power supply system.
Figure 44:
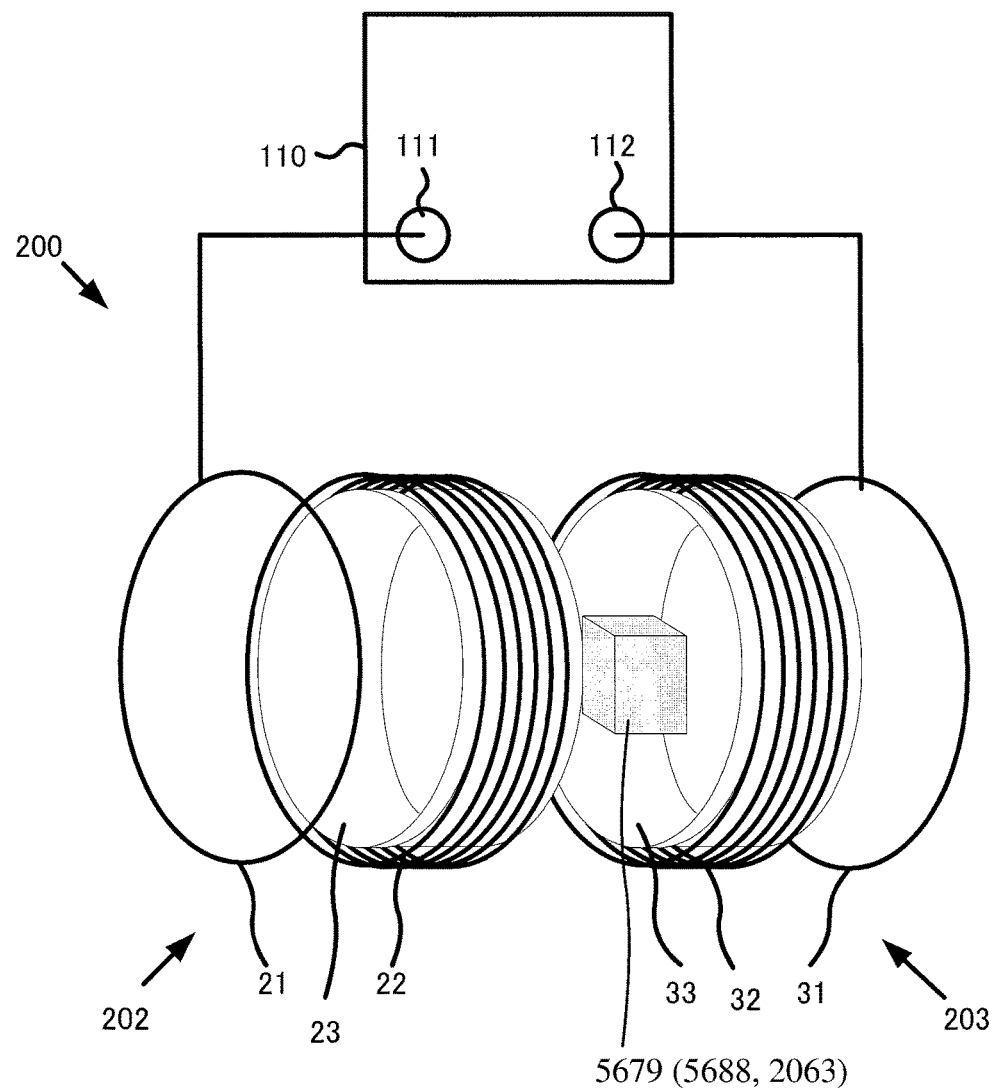
FIG. 44 is an explanatory diagram of a wireless power supply system.

An oscillation circuit 5678 is accommodated on the inner circumference side of the power-supplying resonator 22 in the power-supplying module 202 (inner circumference side of the magnetic member 23), i.e., where the magnetic field space Z253 is formed (see FIG. 43), and the rectifier/stabilizer circuit 5679 is accommodated on the inner circumference side of the power-receiving resonator 32 in the power-receiving module 203 (inner circumference side of the magnetic member 33), i.e., where the magnetic field space Z253 is formed (see FIG. 44). Note that the charging circuit 5688 and the rechargeable battery 2063 may be accommodated on the inner circumference side of the power-receiving resonator 32 of the power-receiving module 203 (see FIG. 44).

In the wireless power supply system 200 having the above-described structure, the AC power supplied from the AC power source to the power-supplying coil 21 via the oscillation circuit is supplied to the rechargeable battery via the rectifier/stabilizer circuit and the charging circuit, by means of the electromagnetic induction between the power-supplying coil 21 and the power-supplying resonator 22, the wireless transmission between the power-supplying resonator 22 and the power-receiving resonator 32 using the resonance (magnetic field resonant state), and the electromagnetic induction between the power-receiving resonator 32 and the power-receiving coil 31. Thus, with the use of the magnetic members 23 and 33 to shield the magnetic field occurring around the power-supplying resonator 22 and the power-receiving resonator 32 at the time of conducting power supply from the power-supplying resonator 22 to the power-receiving resonator 32 by means of resonance, it is possible to form a magnetic field space Z253 having relatively small magnetic field strength, thus reducing the influence of the magnetic field to the oscillation circuit and the rectifier/stabilizer circuit arranged on the inner circumference sides of the power-supplying resonator 22 and the power-receiving resonator 32.

Further, in the embodiment, the oscillation circuit and the rectifier/stabilizer circuit for which influence of the magnetic field is preferably reduced are accommodated in or nearby the magnetic field space Z253 formed on the inner circumference sides of the power-supplying resonator 22 and the power-receiving resonator 32. Therefore, it is possible to reduce or prevent occurrence of eddy current attributed to magnetic field, and restrain negative effect to the oscillation circuit and the rectifier/stabilizer circuit due to heat generation.

Accommodating the oscillation circuit and the rectifier/stabilizer circuit in the magnetic field space Z253 having relatively small magnetic field strength allows a compact structure while preventing heat generation of the oscillation circuit and the rectifier/stabilizer circuit and the like.

Further, with the above embodiment, even when a metal foreign material is present between the power-supplying resonator 22 and the power-receiving resonator 32, or their inner or outer circumference side, i.e., in a location where the magnetic field space Z251, the magnetic field space Z252, or the magnetic field space Z253 is formed as show in FIG. 7, the magnetic field is not influenced by the metal foreign material and efficient and safe power supply from the power-supplying module 202 to the power-receiving module 203 by means of resonance is possible.

In the above examples and the embodiments, the magnetic members 23 and 33, the magnetic members 24 and 34, or the magnetic members 25 and 35 are arranged in both the power-supplying module 202 and the power-receiving module 203, respectively; however, the magnetic member may be arranged one of the power-supplying module 202 and the power-receiving module 203.

(Embodiment 2)

Figure 42:
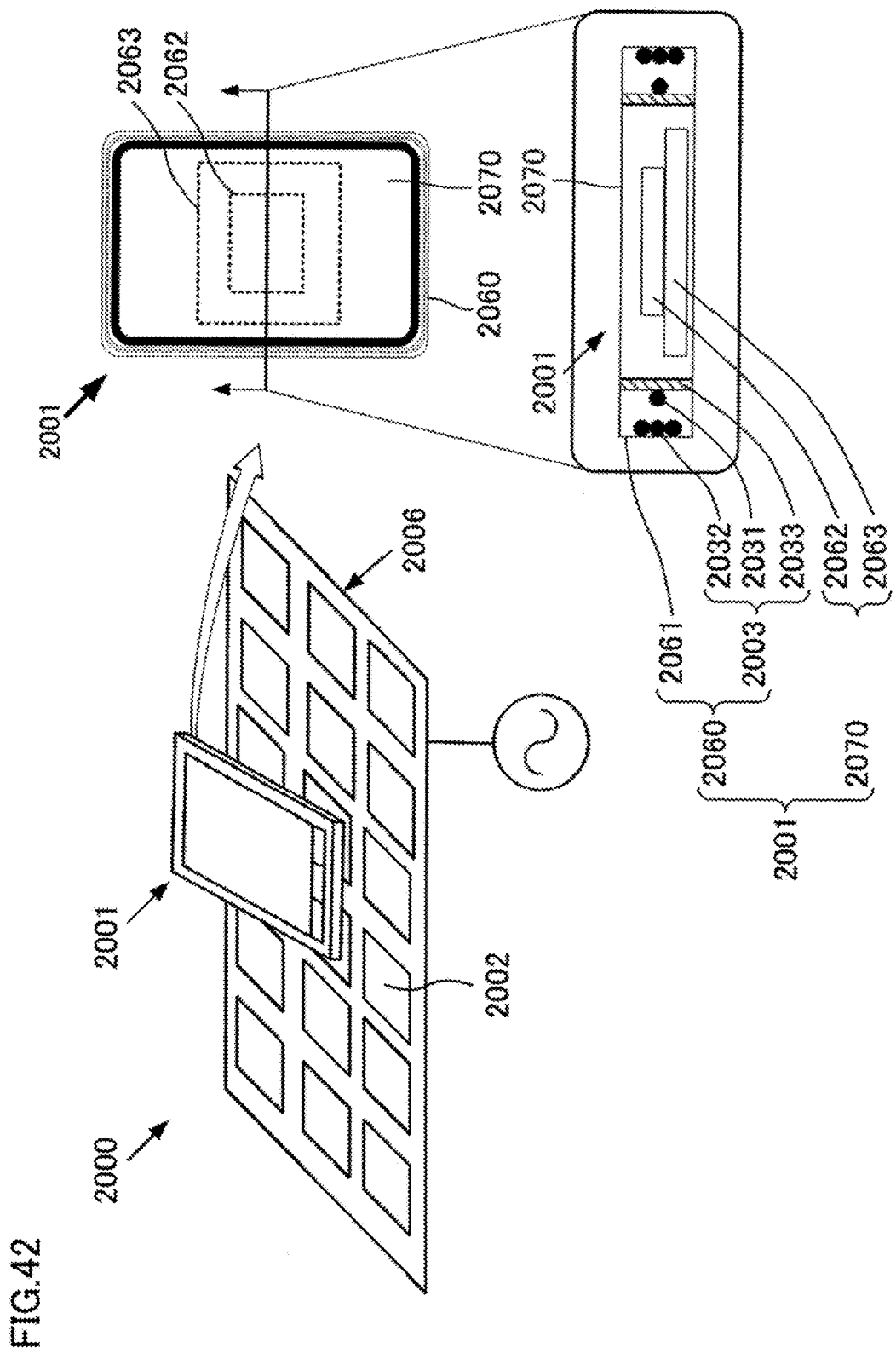
FIG. 42 is an explanatory diagram of a wireless power supply system related to an embodiment 2.

Further, for example, as shown in FIG. 42, a wireless power supply system 2000 includes; a power-transmission sheet 2006 and a smart phone 2001. The power-transmission sheet 2006 includes a plurality of power-supplying modules 2002 each including a power-supplying coil 2021, a power-supplying resonator 2022, and a magnetic member 2023. The smart phone 2001 includes: a rechargeable battery 2063 accommodated in a power-receiving module 2003, and a circuit board 2062 having a rectifier/stabilizer circuit which rectifies the AC power received, a charging circuit for preventing overcharging, and the like.

The smart phone 2001 has: a main casing 2070 accommodating therein the rechargeable battery 2063 and the circuit board 2062 having the rectifier/stabilizer circuit which rectifies the AC power received, a charging circuit for preventing overcharging, and the like; and a power-receiving device 2060 detachably attached to the outer periphery of the main casing 2070. The power-receiving device 2060 has a detachable frame 2061 at the outer periphery of the main casing 2070, and accommodates the power-receiving module 2003 in the frame 2061. The power-receiving module 2003 has a quadrangular power-receiving coil 2031 on the inner circumference side of a power-receiving resonator 2032 having a quadrangular tubular coil structure whose shape fits with the outer periphery of the main casing 2070, and a quadrangular tubular magnetic member 2033 arranged on the inner circumference side of the power-receiving coil 2031. With the power-receiving device 2060 attached to the outer periphery of the main casing 2070, the power-receiving module 2003 is able to supply power to the rechargeable battery 2063. The power-supplying module 2002 also has the same structure as the power-receiving module 2003.

The power-receiving module 2003 paired with a plurality of power-supplying modules 2002 mounted in a power-transmission sheet 2006 to supply AC power supplied from the AC power source to the power-supplying coil 2021 via the oscillation circuit is supplied to the rechargeable battery 2063 via a circuit board 2062 such as the rectifier/stabilizer circuit and the charging circuit, by means of the electromagnetic induction between the power-supplying coil 2021 and the power-supplying resonator 2022, the wireless transmission between the power-supplying resonator 2022 and the power-receiving resonator 2032 using the resonance (magnetic field resonant state), and the electromagnetic induction between the power-receiving resonator 2032 and the power-receiving coil 2031.

When power supply from the power-supplying resonator 2022 to the power-receiving resonator 2032 by means of resonance is conducted, the magnetic field occurring around the power-supplying resonator 2022 and the power-receiving resonator 2032 is shielded by the magnetic members 2023 and 2033, and there is formed a magnetic field space in which the influence of the magnetic field to the circuit board 2062 and the rechargeable battery 2063 on the inner circumference side of the power-supplying resonator 2022 and the power-receiving resonator 2032, i.e., accommodated in the main casing 2070.

Since the circuit board 2062 and the rechargeable battery 2063 for which influence of the magnetic field is preferably reduced are accommodated in the magnetic field space inside the main casing 2070, it is possible to reduce or prevent occurrence of the eddy current attributed to the magnetic field, and restrain negative effect to the circuit board 2062 and the rechargeable battery 2063 due to heat generation.

Further, accommodating the circuit board 2062 and the rechargeable battery 2063 on the inner circumference side of the power-receiving resonator 2032 allows a compact structure of the smart phone 2001.

Further, in the power-receiving module 2003, the power-receiving resonator 2032 has a structure of the quadrangular tubular coil that fits with the outer periphery of the main casing 2070, and the power-receiving coil 2031 is made in a quadrangular shape. Further, the magnetic member 2033 is also made into a quadrangular tubular shape, to fit in the shape of the outer periphery of the main casing 2070 (see second example). As should be understood from this, it is possible to form the power-receiving coil 2031, the power-receiving resonator 2032, and the magnetic member 2033 in a shape that fits in a device in which the power-receiving module 2003 will be mounted. For example, a device attached to an ear for use, such as an earphone type music player, a hearing aid, a sound collector adopts a crescent casing to match with the shape of the ear. It is possible to form the power-receiving coil, the power-receiving resonator, and the magnetic member in such a crescent shape to fit in the crescent casing (see third example).

The power-receiving module 2003 used in the smart phone 2001 has the power-receiving coil 2031 arranged on the inner circumference side of the power-receiving resonator 2032, and the magnetic member 2033 arranged on the inner circumference side of the power-receiving coil 2031. Therefore, the module is symmetrical with respect to the middle cross section of the power-receiving module 2003 (see fifth example). Therefore, when the smart phone 2001 is placed on the power-transmission sheet 2006, no matter which side of the smart phone 2001 is placed face down, the magnetic field resonant state is formed between the power-supplying resonator 2022 of the power-supplying module 2002 and the power-receiving resonator 2032 of the power-receiving module 2003 with the same conditions, thus enabling wireless power transmission. This improves the convenience at the time of charging the rechargeable battery 2063 of the smart phone 2001.

Note that the power-receiving coil 2031 and the power-receiving resonator 2032 of the power-receiving module 2003 in the smart phone 2001 do not necessarily have to have the same coil diameter as those of the power-supplying coil 2021 and the power-supplying resonator 2022 of the power-supplying module 2002 in the power-transmission sheet 2006. The coil diameters of the power-receiving coil 2031 and the power-receiving resonator 2032 in the power-receiving module 2003 may be greater than those of the power-supplying coil 2021 and the power-supplying resonator 2022 in the power-supplying module 2002 (see fourth example).

Further, when the smart phone 2001 is placed on the power-transmission sheet 2006 for charging, the center axis of the coil of the power-supplying resonator 2022 of the power-transmission sheet 2006 does not necessarily have to coincide with the center axis of the coil of the power-receiving resonator 2032 in the smart phone 2001 (the axes may be misaligned from each other: see sixth example).

Although the above embodiment 2 deals with the smart phone 2001 as an example for describing the wireless power supply system, the system is applicable to any devices having a rechargeable battery; e.g., tablet type PCs, digital cameras, mobile phones, earphone type music players, hearing aids, sound collectors. In addition to those devices, the present invention is also applicable to a device that supplies power to illumination devices, robots, and the like, without a use of batteries.

Although the above descriptions have been provided with regard to the characteristic parts so as to understand the invention more easily, the invention is not limited to the embodiment as described above and can be applied to the other embodiments and the applicable scope should be construed as broadly as possible. Furthermore, the terms and phraseology used in the specification have been used to correctly illustrate the invention, not to limit it. In addition, it will be understood by those skilled in the art that the other structures, systems, methods and the like included in the spirit of the invention can be easily derived from the spirit of the invention described in the specification. Accordingly, it should be considered that the invention covers equivalent structures thereof without departing from the spirit and scope of the invention as defined in the following claims. Accordingly, it should be considered that the invention covers equivalent structures thereof without departing from the spirit and scope of the invention as defined in the following claims.

REFERENCE SIGNS LIST

21 Power-Supplying Coil
22 Power-Supplying Resonator
23 Magnetic Member
31 Power-Receiving Coil
32 Power-Receiving Resonator
33 Magnetic Member
110 Network Analyzer
111 Output Terminal
112 Input Terminal
200 Wireless Power Supply System
202 Power-Supplying Module
203 Power-Receiving Module
Z Magnetic Field Space

The invention claimed is:

1. A wireless power supply system comprising:
a power-supplying module including a coil-shaped power-supplying resonator; a power-receiving module including a coil-shaped power-receiving resonator to which power is supplied from the power-supplying resonator by means of resonance phenomena;
a magnetic member which covers at least partially one or more surfaces of the power-supplying resonator and the power-receiving resonator, except for surfaces where the power-supplying resonator and the power-receiving resonator oppose each other, wherein,
when power transmission from the power-supplying resonator to the power-receiving resonator is performed by changing a magnetic field by means of resonance phenomena, a measured waveform with a transmission characteristic has separated peaks, one on a low frequency side and another on a high frequency side with respect to a resonance frequency of the power-supplying resonator and the power-receiving resonator,
a frequency of AC power supplied to the power-supplying module is set at around a peak on the low frequency side, and by the resonance phenomena based on an inphase resonance mode in which a current flowing in the power-supplying module and a current flowing in the power-receiving module flow in the same direction, a magnetic field space having a low magnetic field strength as compared to magnetic field strength of surroundings is formed on an outer circumferential side and an inner circumferential side of the power-supplying resonator and the power-receiving resonator, the magnetic field space being at least partially shielded by the magnetic member, or the frequency of AC power supplied to the power-supplying module is set at around a peak on the high frequency side, and by the resonance phenomena based on an antiphase resonance mode in which a current flowing in the power-supplying module and a current flowing in the power-receiving module flow in the opposite directions, a magnetic field space having a low magnetic field strength as compared to magnetic field strength of surroundings is formed on the inner circumferential side of the power-supplying resonator and the power-receiving resonator, the magnetic field space being at least partially shielded by the magnetic member, and
at least one of an electronic component, a rechargeable battery and, a metal piece is provided in the formed magnetic field space.

2. The wireless power supply system according to claim 1, wherein the magnetic member is arranged so as to cover an inner circumferential surface of the power-supplying resonator and/or the power-receiving resonator.

3. The wireless power supply system according to claim 1, wherein the magnetic member is arranged so as to cover an outer circumferential surface of the power-supplying resonator and/or the power-receiving resonator.

4. The wireless power supply system according to claim 1, wherein the magnetic member is arranged on a surface of one of the power-supplying resonator and the power-receiving resonator, which surface is one of surfaces opposite to the surfaces where the power-supplying resonator and the power-receiving resonator oppose each other.

5. A power-supplying device configured to supply power to a power-receiving resonator of a power-receiving module by changing a magnetic field by means of resonance phenomena, comprising:
a power-supplying module including a coil-shaped power-supplying resonator; and
a magnetic member which covers at least partially one or more surfaces of the power-supplying resonator and the power-receiving resonator, except for surfaces where the power-supplying resonator and the power-receiving resonator oppose each other, wherein,
when power transmission from the power-supplying resonator to the power-receiving resonator is performed by changing a magnetic field by means of resonance phenomena, a measured waveform with a transmission characteristic has separated peaks, one on a low frequency side and another on a high frequency side with respect to a resonance frequency of the power-supplying resonator and the power-receiving resonator, a frequency of AC power supplied to the power-supplying module is set at around a peak on the low frequency side, and by the resonance phenomena based on an inphase resonance mode in which a current flowing in the power-supplying module and a current flowing in the power-receiving module flow in the same direction, a magnetic field space having a low magnetic field strength as compared to magnetic field strength of surroundings is formed on an outer circumferential side and an inner circumferential side of the power-supplying resonator and the power-receiving resonator, the magnetic field space being at least partially shielded by the magnetic member, or the frequency of AC power supplied to the power-supplying module is set at around a peak on the high frequency side, and by the resonance phenomena based on an antiphase resonance mode in which a current flowing in the power-supplying module and a current flowing in the power-receiving module flow in the opposite directions, a magnetic field space having a low magnetic field strength as compared to magnetic field strength of surroundings is formed on the inner circumferential side of the power-supplying resonator and the power-receiving resonator, the magnetic field space being at least partially shielded by the magnetic member, and at least one of an electronic component, a rechargeable battery and, a metal piece is provided in the formed magnetic field space.

6. The power-supplying device according to claim 5, wherein the magnetic member is arranged so as to cover an inner circumferential surface of the power-supplying resonator.

7. The power-supplying device according to claim 5, wherein the magnetic member is arranged so as to cover an outer circumferential surface of the power-supplying resonator.

8. The power-supplying device according to claim 5, wherein the magnetic member is arranged on a surface of the one of the power-supplying resonator and the power-receiving resonator, which surface is one of surfaces opposite to the surfaces where the power-supplying resonator and the power-receiving resonator oppose each other.

9. A power-receiving device configured to receive power from a power-supplying resonator of a power-supplying module by changing a magnetic field by means of resonance phenomena, comprising:

a power-receiving module including a coil-shaped power-receiving resonator; and a magnetic member which covers at least partially one or more surfaces of the power-supplying resonator and the power-receiving resonator, except for surfaces where the power-supplying resonator and the power-receiving resonator oppose each other, wherein, when power transmission from the power-supplying resonator to the power-receiving resonator is performed by changing a magnetic field by means of resonance phenomena, a measured waveform with a transmission characteristic has separated peaks, one on a low frequency side and another on a high frequency side with respect to a resonance frequency of the power-supplying resonator and the power-receiving resonator, a frequency of AC power supplied to the power-supplying module is set at around a peak on the low frequency side, and by the resonance phenomena based on an inphase resonance mode in which a current flowing in the power-supplying module and a current flowing in the power-receiving module flow in the same direction, a magnetic field space having a low magnetic field strength as compared to magnetic field strength of surroundings is formed on an outer circumferential side and an inner circumferential side of the power-supplying resonator and the power-receiving resonator, the magnetic field space being at least partially shielded by the magnetic member, or the frequency of AC power supplied to tile power-supplying module is set at around a peak on the high frequency side, and by the resonance phenomena based on an antiphase resonance mode in which a current flowing in the power-supplying module and a current flowing in the power-receiving module flow in the opposite directions, a magnetic field space having a low magnetic field strength as compared to magnetic field strength of surroundings is formed on the inner circumferential side of the power-supplying resonator and the power-receiving resonator, the magnetic field space being at least partially shielded by the magnetic member, and at least one of an electronic component, a rechargeable battery and, a metal piece is provided in the formed magnetic field space.

10. The power-receiving device according to claim 9, wherein the magnetic member is arranged so as to cover an inner circumferential surface of the power-receiving resonator.

11. The power-receiving device according to claim 9, wherein the magnetic member is arranged so as to cover an outer circumferential surface of the power-receiving resonator.

12. The power-receiving device according to claim 9, wherein the magnetic member is arranged on a surface of the one of the power-supplying resonator and the power-receiving resonator, which surface is one of surfaces opposite to the surfaces where the power-supplying resonator and the power-receiving resonator oppose each other.

* * * * *